United States Patent
Martin

(10) Patent No.: US 9,781,204 B2
(45) Date of Patent: *Oct. 3, 2017

(54) MAKING A USER'S DATA, SETTINGS, AND LICENSED CONTENT AVAILABLE IN THE CLOUD

(71) Applicant: U-Me Holdings LLC, Carthage, MO (US)

(72) Inventor: Derek P. Martin, Carthage, MO (US)

(73) Assignee: U-Me Holdings LLC, Carthage, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,061

(22) Filed: Jul. 18, 2015

(65) Prior Publication Data

US 2015/0326666 A1    Nov. 12, 2015

Related U.S. Application Data

(63) Continuation of application No. 14/016,038, filed on Aug. 30, 2013, now Pat. No. 9,118,670.

(51) Int. Cl.
*H04L 9/00* (2006.01)
*H04L 29/08* (2006.01)
(Continued)

(52) U.S. Cl.
CPC ...... *H04L 67/1095* (2013.01); *G06F 9/44505* (2013.01); *G06F 9/45558* (2013.01);
(Continued)

(58) Field of Classification Search
CPC .............. H04L 63/0861; H04L 67/306; H04L 67/1095; G06F 9/44505; G06F 9/45558;
(Continued)

(56) References Cited

U.S. PATENT DOCUMENTS

| 5,381,526 A | 1/1995 | Elison |
| 6,182,212 B1 | 1/2001 | Atkins et al. |

(Continued)

FOREIGN PATENT DOCUMENTS

JP    2009282755 A    12/2009

OTHER PUBLICATIONS

Kastner, "JINI Connectivity for Fieldbus Systems", IEEE, 2000, pp. 229-234.*

(Continued)

*Primary Examiner* — Luu Pham
*Assistant Examiner* — Walter Malinowski
(74) *Attorney, Agent, or Firm* — Martin & Associates, LLC; Derek P. Martin

(57) ABSTRACT

A cloud-based computer system changes the modern paradigm from being device-centric to being person-centric. The system makes all user data, software settings, device settings, and licensed content for a user available in the cloud. The system includes a conversion mechanism that can convert information intended for one device type to a different device type. Thus, a user changing smart phone platforms can convert their current smart phone settings to equivalent settings on the new phone platform, and their new phone can then be configured using the user's converted settings stored in the cloud. By storing all the user's relevant information in the cloud, this information may be accessed anywhere and may be used to configure a large number of different devices according to the user's settings.

17 Claims, 68 Drawing Sheets

(51) Int. Cl.
| | |
|---|---|
| *H04L 29/06* | (2006.01) |
| *G06F 17/30* | (2006.01) |
| *G06F 9/445* | (2006.01) |
| *G06F 9/455* | (2006.01) |
| *H04W 12/06* | (2009.01) |
| *H04W 12/08* | (2009.01) |

(52) U.S. Cl.
CPC .. *G06F 17/30265* (2013.01); *G06F 17/30575* (2013.01); *H04L 63/0861* (2013.01); *H04L 67/306* (2013.01); *H04W 12/06* (2013.01); *H04W 12/08* (2013.01); *G06F 2009/45595* (2013.01)

(58) Field of Classification Search
CPC ......... G06F 17/30265; G06F 17/30575; G06F 2009/45595; H04W 12/06; H04W 12/08
USPC .......................................................... 726/7
See application file for complete search history.

(56) References Cited

U.S. PATENT DOCUMENTS

| | | | |
|---|---|---|---|
| 6,370,646 B1 | 4/2002 | Goodman et al. | |
| 6,658,415 B1 | 12/2003 | Brown et al. | |
| 6,975,874 B1 | 12/2005 | Bates et al. | |
| 6,999,757 B2 | 2/2006 | Bates et al. | |
| 7,103,366 B2 | 9/2006 | Bates et al. | |
| 7,130,643 B2 | 10/2006 | Bates et al. | |
| 7,251,494 B2 | 7/2007 | Bates et al. | |
| 7,447,854 B1 | 11/2008 | Cannon | |
| 7,509,672 B1 | 3/2009 | Horwitz et al. | |
| 7,686,682 B2 | 3/2010 | Diakopoulos et al. | |
| 7,716,157 B1 | 5/2010 | Bourdev et al. | |
| 7,783,674 B2 | 8/2010 | Henrickson et al. | |
| 7,788,267 B2 | 8/2010 | Wolas-Shiva et al. | |
| 7,844,591 B1 | 11/2010 | Lettau et al. | |
| 7,916,976 B1 | 3/2011 | Kedikian | |
| 8,081,198 B1 | 12/2011 | Ayers et al. | |
| 8,156,301 B1* | 4/2012 | Khandelwal | G06F 9/45558 711/112 |
| 8,312,547 B1 | 11/2012 | Sobel et al. | |
| 8,359,637 B2 | 1/2013 | Yau et al. | |
| 8,396,893 B2 | 3/2013 | Gaffga et al. | |
| 8,613,070 B1* | 12/2013 | Borzycki | G06F 21/6218 726/8 |
| 9,104,537 B1* | 8/2015 | Penilla | G06F 17/00 |
| 9,424,439 B2* | 8/2016 | Tamayo-Rios | G06F 21/44 |
| 2002/0104080 A1 | 8/2002 | Woodard et al. | |
| 2002/0138582 A1 | 9/2002 | Chandra et al. | |
| 2003/0134648 A1 | 7/2003 | Reed et al. | |
| 2005/0009498 A1* | 1/2005 | Ho | H04L 12/2803 455/402 |
| 2005/0066317 A1 | 3/2005 | Alda et al. | |
| 2005/0091539 A1* | 4/2005 | Wang | G06F 21/31 726/4 |
| 2005/0220080 A1* | 10/2005 | Ronkainen | H04L 41/082 370/352 |
| 2006/0074618 A1 | 4/2006 | Miller et al. | |
| 2007/0288966 A1 | 12/2007 | Javid et al. | |
| 2008/0200209 A1 | 8/2008 | Cahoon | |
| 2008/0299951 A1 | 12/2008 | Karkanias et al. | |
| 2008/0313470 A1 | 12/2008 | Pall | |
| 2009/0055396 A1 | 2/2009 | Svendsen et al. | |
| 2009/0157839 A1* | 6/2009 | Diederichs | G05B 19/4185 709/208 |
| 2010/0030766 A1 | 2/2010 | Li et al. | |
| 2010/0075631 A1 | 3/2010 | Black et al. | |
| 2010/0130255 A1 | 5/2010 | Wong | |
| 2010/0135597 A1 | 6/2010 | Gokturk et al. | |
| 2010/0169154 A1 | 7/2010 | Kraft et al. | |
| 2010/0223341 A1 | 9/2010 | Manolescu et al. | |
| 2010/0287219 A1 | 11/2010 | Caso et al. | |
| 2011/0026853 A1 | 2/2011 | Gokturk et al. | |
| 2011/0034176 A1 | 2/2011 | Lord et al. | |
| 2011/0093941 A1* | 4/2011 | Liu | G06F 9/44505 726/7 |
| 2011/0212717 A1 | 9/2011 | Rhoads et al. | |
| 2011/0213691 A1 | 9/2011 | Ferris et al. | |
| 2011/0225640 A1 | 9/2011 | Ganapathy et al. | |
| 2011/0251992 A1* | 10/2011 | Bethlehem | H04L 12/2863 707/610 |
| 2011/0252071 A1 | 10/2011 | Cidon | |
| 2011/0307491 A1 | 12/2011 | Fisk | |
| 2012/0054193 A1 | 3/2012 | Backa | |
| 2012/0066762 A1* | 3/2012 | Todorovic | G06F 21/564 726/22 |
| 2012/0079601 A1 | 3/2012 | Gava et al. | |
| 2012/0240183 A1 | 9/2012 | Sinha | |
| 2012/0265803 A1 | 10/2012 | Ha et al. | |
| 2012/0311564 A1* | 12/2012 | Khalid | G06F 8/61 718/1 |
| 2013/0007265 A1 | 1/2013 | Benedetti et al. | |
| 2013/0083693 A1* | 4/2013 | Himura | H04L 12/4641 370/254 |
| 2013/0117806 A1* | 5/2013 | Parthasarathy | G06F 21/604 726/1 |
| 2013/0169546 A1 | 7/2013 | Thomas et al. | |
| 2013/0204866 A1 | 8/2013 | Fork et al. | |
| 2013/0211920 A1* | 8/2013 | Drozdov | H04W 4/206 705/14.64 |
| 2013/0238777 A1 | 9/2013 | Raleigh et al. | |
| 2013/0275575 A1 | 10/2013 | Hugard et al. | |
| 2013/0331087 A1* | 12/2013 | Shoemaker | H04L 67/125 455/420 |
| 2014/0149980 A1* | 5/2014 | Vittal | G06F 9/5072 718/1 |
| 2014/0173447 A1* | 6/2014 | Das | G06F 3/04842 715/738 |
| 2014/0282357 A1* | 9/2014 | Padaliak | G06F 8/71 717/103 |
| 2014/0297823 A1* | 10/2014 | Prakash | H04L 41/0806 709/223 |
| 2014/0321532 A1* | 10/2014 | Ghat | H04N 19/124 375/240.03 |
| 2014/0337466 A1* | 11/2014 | Li | H04L 63/0407 709/217 |
| 2014/0366080 A1* | 12/2014 | Gupta | H04L 63/0807 726/1 |
| 2014/0366118 A1 | 12/2014 | Yin | |
| 2015/0264117 A1* | 9/2015 | Kasturi | H04L 41/5019 709/217 |
| 2016/0112875 A1* | 4/2016 | Kasravi | H04L 12/12 455/411 |
| 2016/0182522 A1* | 6/2016 | Kwak | G06F 21/33 726/4 |
| 2016/0357823 A1* | 12/2016 | Chimalamarri | G06F 17/30321 |
| 2016/0381023 A1* | 12/2016 | Dulce | H04L 63/10 726/9 |
| 2017/0032188 A1* | 2/2017 | Zhang | G06F 17/30047 |

OTHER PUBLICATIONS

Raj, "High Performance and Scalable I/O Virtualization via Self-Virtualized Devices", HPDC'07, Jun. 25-29, 2007, pp. 179-188.*

Marx, "Increasing security and privacy in user-centric Identity Management: The IdM card approach", 2010 International Conference on P2P, Parallel, Grid, Cloud and Internet Computing, 2010, pp. 459-464.*

Dearman, ""It's on my other Computer!": Computing with Multiple Devices", CHI 2008 Proceedings Displayful and Displayless, Apr. 5-10, 2008, Florence, Italy, pp. 767-776.*

IP.com 000216077D, "Technique for Virtualized Desktop Exploitation for a Roaming User in a "Cloud-Based" Office", Mar. 23, 2012, two pages.

* cited by examiner

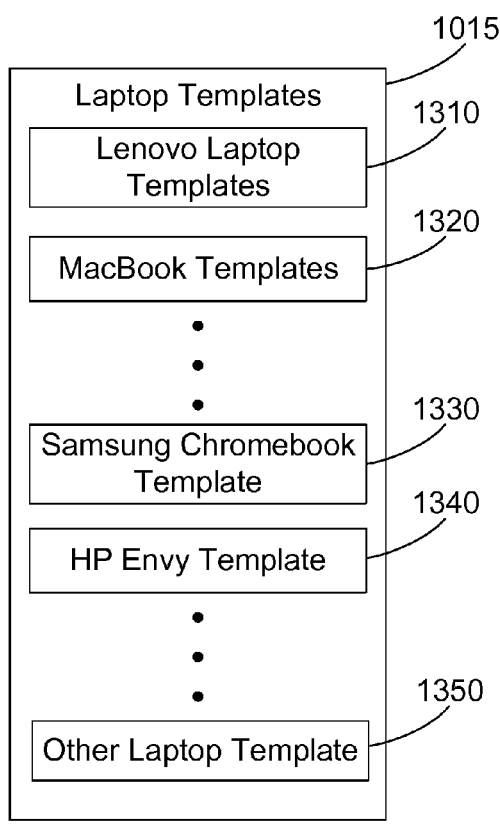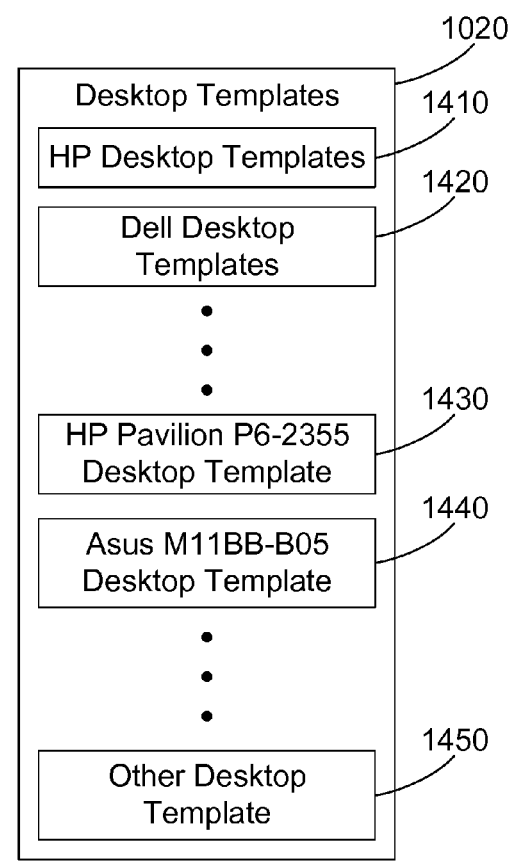
FIG. 13
FIG. 14

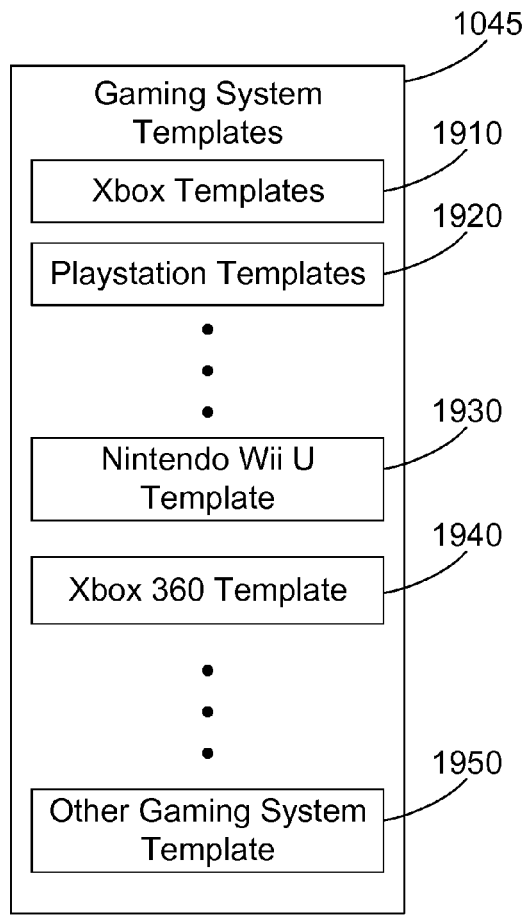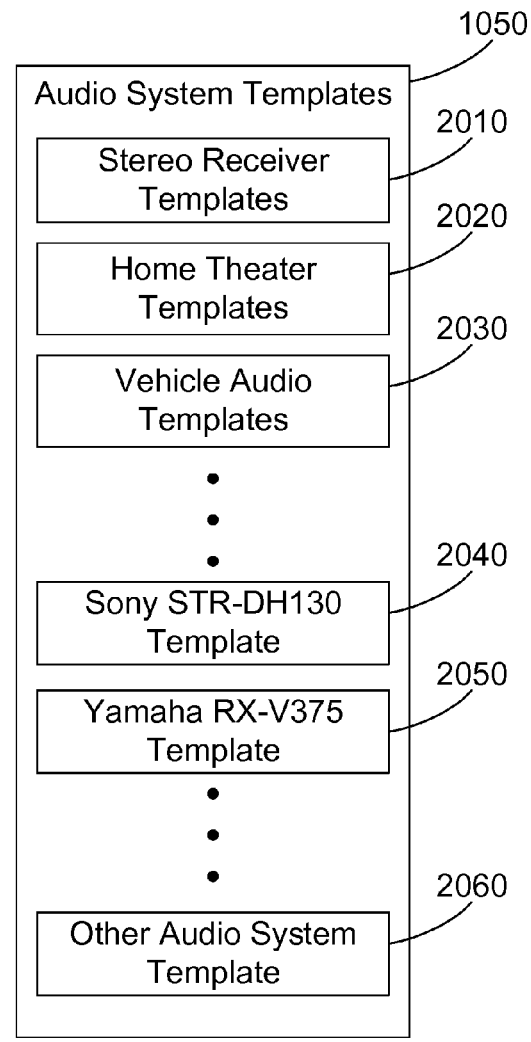
FIG. 19
FIG. 20

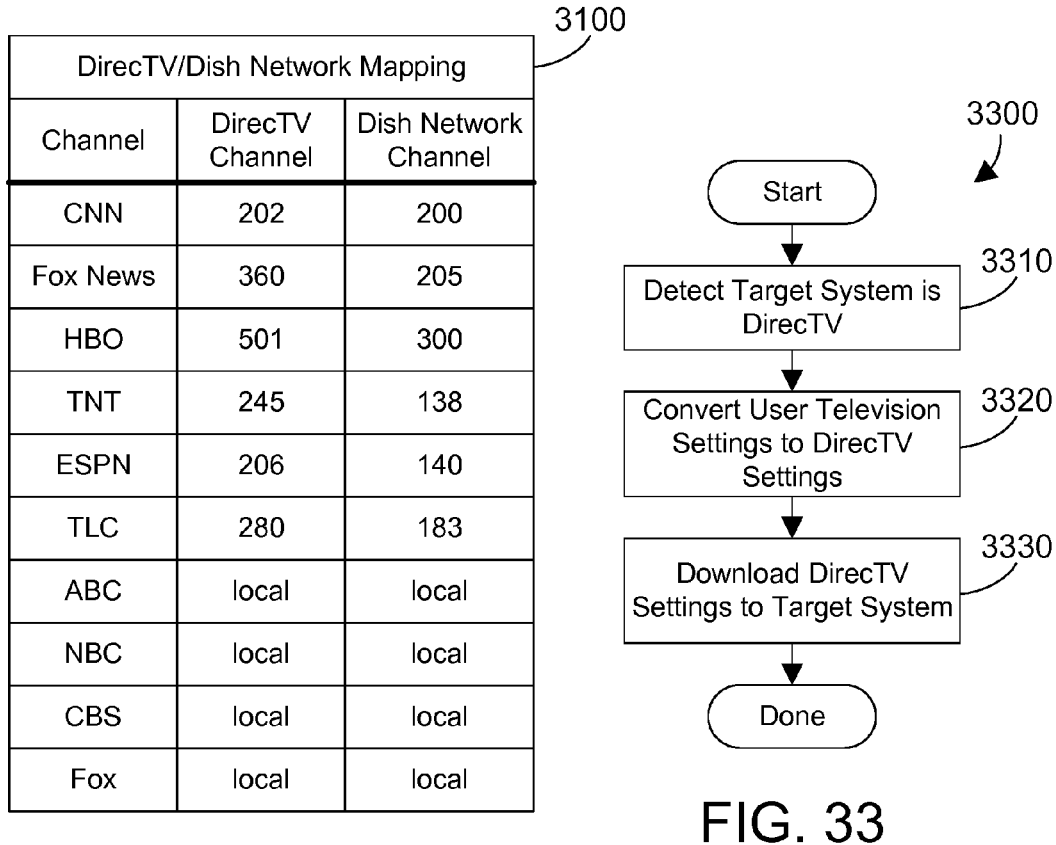
FIG. 31
FIG. 33
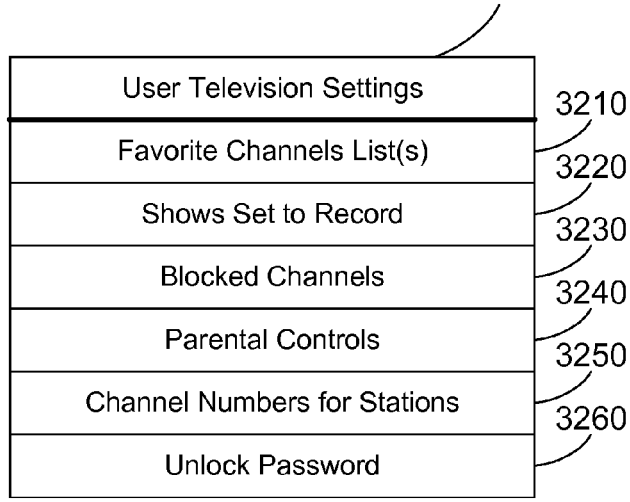
FIG. 32

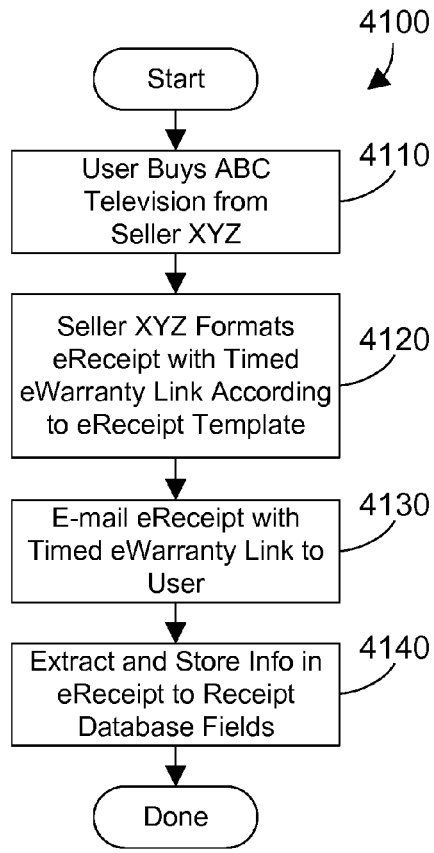
FIG. 41
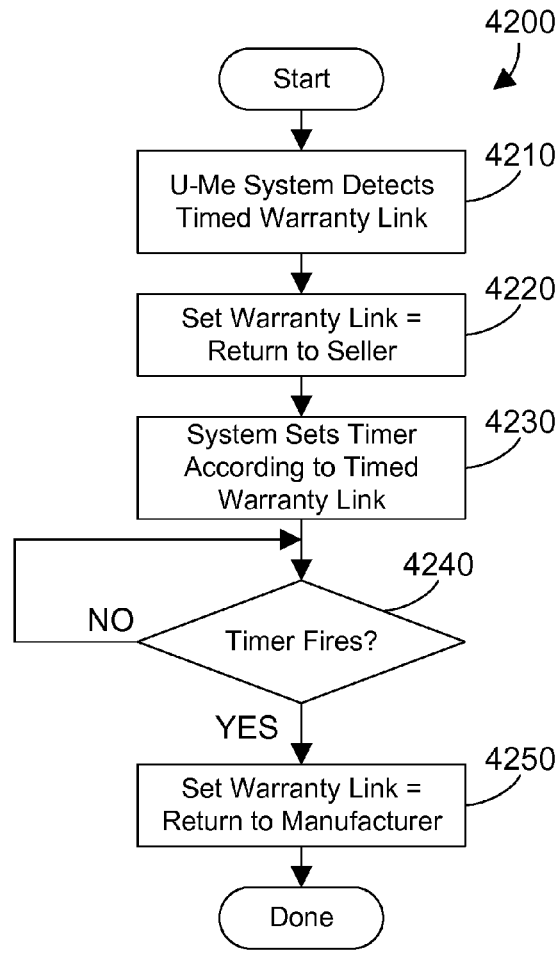
FIG. 42
Timed Warranty Link
If <currentDate> <= 12/09/2013
    http:\bestbuy.com\warranty_claim\<eReceipt>
else
    http:\\mitsubishi.com\warranty_claim\<eReceipt>
FIG. 43

| Photo System Data Entry | | |
|---|---|---|
| Name | Jim Jones | |
| Preferred Name | Jimmy | |
| Birth Date | 08/03/1957 | |
| Father | Fred Jones | |
| Mother | Sally Jones | |
| Wedding Day | 06/21/1983 | |
| Spouse | Pat Jones | |
| Married Name | | |
| Child | Billy Jones | Add — 6420 |
| Child | Sandy Jones | Add — 6430 |
| Camera | Nikon Coolpix S01 | |
| Street | 21354 Dogwood | 6540 |
| City | Carthage | Lat: 37.1143965 |
| State | MO | Long: -94.2821453 |
| ZIP | 64836 | |
| Address Name | Jim & Pat's House | |
| Sample Photo of Face | Jim's Face Photo — 6550 | Save (6360)  Cancel (6370) |

6510

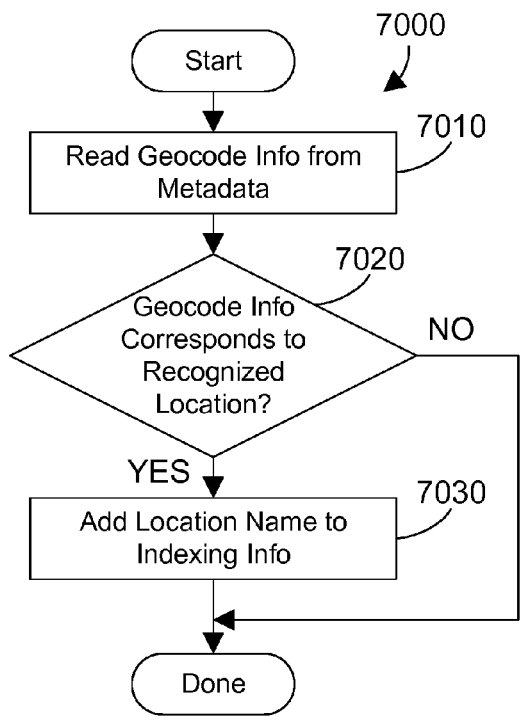
FIG. 69
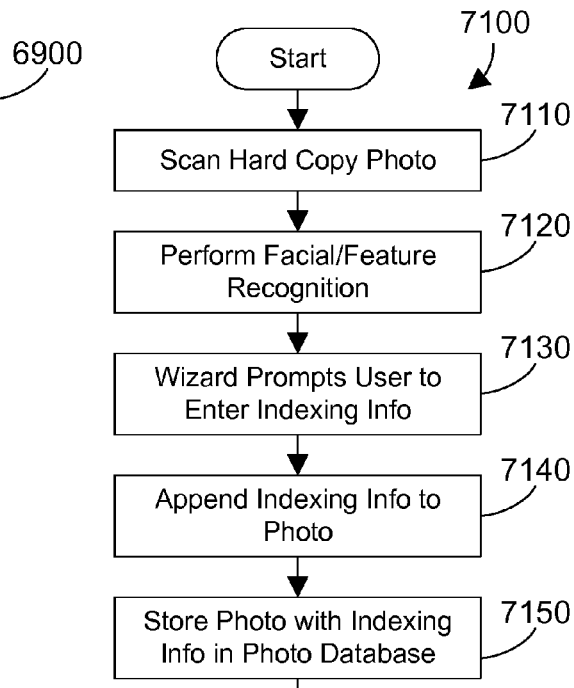
FIG. 70
FIG. 71
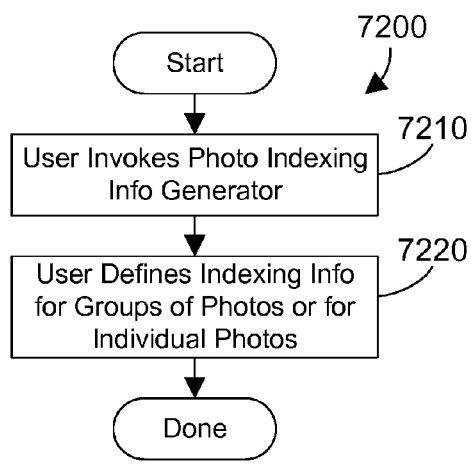
FIG. 72

Photo Search Engine — 7600

Date: from: ☐ to: ☐

Event: ☐

Location: ☐

People: ☐

Relationship: ☐

Photographer: ☐

FIG. 76

| Sample Photo Queries |
|---|
| Photos of grandchildren of Jim Jones between the ages of 6-18 months |
| Photos of wedding of Sandy Jones |
| Photos Taken at Lake House in 2010 |

FIG. 77

Photo Share Engine — 7800

<Criteria for Photos to Share>

Share with: ☐

Share Metadata: Y/N

Share Indexing Info: Y/N

FIG. 78

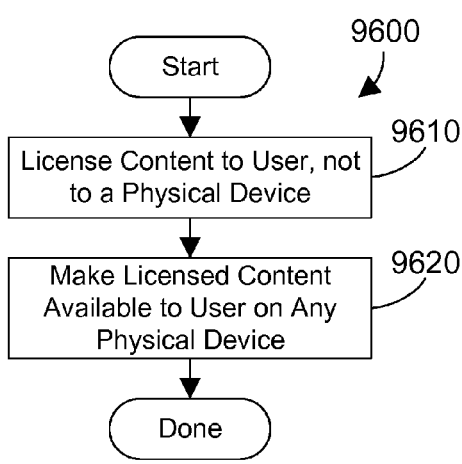
FIG. 96
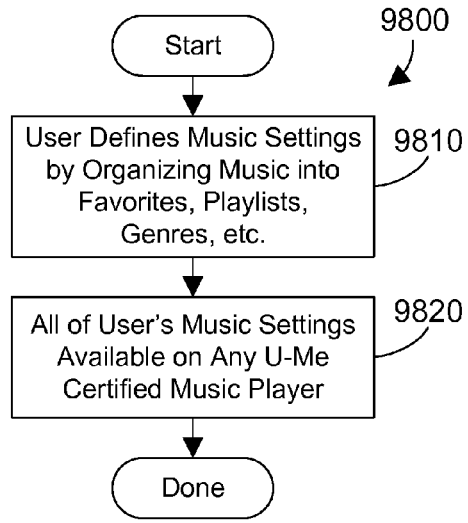
FIG. 98
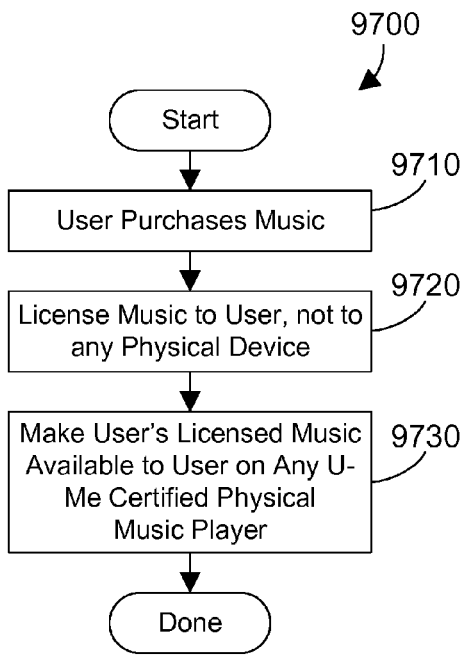
FIG. 97
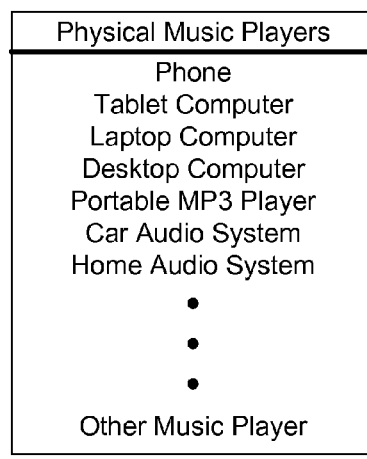
FIG. 99
| Available Music Licenses for Song1 ||
| Period | Price |
| --- | --- |
| 1 week | $0.49 |
| 1 year | $0.89 |
| 5 years | $1.29 |
| Life | $1.59 |
| Perpetual | $1.99 |
FIG. 100

11900

| Weather Alert Interface | |
|---|---|
| Alert Type: | Tornado Warning |
| Geographic Region: | This County and Neighboring Counties |
| Time of Day: | Any |
| Priority: | High |
| Send Alert to: | All devices, all message types |

| Weather Alert Interface | |
|---|---|
| Alert Type: | Flash Flood Watch |
| Geographic Region: | 10 mile radius of my current location |
| Time of Day: | Any |
| Priority: | Low |
| Send Alert to: | E-mail, Text |

| Weather Alert Interface | |
|---|---|
| Alert Type: | Wind Chill Watch |
| Geographic Region: | 50 mile radius of my current location |
| Time of Day: | Any |
| Priority: | Low |
| Send Alert to: | E-mail, Text |

FIG. 122

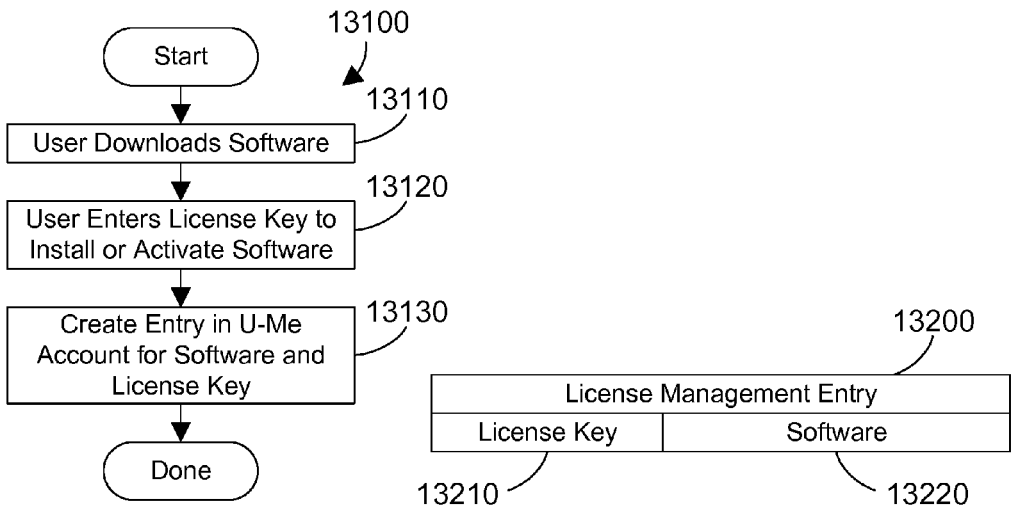

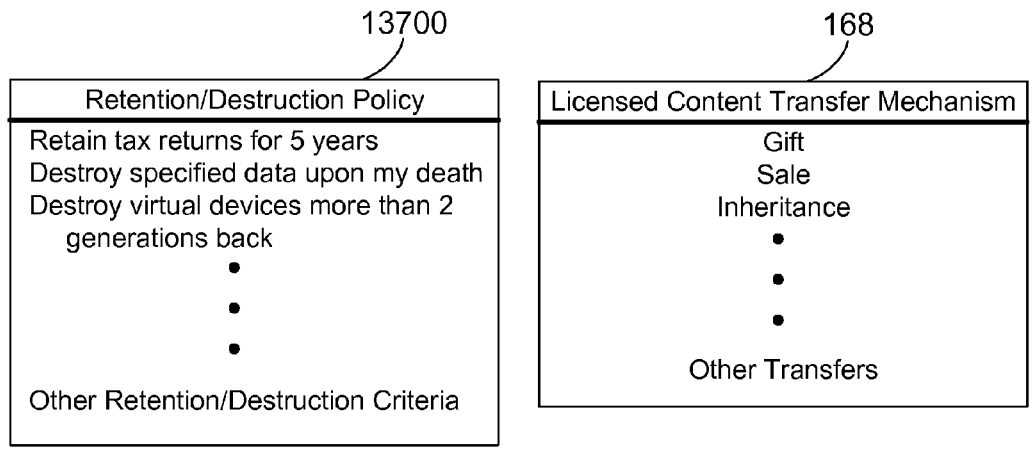
FIG. 137
FIG. 138
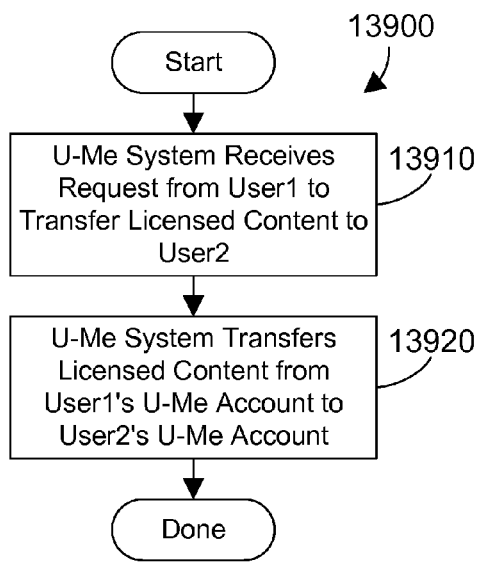
FIG. 139
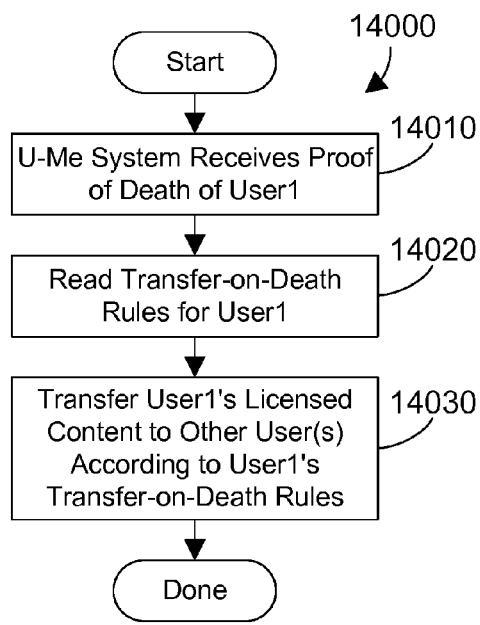
FIG. 140

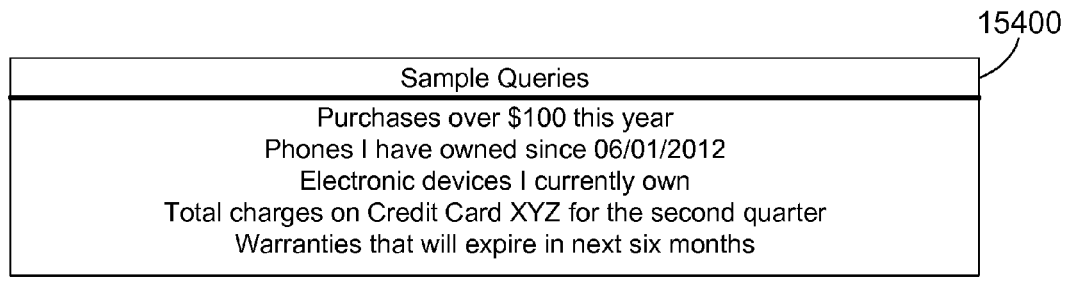
FIG. 154
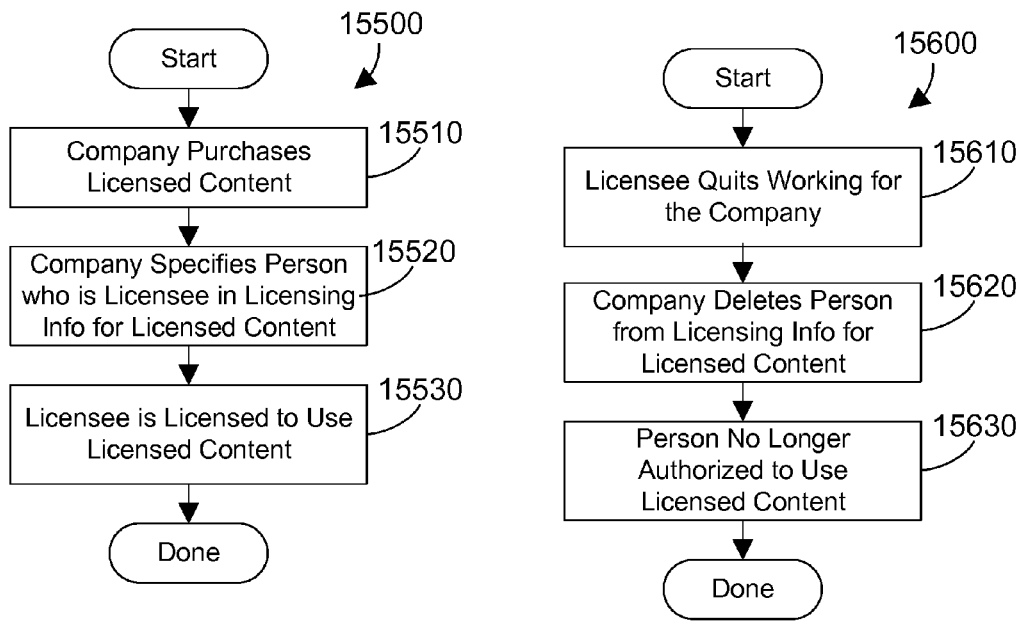
FIG. 155
FIG. 156

MAKING A USER'S DATA, SETTINGS, AND LICENSED CONTENT AVAILABLE IN THE CLOUD

BACKGROUND

1. Technical Field

This disclosure generally relates to computer systems, and more specifically relates to making information relating to a user available in the cloud.

2. Background Art

Modern technology has greatly simplified many aspects of our lives. For example, the Internet has made vast amounts of information available at the click of a mouse. Smart phones allow not only making phone calls, but also provide a mobile computing platform by providing the ability to run apps, view e-mail, and access many different types of information, including calendar, contacts, etc.

Some cloud-based services allow storing data in the cloud, and providing access to that data from any device that has Internet access. Dropbox is an example of a cloud-based file service. A subscriber to Dropbox defines a file folder that is synchronized to the cloud, then all data written to the file folder will be automatically stored in the cloud, making that data automatically available to the user via any device that has an Internet connection. While services like Dropbox are very useful, they have their drawbacks. For example, a Dropbox user must remember to store data in a Dropbox folder or sub-folder. Many different software applications have default settings that save files to a folder that may not be a Dropbox folder. The user must know to change the default folder settings to a Dropbox folder if the data is to be available via Dropbox. But many users lack the knowledge or sophistication to realize all the changes that need to be made to a computer to assure all of the user's data is stored to Dropbox. As a result, if the user's hard drive crashes and data is not recoverable from the hard drive, the user may discover some of their data was not stored to a Dropbox folder or sub-folder, resulting in loss of that data when the hard drive crashed.

The evolution of modern technology has resulted in a world that is "device-centric." This means each device must be configured to a user's needs. If a user owns a smart phone, tablet computer, and laptop computer, the user must take the time to configure each of these devices to his or her liking. This effort represents a significant investment of time for the user. For example, let's assume a user has been using the iPhone 4 for over a year, and decides to change to the Samsung Galaxy S4 phone. Depending on the vendor of the Samsung Galaxy S4 phone, the vendor may be able to transfer the phone contacts on the iPhone 4 to the new Samsung phone, but none of the apps or other data can be transferred. As a result, the decision to change to a new smart phone platform will require hours of time for the user to download apps and configure the new phone to his or her liking. The same problem exists when a user buys a new computer. The user must take the time to install all the software the user wants to use on the computer, and must take the time to configure the desired settings and preferences on the new computer. Again, this can be a very time-consuming proposition. It is not unusual for a user to spend many hours installing software and configuring a new computer system to his or her liking. For professionals who do not have the support of an IT department, taking the time to configure a new computer system either takes hours out of their work day, or takes hours of their personal time after work. In either case, the user loses hours of valuable time setting up a new computer system.

Not only must a user configure each of his or her devices, the configuration and capabilities of each device differ greatly. Apps installed on a smart phone are not made to run on a laptop or desktop computer. Software installed on a desktop or laptop computer are not made to run on smart phones. The result is the user must configure each device and install the software or apps to make the device as functional as the user needs it to be. This requires significant thought and expertise from the user to know how to configure each device.

BRIEF SUMMARY

A cloud-based computer system changes the modern paradigm from being device-centric to being person-centric. The system makes all user data, settings, and licensed content for a user available in the cloud. The system includes a conversion mechanism that can convert information intended for one device type to a different device type. Thus, a user changing smart phone platforms can convert their current smart phone settings to equivalent settings on the new phone platform, and their new phone can then be configured using the user's converted settings stored in the cloud. By storing all the user's relevant information in the cloud, this information may be accessed by the user anywhere and may be used to configure a number of different devices according to the user's data and settings.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 13 is a block diagram showing examples of laptop templates;

FIG. 14 is a block diagram showing examples of desktop templates;

FIG. 19 is a block diagram showing examples of gaming system templates;

FIG. 20 is a block diagram showing examples of audio system templates;

FIG. 31 is a table showing mapping of some channel numbers for DirecTV to channel numbers for Dish Network;

FIG. 32 is a table showing examples of user television settings;

FIG. 33 is a flow diagram of a method for converting channel numbers for Dish Network to channel numbers for DirecTV;

FIG. 41 is a flow diagram of a method for sending and storing an eReceipt for one specific example;

FIG. 42 is a flow diagram of a method for changing a timed warranty link;

FIG. 43 is one suitable example of programming for a timed warranty link;

FIG. 69 shows examples of photo metadata;

FIG. 70 is a flow diagram of a method for adding location name to indexing information for a photo;

FIG. 71 is a flow diagram of a method for storing photos that were scanned from hard copy photos with indexing information;

FIG. 72 is a flow diagram of a method for a user to define indexing info for one or more photos at the same time;

FIG. 76 shows a screen for an example of a photo search engine;

FIG. 77 shows examples of photo queries that could be formulated in the photo search engine shown in FIG. 76;

FIG. 78 shows a screen for an example photo share engine;

FIG. 96 is a flow diagram of a method for licensing licensed content to a user, not to a physical device, then making the licensed content available to the user on any device;

FIG. 97 is a flow diagram of a method for licensing music to a user, not to a physical device, then making the music available to the user on any device that can play music;

FIG. 98 is a flow diagram of a method for making a user's music settings in the user's U-Me account available on any suitable music player;

FIG. 99 shows examples of suitable music players;

FIG. 100 shows license pricing that varies according to the length of the license;

FIG. 120 shows the interface in FIG. 119 with data that defines a weather alert for a tornado warning;

FIG. 121 shows the interface in FIG. 119 with data that defines a weather alert for a flash flood watch;

FIG. 122 shows the interface in FIG. 119 with data that defines a weather alert for a wind chill watch;

FIG. 130 is a block diagram showing one specific example of home automation settings;

FIG. 131 is a flow diagram of a method for the U-Me system to track a user's software and license information;

FIG. 132 is an example of a license management entry that stores a license key with the software;

FIG. 137 is a block diagram showing examples of retention/destruction criteria that could be defined in a retention/destruction policy;

FIG. 138 is a block diagram showing examples of transfers that could be made within the U-Me system between users;

FIG. 139 is a flow diagram of a method for a user to transfer licensed content to a different user;

FIG. 140 is a flow diagram of a method for the U-Me system to transfer upon the death of one user the user's licensed content to other user(s);

FIG. 154 shows examples of queries that could be formulated in the data search engine;

FIG. 155 is a flow diagram of a method for a company to identify a person who is the licensee of software purchased by the company;

FIG. 156 is a flow diagram of a method for a company to revoke the license of a person to software purchased by the company;

DETAILED DESCRIPTION

Figure 1:
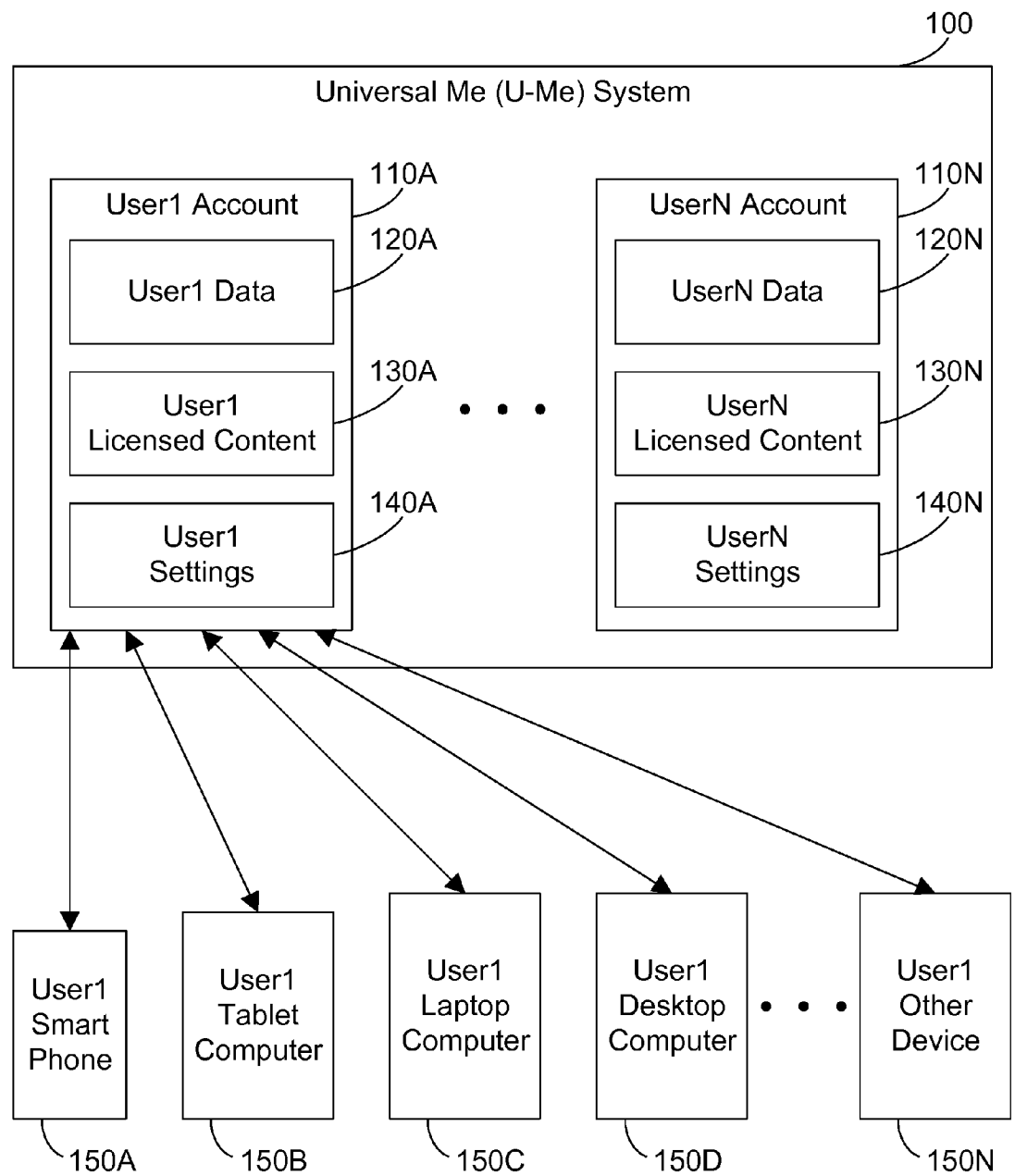
FIG. 1 is block diagram showing the Universal Me (U-Me) system.

The evolution of technology has resulted in a device-centric world. Early desktop computer systems allowed a user to define certain settings or preferences that defined how the computer system functioned. This trend has continued to our modern times. Each computer system allows installing software according to the user's needs, and allows setting numerous settings or preferences that define how the computer system functions. A user who buys a new computer system typically must spend many hours installing software and setting user preferences and settings to get the computer system to a state where it is usable according to the user's needs.

The same device-centric approach has been used with cell phones, and now with smart phones. When a user purchases a new phone, the user typically must spend many hours installing apps and setting the appropriate preferences and settings so the smart phone will perform the functions the user desires. Some phone vendors provide a service that can transfer a person's contacts from their old phone to the new phone, and some provide a backup service for those contacts should the person lose or damage their phone. This backup service, however, typically backs up only the contacts, and does not back up apps or settings on the phone. Thus, even with the backup service, when a user gets a new phone, the user still spends hours downloading and installing apps, ringtones, etc. and setting all the system settings to configure the phone to the user's liking.

While many aspects of modern life have been simplified through the use of technology, other aspects have yet to take advantage of technology in a significant way. For example, let's assume a person is watching television (TV), and the TV has a failure that causes the TV to quit working. The user may then try to remember where she bought the TV, when she bought the TV, and whether the TV is still under warranty. The user must typically then locate a stack or file of paper receipts, then go through the stack or file hoping to find the paper receipt for the TV. Even when the user is able to locate the paper receipt, the receipt itself may not indicate the warranty information for the TV. She may have to search for the hard copy documentation she received with the TV. In the alternative, she could contact the store or the manufacturer to determine the warranty for the TV. And when the TV is under warranty, the user will have to make a photocopy of the receipt and send the copy of the receipt with the TV when the TV is returned for warranty service. This system of paper receipts is grossly inefficient, and does not benefit from technology available today.

One aspect of modern life that has been greatly simplified through the use of technology is how music is purchased and used. Apple's iPod was a revolutionary device that allowed storing a large number of songs, which the user may listen to at his or her convenience. To satisfy concerns in the music industry regarding the ease of pirating (performing illegal copying) of digital music files, Apple developed the iTunes software application that allows a user to purchase music, which is stored on the user's computer system in their iTunes account. This music may be copied from the computer system to a suitable Apple device, such as an iPod or iPad. However, music from an iPod or iPad cannot be copied to the user's computer because this would make illegal copying of music very easy. Thus, all of a user's music is stored in the user's computer system in their iTunes software. So what happens when the user's hard drive crashes? Recovering the music in an iTunes account that was on a hard drive that crashed is not an easy process. This is because the iTunes account is tied to the computer system on which iTunes is installed. This shows that iTunes is device-centric as well, which means if the device that hosts iTunes crashes, the music that was stored on the device is difficult to recover.

Another aspect of our modern life that has not fully taken advantage of modern technology is data storage and retrieval. As referenced in the Background section above, Dropbox is an online service that allows storing information to the cloud. However, Dropbox is based on the folder/subfolder (or directory/subdirectory) paradigm. Thus, when using Dropbox, the user must remember to store the data in a Dropbox folder or subfolder, and then must also store the data in a location and use a file name the user is likely to remember. Relying on the memory of a user to remember where the user stored something on a computer system is very inefficient and error-prone. Many users have experienced storing a file to their computer system, then having to search many files across many directories in an attempt to locate the file they stored. Database systems provide very structured ways of storing information, which results in supporting very powerful ways of retrieving information in the database via queries. However, these powerful database tools for storing and retrieving information have not been employed in helping most users to store and retrieve information on their computer systems or smart phones.

Photography is an area that has greatly benefited from modern technology. Digital cameras and cell phones allow capturing very high-resolution photographs and video in digital form that can be easily stored to an electronic device. While photography itself has been revolutionized by technology, the technology for storing and retrieving photographs has lagged far behind. Many people who have used digital cameras for years have many directories or folders on a computer system that contain thousands of digital photos and videos. When a person uses a digital camera or cell phone to take a photo, the device typically names the photo with a cryptic name that includes a number that is sequential. For example, a Nikon camera may name a photo file with a name such as "DSC_0012.jpg.". The digital file for the next photo is the next number in sequence, such as DSC_0013.jpg. Once the photo files are transferred to a computer and are deleted on the digital camera or cell phone, the digital camera or cell phone may reuse file names that were used previously. To avoid overwriting existing photos, many users choose to create a new directory or folder each time photos are downloaded from a camera or cell phone. This results in two significant problems. First, the file name for a photo may be shared by multiple photos in multiple directories. Second, the names of files give the user no information regarding the photo. Thus, to locate a particular photo of interest, the user may have to navigate a large number of directories, searching thumbnails of the photos in each directory to locate the desired photo. This is grossly inefficient and relies on the memory of the user to locate a desired photo. A user can more efficiently locate photos if the user takes the time to carefully name directories or folders and also takes the time to carefully name individual photo files. But this is very time-consuming, and most users don't take the time needed to name folders and photo files in a way that would make retrieval of the photos easier. Most people who take digital photos have thousands of photos that have cryptic names in dozens or hundreds of different directories or folders that may also have cryptic names. The result is that finding a particular photo may be very difficult.

While there are programs that allow organizing digital photos, they have not gained widespread acceptance due to their expense and the time required and difficulty for a user to organize their photos using these programs. As a result, these programs have done little to address the widespread problem of most users having thousands of digital photos that are stored using cryptic names in many different directories or folders, making retrieval of photographs difficult.

The disclosure herein presents a paradigm shift, from the device-centric world we live in today, to a person-centric world. This shift gives rise to many different opportunities that are not available in the world we live in today. A system called Universal Me (U-Me) disclosed herein is a cloud-based system that is person-centric. The U-Me system makes a user's data, licensed content and settings available in the cloud to any suitable device that user may choose to use.

Referring to FIG. 1, the Universal Me (U-Me) system 100 includes multiple user accounts 110, shown in FIG. 1 as 110A, . . . , 110N. Each user account includes data, licensed content, and settings that correspond to the user. Thus, User1 account 110A includes corresponding data 120A, licensed content 130A, and settings 140A. In similar fashion, UserN account 110N includes corresponding data 120N, licensed content 130N, and settings 140N. Any or all of the user's data, licensed content and settings may be made available on any device 150 the user may use. Examples of suitable devices are shown in FIG. 1 to include a smart phone 150A, a tablet computer 150B, a laptop computer 150C, a desktop computer 150D, and other device 150N. The devices shown in FIG. 1 are examples of suitable devices the user could use to access any of the data, licensed content, or settings in the user's account. The disclosure and claims herein expressly extend to using any type of device to access the user's data, licensed content, or settings, whether the device is currently known or developed in the future.

Figure 2:
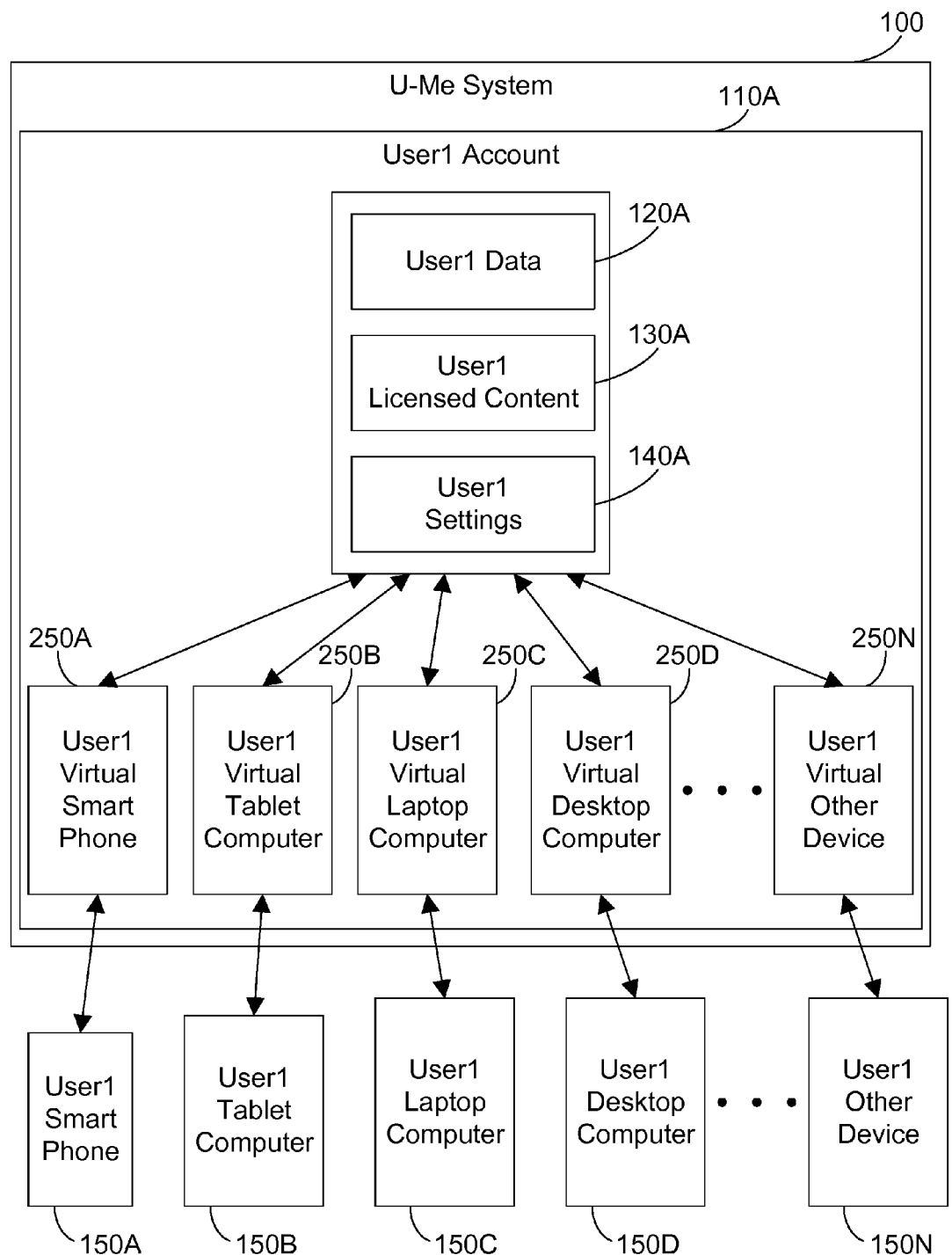
FIG. 2 is block diagram showing additional details of the U-Me system.

The U-Me system 100 may include virtual devices in a user's account. Referring to FIG. 2, the User1 account 110A is shown to include a virtual smart phone 250A that corresponds to the physical smart phone 150A; a virtual tablet computer 250B that corresponds to the physical tablet computer 150B; a virtual laptop computer 250C that corresponds to the physical laptop computer 150C; a virtual desktop computer 250D that corresponds to a physical desktop computer 150D; and a virtual other device 250N that corresponds to a physical other device 150N. The virtual devices preferably include all information that makes a physical device function, including operating system software and settings, software applications (including apps) and their settings, and user settings. It may be impossible due to access limitations on the physical device to copy all the information that makes the physical device function. For example, the operating system may not allow for the operating system code to be copied. The virtual devices contain as much information as they are allowed to contain by the physical devices. In the most preferred implementation, the virtual devices contain all information that makes the physical devices function. In this scenario, if a user accidentally flushes his smart phone down the toilet, the user can purchase a new smart phone, and all the needed information to configure the new smart phone exactly as the old one is available in the virtual smart phone stored in the user's U-Me account. Once the user downloads a U-Me app on the new smart phone, the phone will connect to the user's U-Me account, authenticate the user, and the user will then have the option of configuring the new device exactly as the old device was configured using the information in the virtual smart phone in the user's U-Me account.

Figure 3:
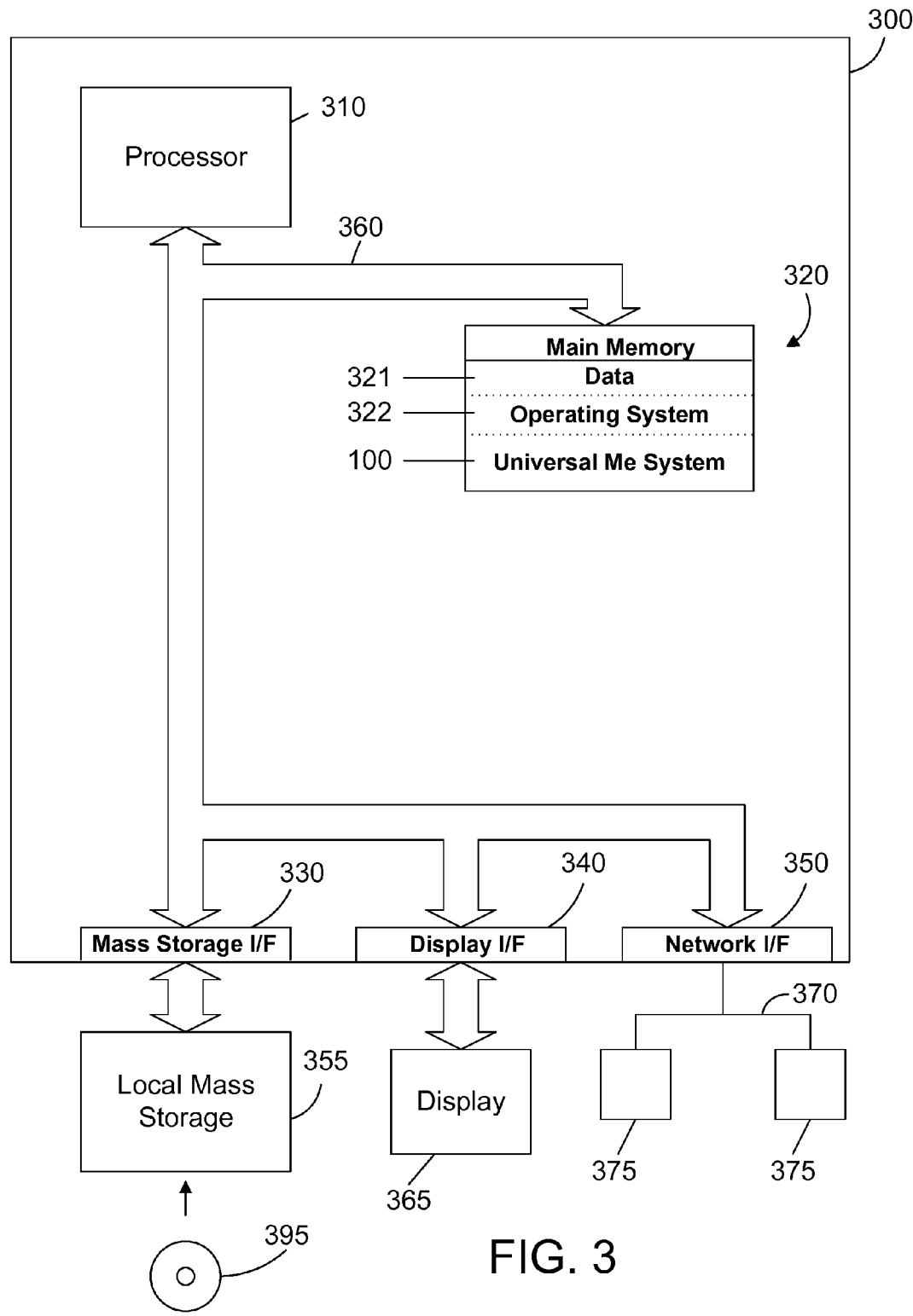
FIG. 3 is block diagram showing a computer system that runs the U-Me system.

FIG. 2 in conjunction with FIG. 3 supports a computer-implemented method executing on at least one processor comprising the steps of storing user data corresponding to a first user, storing first user settings corresponding to the first user for a plurality of software applications, storing second user settings corresponding to the first user for a plurality of physical devices, and making the user data, the first user settings, and the second user settings available to the first user on a first device used by the first user.

There may be some software on a physical device that cannot be copied to the corresponding virtual device. When this is the case, the U-Me account will prompt the user with a list of things to do before the new physical device can be configured using the data in the virtual device. For example, if the user had just applied an operating system update and the new phone did not include that update, the user will be prompted to update the operating system before continuing. If an app installed on the old phone cannot be copied to the user's U-Me account, the U-Me app could prompt the user to install the app before the rest of the phone can be configured. The virtual device preferably contains as much information as possible for configuring the new device, but when information is missing, the U-Me system prompts the user to perform certain tasks as prerequisites. Once the tasks have been performed by the user, the U-Me system can take over and configure the phone using the information stored in the corresponding virtual device.

Referring to FIG. 3, a computer system 300 is an example of one suitable computer system that could host the universal me system 100. Server computer system 300 is an IBM System i computer system. However, those skilled in the art will appreciate that the disclosure and claims herein apply equally to any computer system, regardless of whether the computer system is a complicated multi-user computing apparatus, a single user workstation, or an embedded control system. As shown in FIG. 3, computer system 300 comprises one or more processors 310, a main memory 320, a mass storage interface 330, a display interface 340, and a network interface 350. These system components are interconnected through the use of a system bus 360. Mass storage interface 330 is used to connect mass storage devices, such as local mass storage device 355, to computer system 300. One specific type of local mass storage device 355 is a readable and writable CD-RW drive, which may store data to and read data from a CD-RW 395.

Main memory 320 preferably contains data 321, an operating system 322, and the Universal Me System 100. Data 121 represents any data that serves as input to or output from any program in computer system 100. Operating system 322 is a multitasking operating system. The Universal Me System 100 is the cloud-based system described in detail in this specification. The Universal Me System 100 as shown in FIG. 3 is a software mechanism that provides all of the functionality of the U-Me system.

FIG. 3 in conjunction with FIG. 1 thus shows a computer system comprising at least one processor, a memory coupled to the at least one processor, user data residing in the memory corresponding to a first user, first user settings corresponding to the first user for a plurality of software applications residing in the memory, second user settings corresponding to the first user for a plurality of hardware devices, and a software mechanism executed by the at least one processor that makes the user data, the first user settings, and the second user settings available to the first user on a first device used by the first user.

Computer system 300 utilizes well known virtual addressing mechanisms that allow the programs of computer system 300 to behave as if they only have access to a large, contiguous address space instead of access to multiple, smaller storage entities such as main memory 320 and local mass storage device 355. Therefore, while data 321, operating system 322, and Universal Me System 100 are shown to reside in main memory 320, those skilled in the art will recognize that these items are not necessarily all completely contained in main memory 320 at the same time. It should also be noted that the term "memory" is used herein generically to refer to the entire virtual memory of computer system 300, and may include the virtual memory of other computer systems coupled to computer system 300.

Processor 310 may be constructed from one or more microprocessors and/or integrated circuits. Processor 310 executes program instructions stored in main memory 320. Main memory 320 stores programs and data that processor 310 may access. When computer system 300 starts up, processor 310 initially executes the program instructions that make up the operating system 322. Processor 310 also executes the Universal Me System 100.

Although computer system 300 is shown to contain only a single processor and a single system bus, those skilled in the art will appreciate that the universal me system may be practiced using a computer system that has multiple processors and/or multiple buses. In addition, the interfaces that are used preferably each include separate, fully programmed microprocessors that are used to off-load compute-intensive processing from processor 310. However, those skilled in the art will appreciate that these functions may be performed using I/O adapters as well.

Display interface 340 is used to directly connect one or more displays 365 to computer system 300. These displays 365, which may be non-intelligent (i.e., dumb) terminals or fully programmable workstations, are used to provide system administrators and users the ability to communicate with computer system 300. Note, however, that while display interface 340 is provided to support communication with one or more displays 365, computer system 300 does not necessarily require a display 365, because all needed interaction with users and other processes may occur via network interface 350.

Network interface 350 is used to connect computer system 300 to other computer systems or workstations 375 via network 370. Network interface 350 broadly represents any suitable way to interconnect electronic devices, regardless of whether the network 370 comprises present-day analog and/or digital techniques or via some networking mechanism of the future. Network interface 350 preferably includes a combination of hardware and software that allow communicating on the network 370. Software in the network interface 350 preferably includes a communication manager that manages communication with other computer systems 375 via network 370 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 350.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
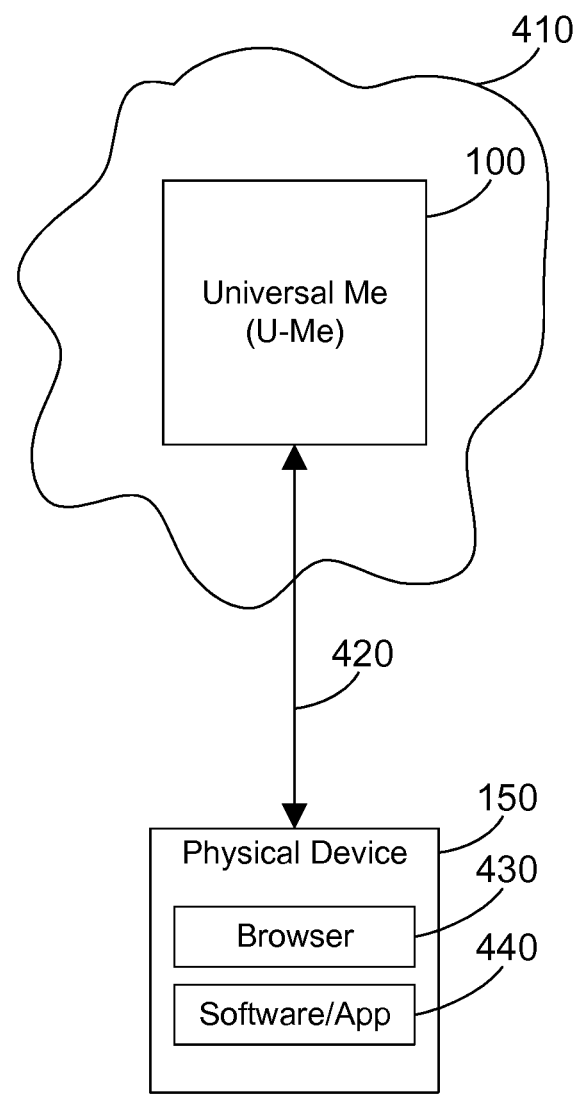
FIG. 4 is a block diagram showing how a user using a physical device can access information in the U-Me system.

FIG. 4 shows another view of a configuration for running the U-Me system 100. The U-Me system 100 runs in a cloud, shown in FIG. 4 as cloud 410. A user connects to the U-Me system 100 using some physical device 150 that may include a browser 430 and/or software 440 (such as an application or app) that allows the user to interact with the U-Me system 100. Note the physical device 150 is connected to the U-Me system 100 by a network connection 420, which is representative of network 370 shown in FIG. 3, and which can include any suitable wired or wireless network or combination of networks. The network connection 420 in the most preferred implementation is an Internet connection, which makes the U-Me system available to any physical device that has Internet access. Note, however, other types of networks may be used, such as satellite networks and wireless networks. The disclosure and claims herein expressly extend to any suitable network or connection for connecting a physical device to the U-Me system 100.

Figure 5:
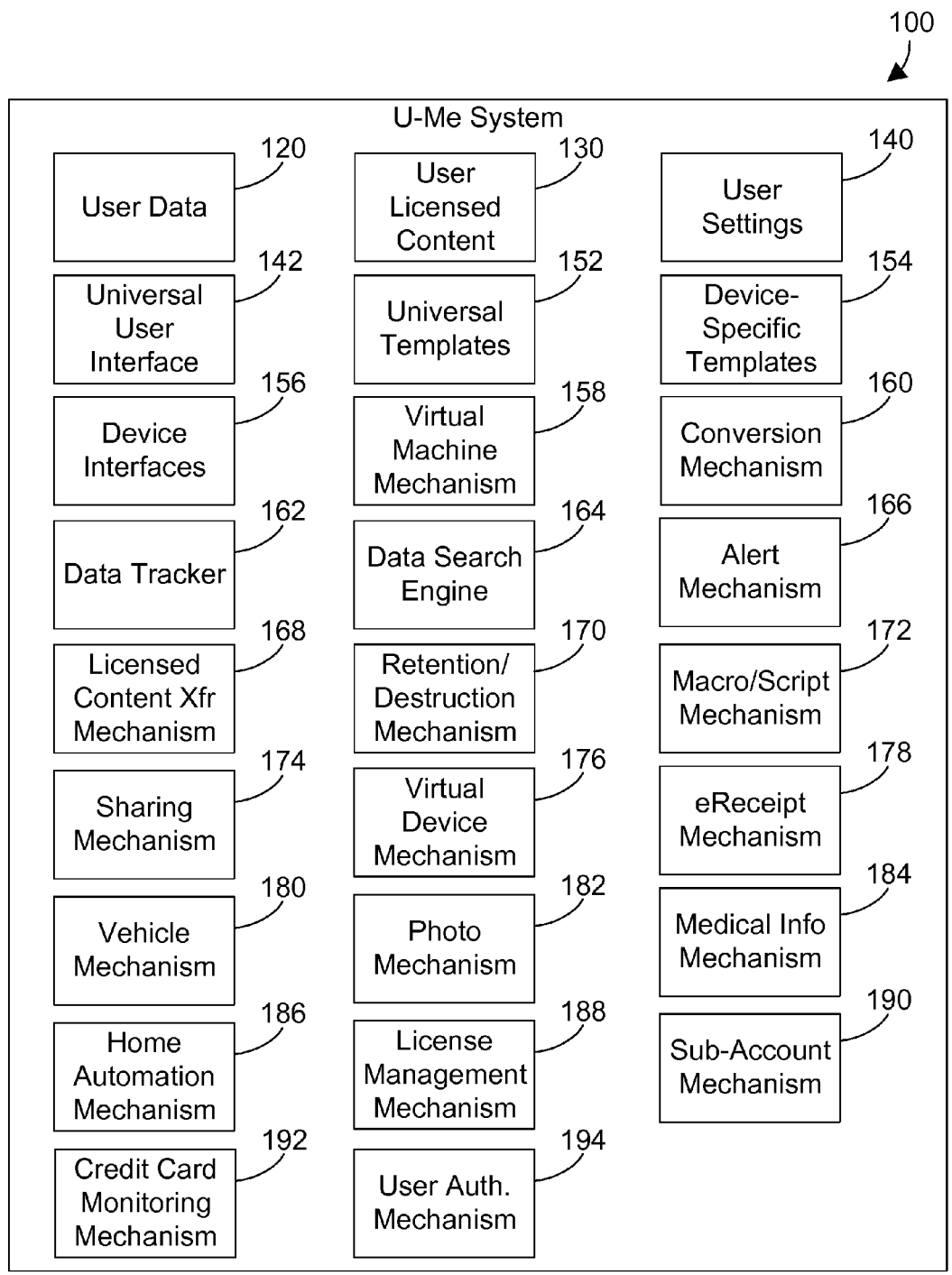
FIG. 5 is a block diagram showing various features of the U-Me system.

Various features of the U-Me system are represented in FIG. 5. U-Me system 100 includes user data 120, user licensed content 130, and user settings 140, as the specific examples in FIGS. 1 and 2 illustrate. U-Me system 100 further includes a universal user interface 142, universal templates 152, device-specific templates 154, device interfaces 156, a virtual machine mechanism 158, a conversion mechanism 160, a data tracker 162, a data search engine 164, an alert mechanism 166, a licensed content transfer mechanism 168, a retention/destruction mechanism 170, a macro/script mechanism 172, a sharing mechanism 174, a virtual device mechanism 176, an eReceipt mechanism 178, a vehicle mechanism 180, a photo mechanism 182, a medical info mechanism 184, a home automation mechanism 186, a license management mechanism 188, a sub-account mechanism 190, a credit card monitoring mechanism 192, and a user authentication mechanism 194. Each of these features is discussed in more detail below. The virtual devices 150 in FIG. 2 are preferably created and maintained by the virtual device mechanism 176 in FIG. 5.

Figure 6:
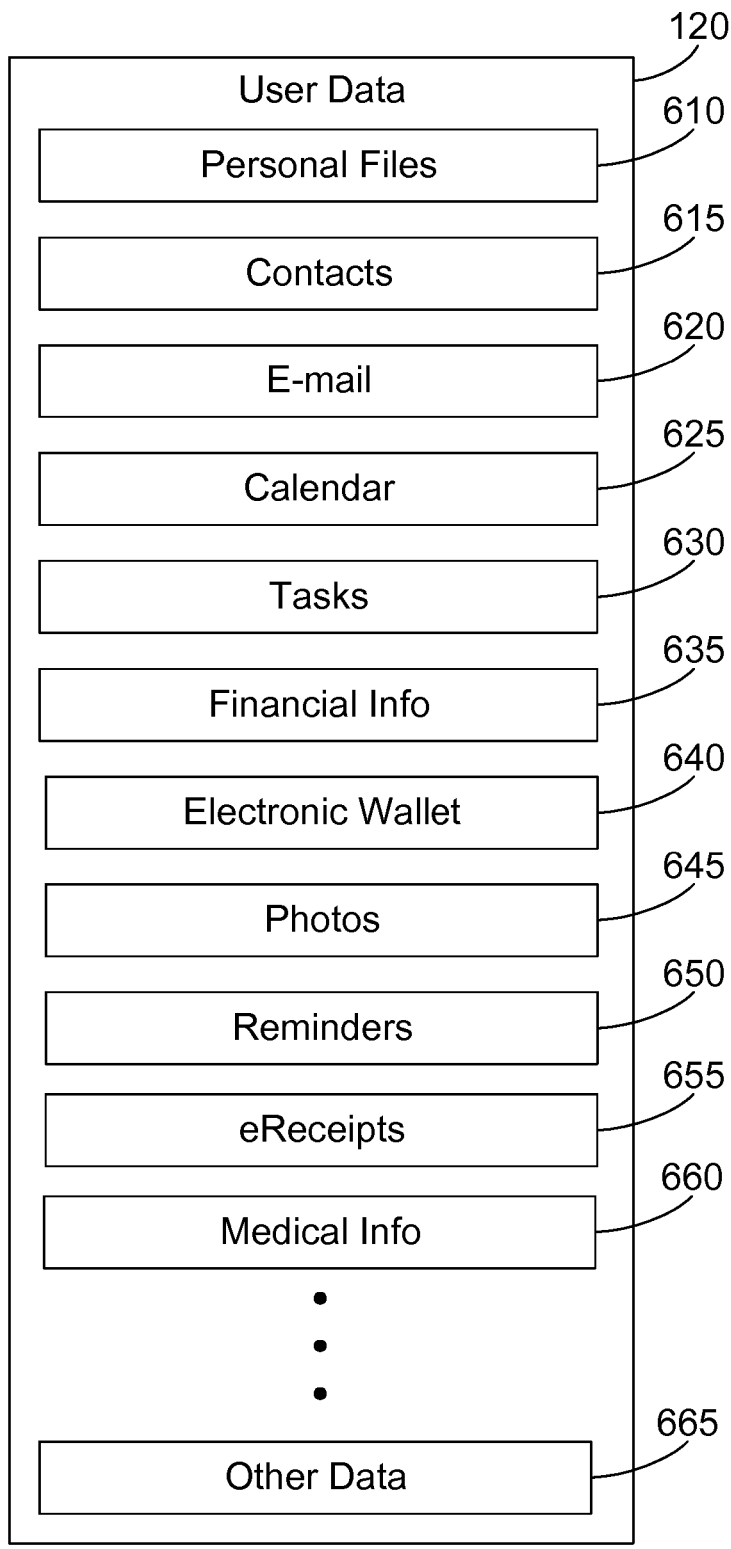
FIG. 6 is a block diagram showing examples of user data.

FIG. 6 shows some specific examples of user data 120 that could be stored in a user's U-Me account, including personal files 610, contacts 615, e-mail 620, calendar 625, tasks 630, financial info 635, an electronic wallet 640, photos 645, reminders 650, eReceipts 655, medical information 660, and other data 665. The user data shown in FIG. 6 are examples shown for the purpose of illustration. The disclosure and claims herein extend to any suitable data that can be generated by a user, generated for a user, or any other data relating in any way to the user, including data known today as well as data developed in the future.

Personal files 610 can include any files generated by the user, including word processor files, spreadsheet files, .pdf files, e-mail attachments, etc. Contacts 615 include information for a user's contacts, preferably including name, address, phone number(s), e-mail address, etc. E-mail 620 is e-mail for the user. E-mail 620 may include e-mail from a single e-mail account, or e-mail from multiple e-mail accounts. E-mail 620 may aggregate e-mails from different sources, or may separate e-mails from different sources into different categories or views. Calendar 625 includes an electronic calendar in any suitable form and format. Tasks 620 include tasks that a user may set and tasks set by the U-Me system. Financial info 625 can include any financial information relating to the user, including bank statements, tax returns, investment account information, etc. Electronic wallet 640 includes information for making electronic payments, including credit card and bank account information for the user. Google has a product for Android devices called Google Wallet. The electronic wallet 640 can include the features of known products such as Google Wallet, as well as other features not known in the art.

Photos 645 include electronic files for photographs and videos. While it is understood that a user may have videos that are separate from photographs, the term "photos" as used herein includes both photographs and videos for the sake of convenience in discussing the function of the U-Me system. Reminders 650 include any suitable reminders for the user, including reminders for events on the calendar 625, reminders for tasks 630, and reminders set by the U-Me system for other items or events. eReceipts 655 includes electronic receipts in the form of electronic files that may include warranty information and/or links that allow a user to make a warranty claim. Medical info 660 includes any suitable medical information relating to the user, including semi-private medical information, private medical information, and information provided by medical service providers, insurance companies, etc.

Figure 7:
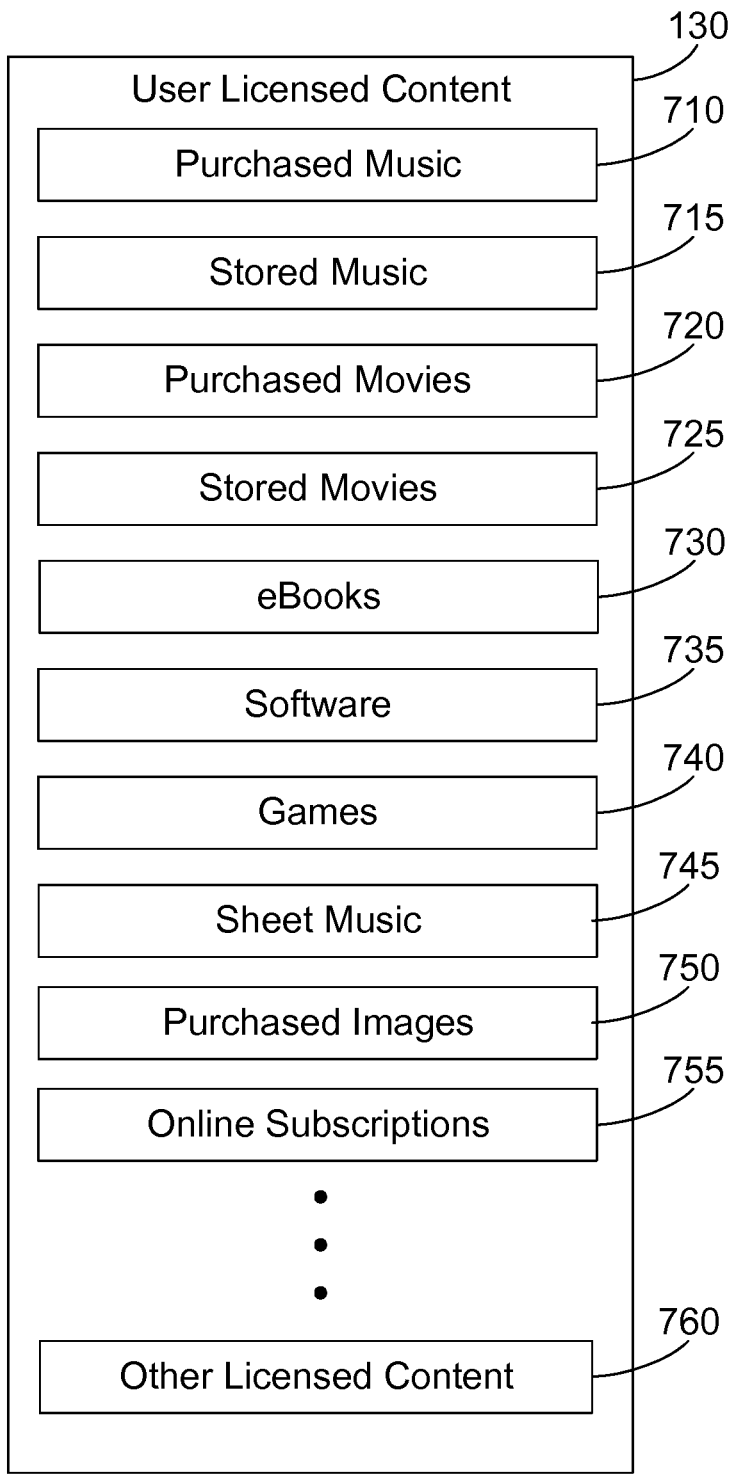
FIG. 7 is a block diagram showing examples of user licensed content.

FIG. 7 shows some specific examples of user licensed content 130 that could be stored in a user's U-Me account, including purchased music 710, stored music 715, purchased movies 720, stored movies 725, eBooks 730, software 735, games 740, sheet music 745, purchased images 750, online subscriptions 755, and other licensed content 760. The user licensed content shown in FIG. 7 are examples shown for the purpose of illustration. The disclosure and claims herein extend to any suitable user licensed content, including user licensed content known today as well as user licensed content developed in the future.

Purchased music 710 includes music that was purchased from an online source. Note the purchased music 710 could include entire music files, or could include license information that authorizes the user to stream a music file on-demand. Stored music 715 includes music the user owns and which has been put into electronic format, such as music recorded (i.e., ripped) from a compact disc. Purchased movies 720 include movies that were purchased from an online source. Note the purchased movies 720 could include an entire movie file, or could include license information that authorizes the user to stream a movie on-demand. Stored movies 725 include movies the user owns and which have been put into electronic format, such as movies recorded from a digital video disc (DVD). eBooks 730 include books for the Apple iPad, books for the Kindle Fire, and books for the Barnes & Noble Nook. Of course, eBooks 730 could include books in any suitable electronic format.

Software 735 includes software licensed to the user and/or to the user's devices. In the most preferred implementation, software is licensed to the user and not to any particular device, which makes the software available to the user on any device capable of running the software. However, software 735 may also include software licensed to a user for use on only one device, as discussed in more detail below. Software 735 may include operating system software, software applications, apps, or any other software capable of running on any device. In addition, software 735 may include a backup of all software stored on all devices used by the user. Games 740 include any suitable electronic games, including games for computer systems and any suitable gaming system. Known gaming systems include Sony Playstation, Microsoft Xbox, Nintendo Wii, and others. Games 740 may include any games for any platform, whether currently known or developed in the future. Sheet music 745 includes sheet music that has been purchased by a user and is in electronic form. This may include sheet music files that are downloaded as well as hard copy sheet music that has been scanned. Some pianos now include an electronic display screen that is capable of displaying documents such as sheet music files. If a user owns such a piano, the user could access via the piano all of the user's stored sheet music 745 in the user's U-Me account. Purchased images 750 include any images purchased by the user, including clip art, pictures, etc. Online subscriptions 755 include content generated by the user on a subscription basis by any suitable provider. For example, if a user subscribes to Time magazine online, the online subscriptions 755 could include electronic copies of Time magazine.

Figure 8:
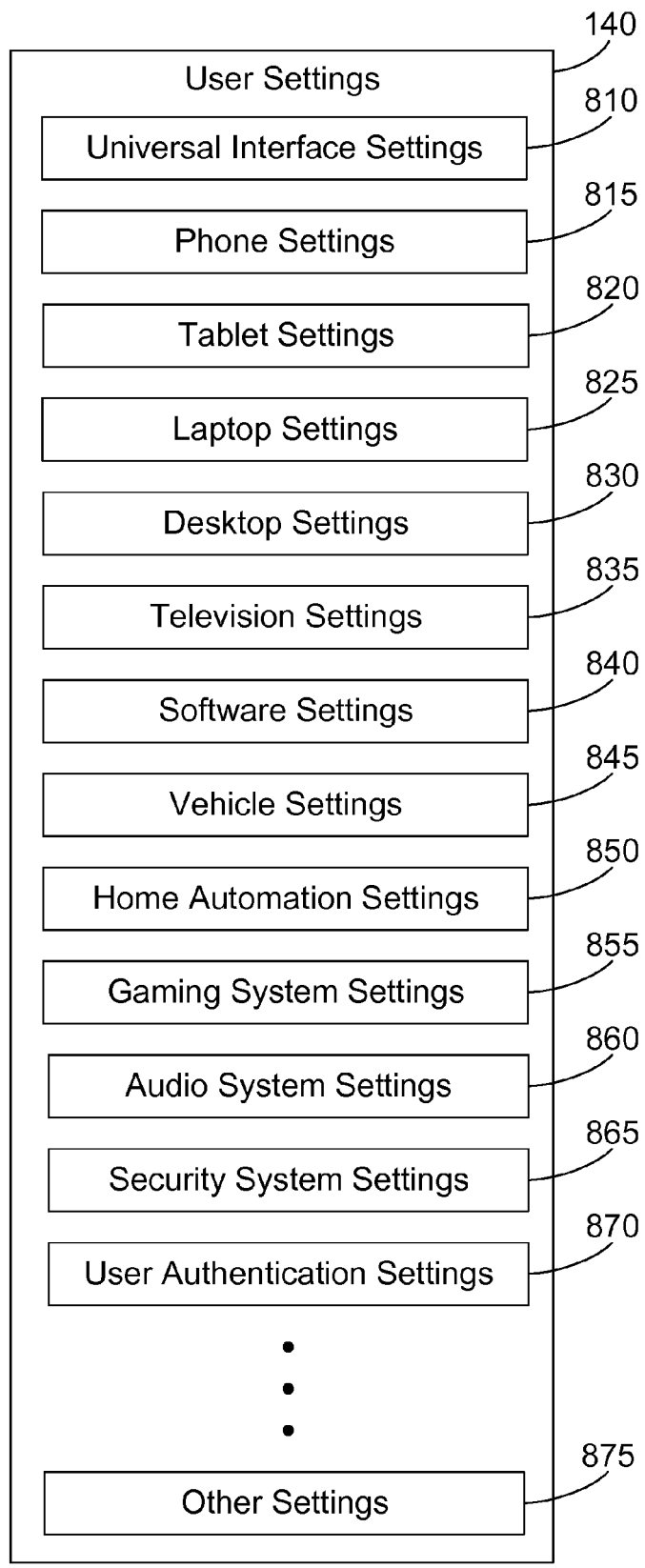
FIG. 8 is a block diagram showing examples of user settings.

FIG. 8 shows some specific examples of user settings 140 that could be stored in a user's U-Me account, including universal interface settings 810, phone settings 815, tablet settings 820, laptop settings 825, desktop settings 830, television settings 835, software settings 840, vehicle settings 845, home automation settings 850, gaming system settings 855, audio system settings 860, security system settings 865, user authentication settings 870, and other settings 875. The user settings shown in FIG. 8 are examples shown for the purpose of illustration. The software settings 840, which include user settings for software applications, include user preferences for each software application. Note the term "software application" is used herein to broadly encompass any software the user can use, whether it is operating system software, an application for a desktop, an app for a phone, or any other type of software. User settings for physical devices include user settings for each physical device. The term "physical device" is used herein to broadly any tangible device, whether currently known or developed in the future, that includes any combination of hardware and software. The disclosure and claims herein extend to any suitable user settings, including user settings known today as well as user settings developed in the future.

Universal interface settings 810 include settings for a universal interface for the U-Me system that can be presented to a user on any suitable device, which allows the user to interact with the U-Me system using that device. Phone settings 815 include settings for the user's phone, such as a smart phone. Apple iPhone and Samsung Galaxy S4 are examples of known smart phones. Tablet settings 820 include settings for the user's tablet computer. Examples of known tablet computers include the Apple iPad, Amazon Kindle, Barnes & Noble Nook, Samsung Galaxy Tab, and many others. Laptop settings 825 are settings for a laptop computer. Desktop settings 830 are settings for a desktop computer. Television settings 835 are settings for any suitable television device. For example, television settings 835 could include settings for a television, for a cable set-top box, for a satellite digital video recorder (DVR), for a remote control, and for many other television devices. Software settings 840 include settings specific to software used by the user. Examples of software settings include the configuration of a customizable menu bar on a graphics program such as Microsoft Visio; bookmarks in Google Chrome or favorites in Internet Explorer; default file directory for a word processor such as Microsoft Word; etc. Software settings 840 may include any suitable settings for software that may be defined or configured by a user.

Vehicle settings 845 include user settings relating to a vehicle, including such things as position of seats, position of mirrors, position of the steering wheel, radio presets, heat/cool settings, music playlists, and video playlists. Home automation settings 850 include settings for a home automation system, and may include settings for appliances, heating/ventilation/air conditioning (HVAC), lights, security, home theater, etc. Gaming system settings 855 include settings relating to any gaming system. Audio system settings 860 include settings for any suitable audio system, including a vehicle audio system, a home theater system, a handheld audio player, etc. The security system settings 865 may include settings for any suitable security system. User authentication settings 870 include settings related to the user's authentication to the U-Me system.

The U-Me system makes a user's data, licensed content, and settings available to the user on any device the user desires to use. This is a significant advantage for many reasons. First of all, even for people who are comfortable with technology, getting a device configured exactly as the user wants is time-consuming and often requires research to figure out how to configure the device. For example, let's assume a user installs the Google Chrome browser on a desktop computer. When the user downloads a file using Google Chrome, the downloaded file appears as a clickable icon on the lower left of the Google Chrome display. To open the file, the user clicks on the icon. Let's assume the user wants to always open .pdf files after they are downloaded. Because the user does not know how to configure Chrome to do this, the user does a quick search, and discovers that Chrome can be configured to always open .pdf files after they are downloaded by clicking on a down arrow next to the downloaded .pdf file icon, which brings up a pop-up menu, then selecting "Always open files of this type." This configures Google Chrome to always open .pdf files after they are downloaded. However, the user cannot be expected to remember this small tidbit of knowledge. If the user made this setting change to Google Chrome when the desktop computer was new, and two years passes when the user gets a new desktop computer, it is highly unlikely the user will remember how to configure Google Chrome to automatically open .pdf files after they are downloaded. In any modern device, there are dozens or perhaps hundreds of such user settings. By storing these user settings in the user's U-Me account, the user will not have to remember each and every setting the user makes in each and every device. The same is true for configuring a smart phone. Often users have to search online to figure out how to do certain things, such as setting different ringtones for different contacts. In today's world, such settings are lost when a user changes to a different phone, which requires the user repeat the learning process to configure the new phone. With the U-Me system disclosed herein, all of the user's settings are saved to the user's U-Me account, allowing a new device to be easily configured using the stored user settings.

While the previous paragraph discusses an example of a user setting in Google Chrome, similar concepts apply to user data and user licensed content. There is currently no known way to make all of a user's data, licensed content, and settings available in the cloud so this information is available to the user on any device or system the user decides to use. The Universal Me system solves this problem. The system is called Universal Me because it allows "me to be me, anywhere" for each user. Thus, a user on vacation on Italy could find an Internet café, use a computer in the Internet café to access the user's universal interface to the U-Me system, and would then have access to all of the user's data, licensed content, and settings. Similarly, the user could borrow an iPad from a friend, and have access to all the user's data, licensed content, and settings. The power and flexibility of the U-Me system leads to its usage in many different scenarios, several of which are described in detail below.

While many different categories of user settings are shown in FIG. 8, these are shown by way of example. A benefit of the U-Me system is that a user only has to configure a device once, and the configuration for that device is stored in the user's U-Me account. Replacing a device that is lost, stolen, or broken is a simple matter of buying a new similar device, then following the instructions provided by the U-Me system to configure the new device to be identical to the old device. In the most preferred implementation, the U-Me system will back up all user data, licensed content, and settings related to the device to the user's U-Me account, which will allow the U-Me system to configure the new device automatically with minimal input from the user. However, features of the devices themselves may prevent copying all the relevant data, licensed content and settings to the user's U-Me account. When this is the case, the U-Me system will provide instructions to the user regarding what steps the user needs to take before the U-Me system can configure the device with the information stored in the user's U-Me account.

Figure 9:
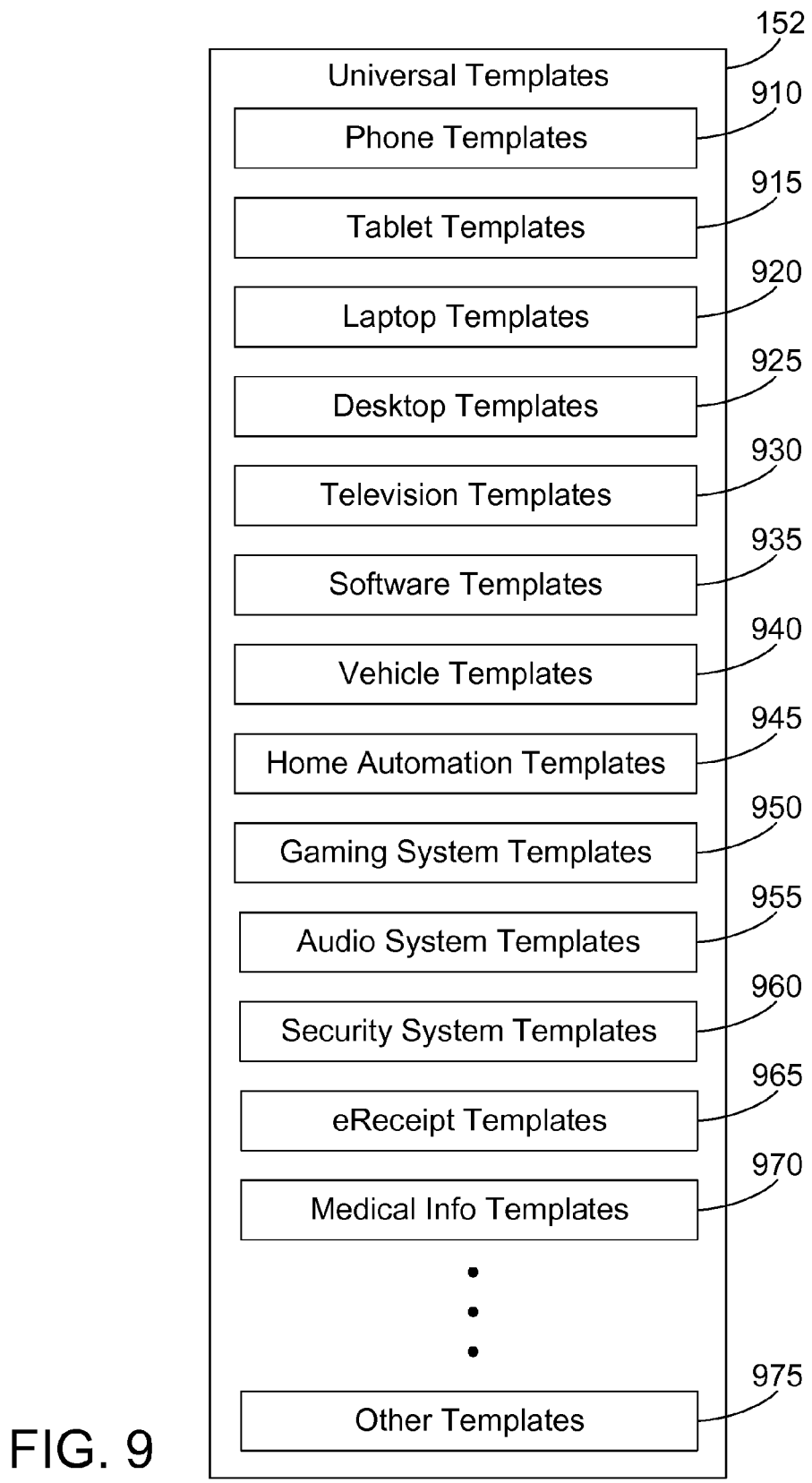
FIG. 9 is a block diagram showing examples of universal templates.

The U-Me system could use various templates that define settings for different physical devices. Referring to FIG. 9, universal templates 152 include phone templates 910, tablet templates 915, laptop templates 920, desktop templates 925, television templates 930, software templates 935, vehicle templates 940, home automation templates 945, gaming system templates 950, audio system templates 955, security system templates 960, eReceipt templates 965, medical information templates 970, and other templates 975. The universal templates shown in FIG. 9 are examples shown for the purpose of illustration. The disclosure and claims herein extend to any suitable universal templates, including universal templates related to devices known today as well as universal templates related to devices developed in the future.

The various universal templates in FIG. 9 include categories of devices that may include user settings. One of the benefits of the U-Me system is the ability for a user to store settings for any device or type of device that requires configuration by the user. This allows a user to spend time once to configure a device or type of device, and the stored settings in the user's U-Me account will allow automatically configuring identical or similar devices. The U-Me system expressly extends to storing any suitable user data and/or user licensed content and/or user settings for any suitable device in a user's U-Me account.

The universal templates 152 provide a platform-independent way of defining settings for a particular type of device. Thus, a universal phone template may be defined by a user using the U-Me system without regard to which particular phone the user currently has or plans to acquire. Because the universal templates are platform-independent, they may include settings that do not directly map to a specific physical device. Note, however, the universal templates may include information uploaded from one or more physical devices. The universal template can thus become a superset of user data, user licensed content, and user settings for multiple devices. The universal templates can also include settings that do not correspond to a particular setting on a particular device.

Figure 10:
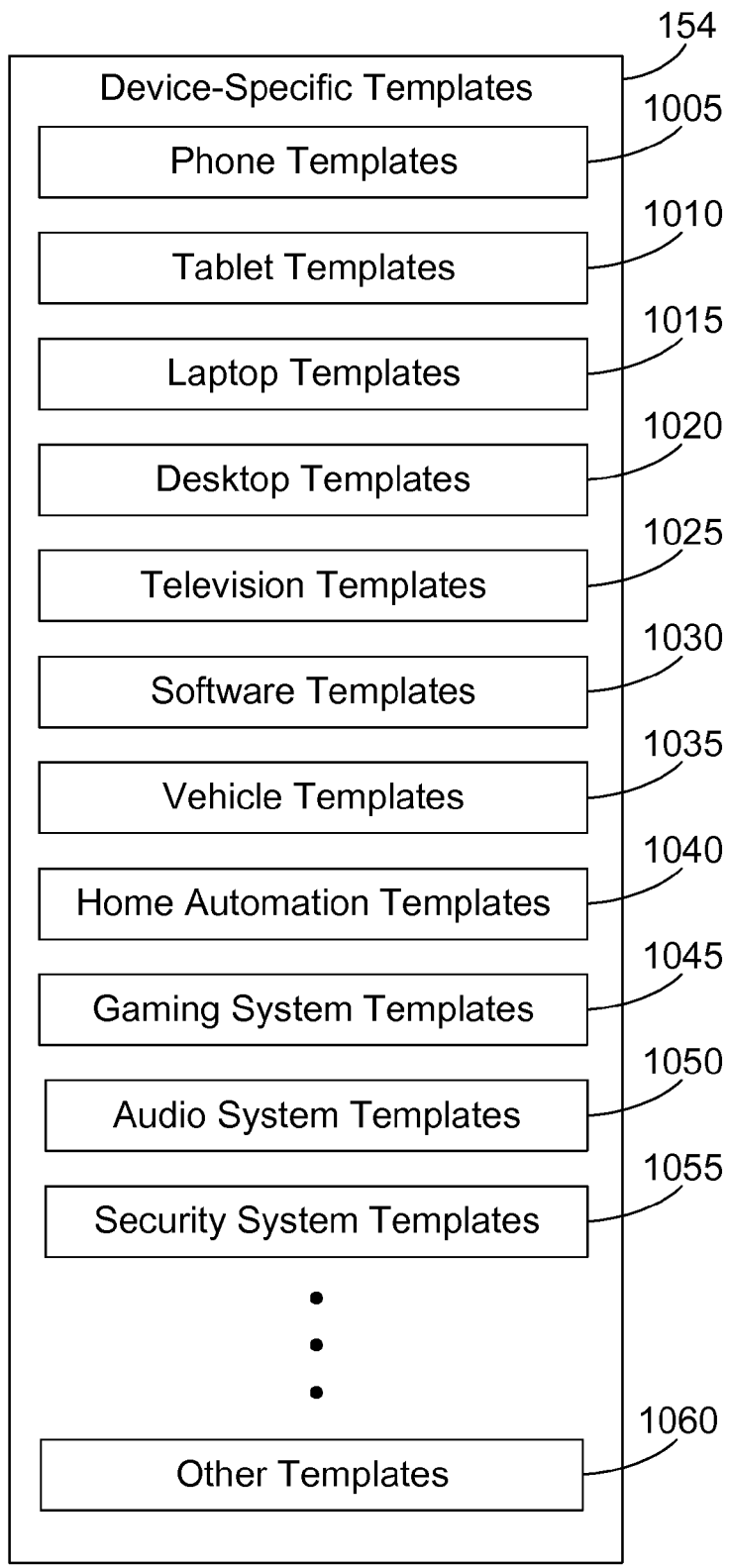
FIG. 10 is a block diagram showing examples of device-specific templates.

Referring to FIG. 10, device-specific templates 154 include phone templates 1005, tablet templates 1010, laptop templates 1015, desktop templates 1020, television templates 1025, software templates 1030, vehicle templates 1035, home automation templates 1040, gaming system templates 1045, audio system templates 1050, security system templates 1055, and other templates 1060. The device-specific templates shown in FIG. 10 are examples shown for the purpose of illustration. The disclosure and claims herein extend to any suitable device-specific templates, including device-specific templates for devices known today as well as device-specific templates for devices developed in the future.

Figures 11, 12:
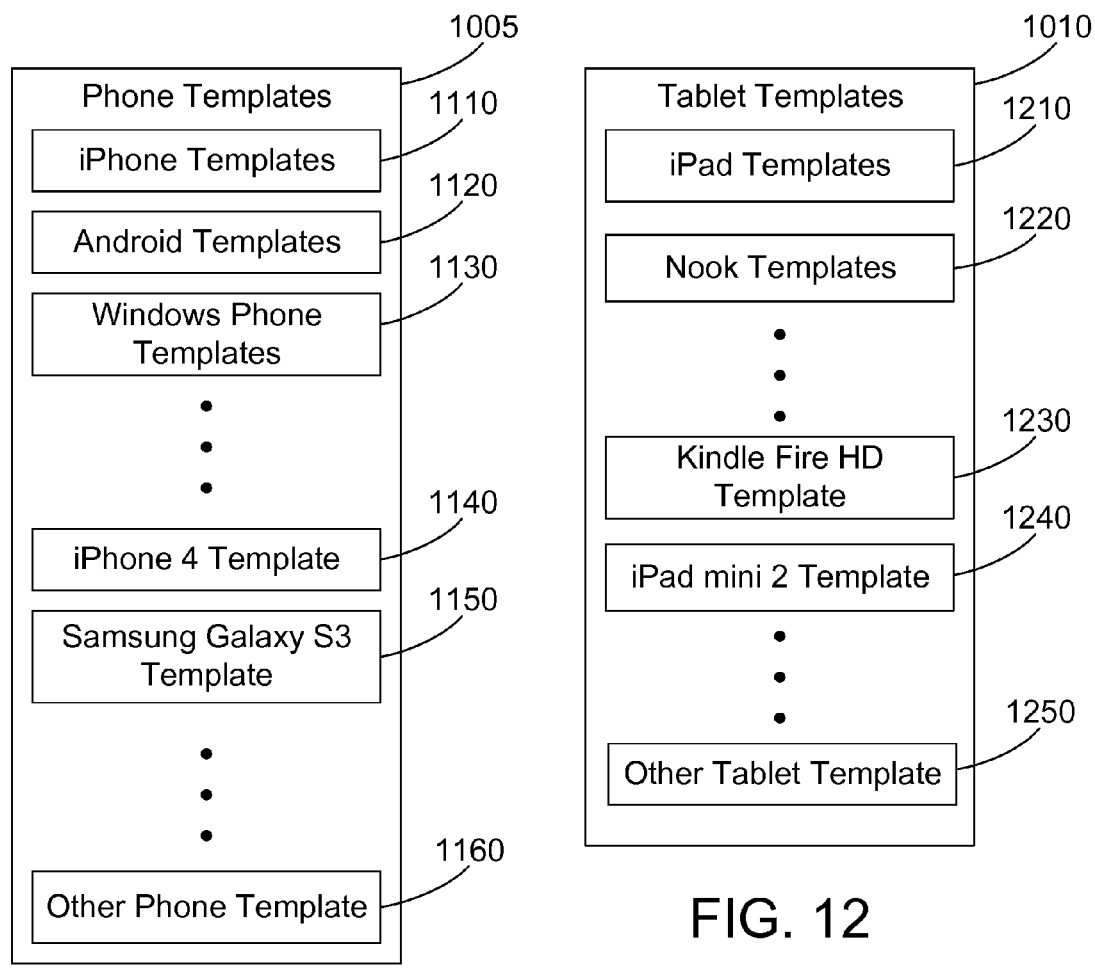
FIG. 11 is a block diagram showing examples of phone templates.
FIG. 12 is a block diagram showing examples of tablet templates.

The device-specific templates 154 provide platform-dependent templates. Thus, the user data, user licensed content, and user settings represented in a device-specific template includes specific items on a specific device or device type. The device-specific templates 154 may also include mapping information to map settings in a physical device to settings in a universal template. FIGS. 11-21 are related to device specific templates 154. Referring to FIG. 11, phone templates 1005 may include iPhone templates 1110, Android templates 1120 and Windows phone templates 1130, which represent different phone types. Phone templates 1005 may also include templates for a specific phone, such as iPhone 4 template 1140 and Samsung Galaxy S3 template 1150, as well as one or more other phone templates 1160 that may be for a phone type or for a specific phone.

Tablet templates 1010 are shown in FIG. 12 to include iPad templates 1210 and Nook templates 1220, which represent different tablet platforms. Tablet templates 1010 may also include templates for a specific tablet, such as a Kindle Fire HD template 1230 and an iPad mini 2 template 1240, as well as one or more other tablet templates 1250 that may be for a tablet type or for a specific tablet.

Laptop templates 1015 are shown in FIG. 13 to include Lenovo laptop templates 1310 and MacBook templates 1320, which represent different laptop computer types. Laptop templates 1015 may also include templates for a specific laptop, such as a Samsung Chromebook template 1330 and an HP Envy template 1340, as well as one or more other laptop templates 1350 that may be for a laptop type or for a specific laptop.

Desktop templates 1020 are shown in FIG. 14 to include HP desktop templates 1410 and Dell desktop templates 1420, which represent different laptop computer types. Desktop templates 1020 may also include templates for a specific desktop computer, such as an HP Pavilion PS-2355 desktop template 1430 and an Asus M11BB-B05 desktop template 1440, as well as one or more other desktop templates 1450 that may be for a desktop type or for a specific desktop computer.

Figures 15, 16:
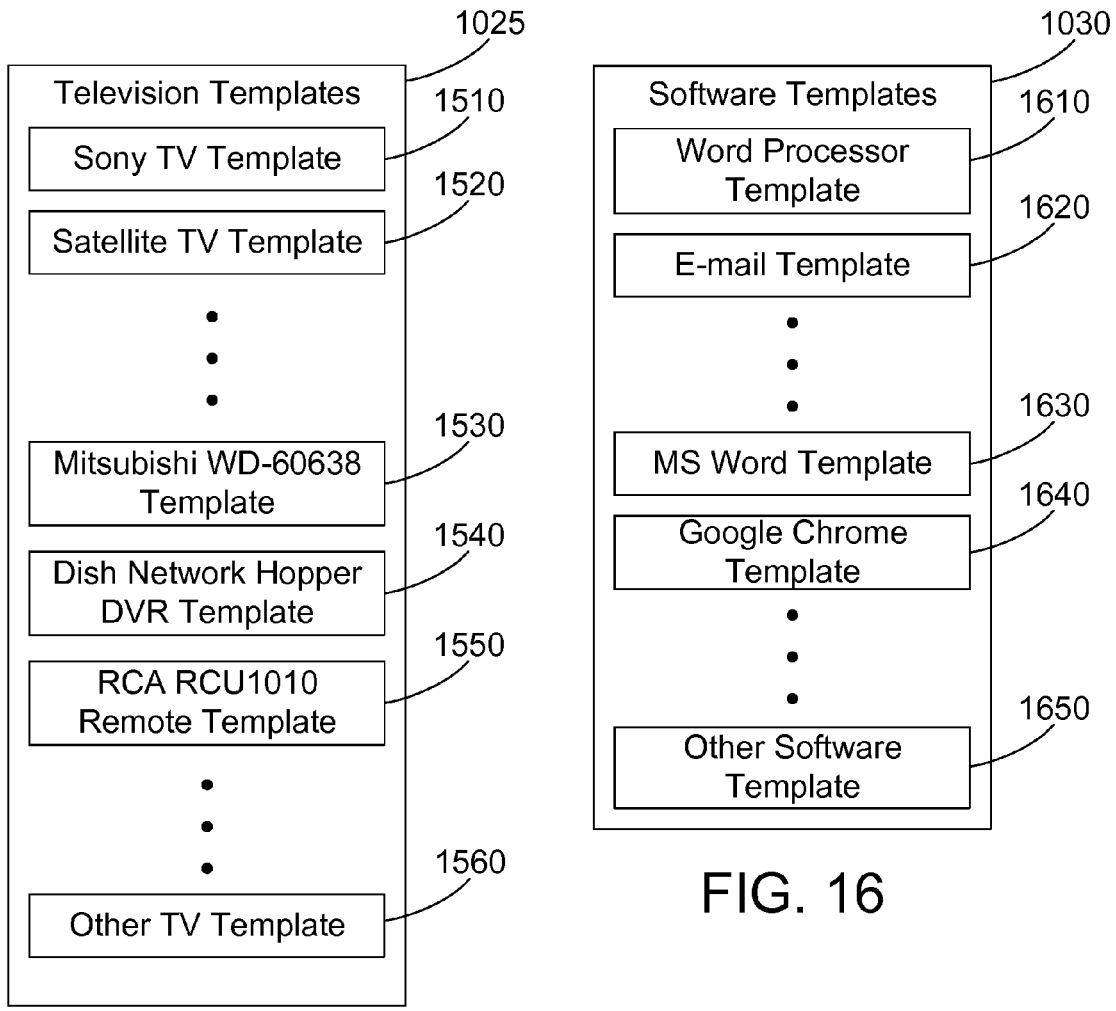
FIG. 15 is a block diagram showing examples of television templates.
FIG. 16 is a block diagram showing examples of software templates.

Television templates 1025 are shown in FIG. 15 to include a Sony TV template 1510 and a satellite TV template 1520, which represent different types of television devices. Television templates 1025 may also include templates for a specific television device, such as a Mitsubishi WD-60638 template 1530, a Dish Network Hopper DVR template 1540, and an RCA RCU1010 remote template 1540, as well as one or more other television device templates 1560 that may be for a television device type or for a specific television-related device.

Software templates 1030 are shown in FIG. 16 to include a word processor template 1610 and an e-mail template 1620, which represent different types of software. Software templates 1030 may also include templates for specific software, such as a Microsoft Word template 1630 and a Google Chrome template 1640, as well as one or more other software templates 1650 that may be for a type of software or for specific software.

Figure 17:
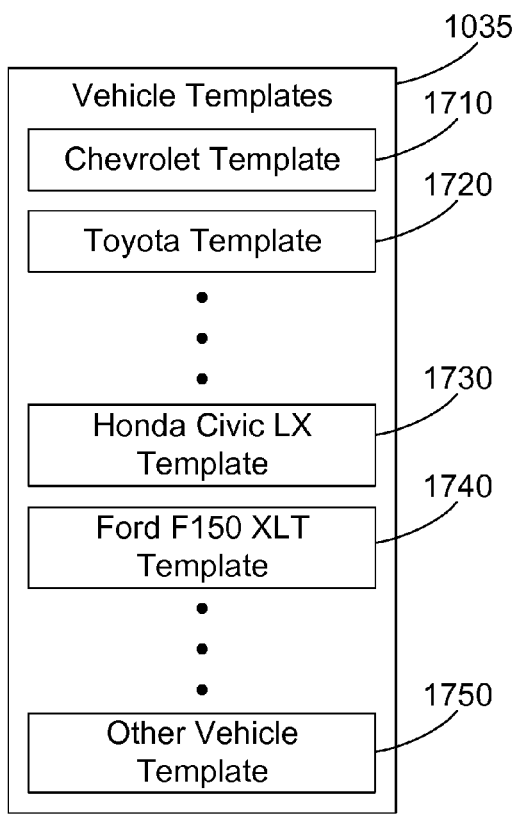
FIG. 17 is a block diagram showing examples of vehicle templates.

Vehicle templates 1035 are shown in FIG. 17 to include a Chevrolet template 1710 and a Toyota template 1720, which represent different types of vehicles. Vehicle templates 1035 may also include templates for specific vehicles, such as a Honda Civic LX template 1730 or a Ford F150 XLT template 1740, as well as one or more other vehicle templates 1750 that may be for a type of vehicle or for a specific vehicle. Note while the only vehicles shown in FIG. 17 are cars and a small truck, the vehicle templates 1035 could include templates for any type of vehicle, including cars, trucks, boats, large semi trucks, planes, and other vehicles.

Figure 18:
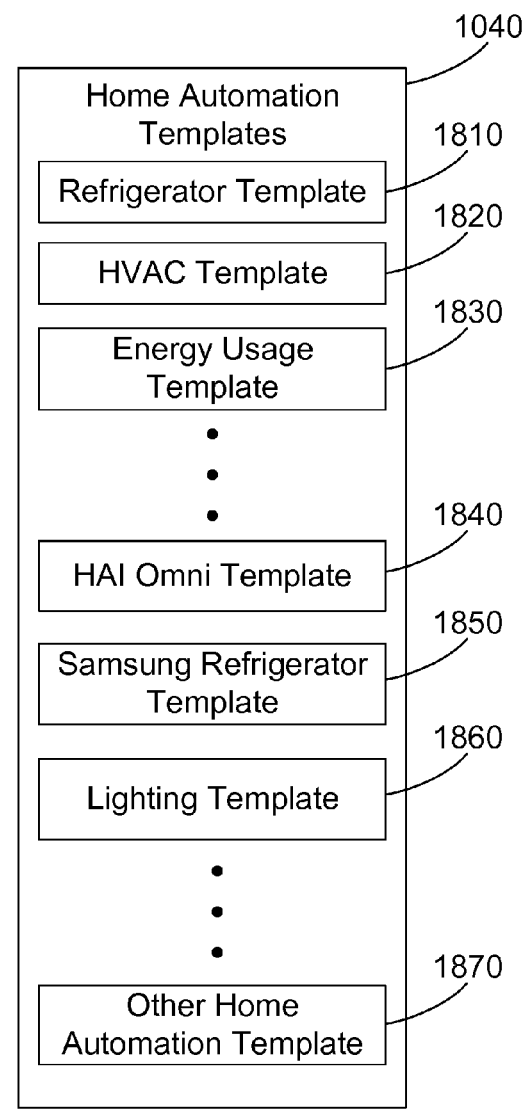
FIG. 18 is a block diagram showing examples of home automation templates.

Home automation templates 1040 are shown in FIG. 18 to include a refrigerator template 1810, an HVAC template 1820, and an energy usage template 1830, which represent different things that may be controlled by a home automation system. Home automation templates 1040 may also include templates for specific home automation systems, such as Home Automation Inc. (HAI) Omni template 1840, Samsung refrigerator template 1850, lighting template 1860, as well as one or more other home automation templates 1870 that may be for a type of home automation controller or type of item controlled by a home automation controller or for a specific home automation controller or item controlled by a home automation controller.

Gaming system templates 1045 are shown in FIG. 19 to include Xbox templates 1910 and Playstation templates, which represent different types of gaming systems. Gaming templates 1045 may also include templates for specific gaming systems, such as Nintendo Wii U template 1930 and Xbox 360 template 1940, as well as one or more other gaming system templates 1950 that may be for a type of gaming system or for a specific gaming system.

Audio system templates 1050 are shown in FIG. 20 to include stereo receiver templates 2010, home theater templates 2020, and vehicle audio templates 2030, which represent different types of audio systems. Audio system templates 1050 may also include templates for specific audio systems, such as Sony STR-DH130 template 2040 and Yamaha RX-V375 template 2050, as well as one or more other audio system templates 2060 that may be for a type of audio system or for a specific audio system.

Figure 21:
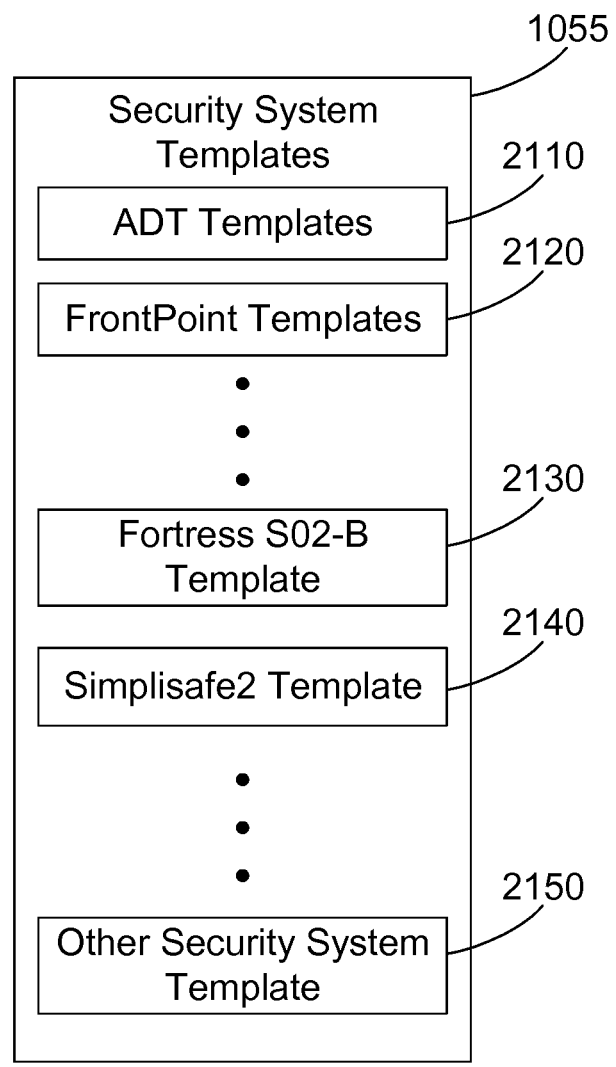
FIG. 21 is a block diagram showing examples of security system templates.

Security system templates 1055 are shown in FIG. 21 to include ADT templates 2110 and FrontPoint templates 2120, which represent different types of security systems from different manufacturers. Security system templates 1055 may also include templates for specific security systems, such as a Fortress SO2-B template 2130 and a Simplisafe2 template 2140, as well as one or more other security system templates 2150 that may be for a type of security system or for a specific audio system.

While the templates disclosed herein may be of any suitable format, it is expected that industry experts will have to spend time brainstorming and meeting to arrive at an industry standard. Thus, the automotive industry may generate an industry-standard template for cars, while the personal computer industry may generate a very different industry-standard template for desktop computers. Generating and publishing standard templates will greatly accelerate the acceptance of the U-Me system.

The device-specific templates shown in FIGS. 10-21 could be provided by any suitable entity. For example, the U-Me system may provide some of the device-specific templates. However, some device-specific templates will preferably be provided by manufacturers of devices. As discussed below, the U-Me system includes the capability of device manufacturers to become "U-Me Certified", which means their devices have been designed and certified to appropriately interact with the U-Me system. Part of the U-Me certification process for a device manufacturer could be for the manufacturer to provide a universal template for each category of devices the manufacturer produces, a device-specific template for each category of devices the manufacturer produces, as well as a device-specific template for each specific device the manufacturer sells.

Figure 22:
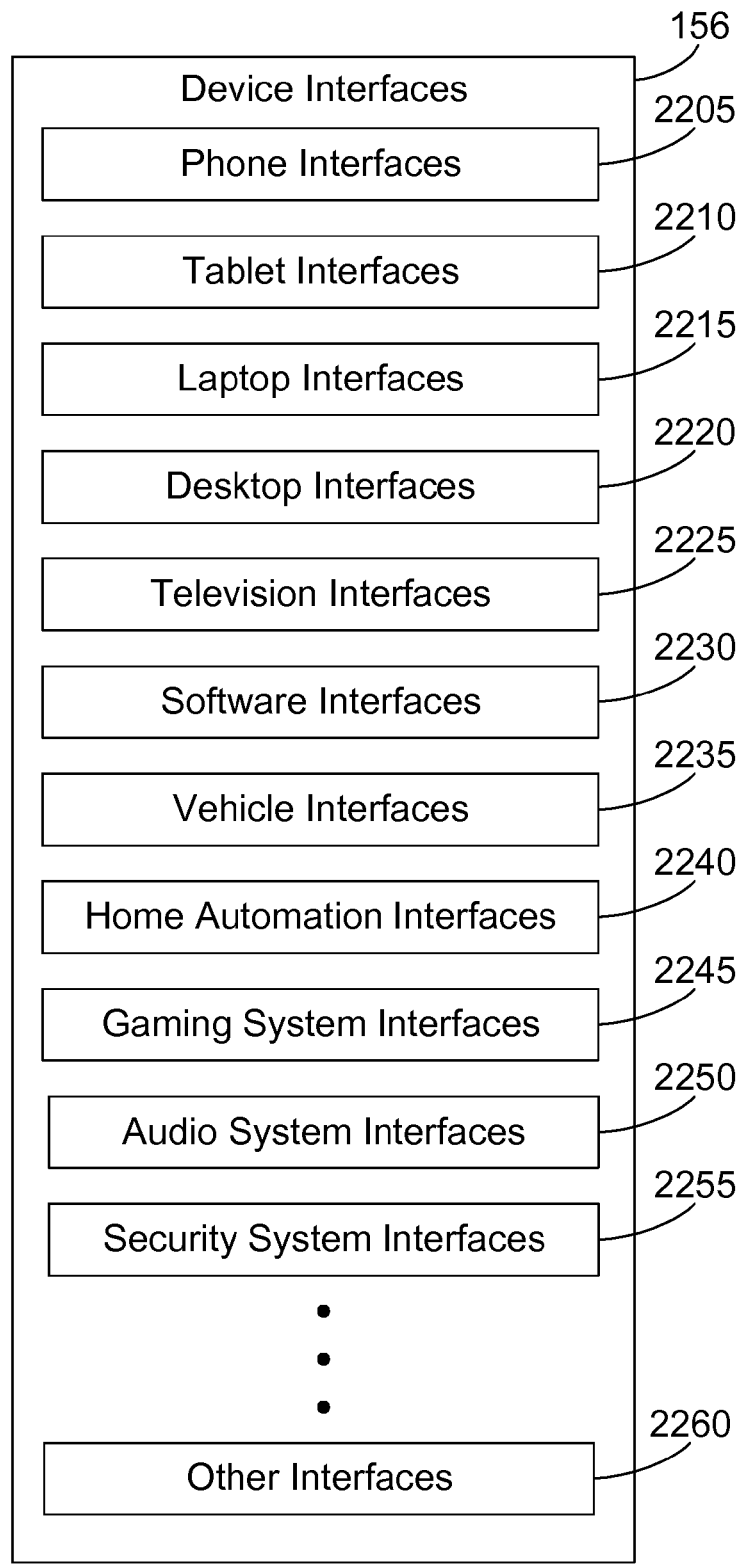
FIG. 22 is a block diagram showing examples of device interfaces.

Referring to FIG. 22, device interfaces 156 preferably include phone interfaces 2205, tablet interfaces 2210, laptop interfaces 2215, desktop interfaces 2220, television interfaces 2225, software interfaces 2230, vehicle interfaces 2235, home automation interfaces 2240, gaming system interfaces 2245, audio system interfaces 2250, security system interfaces 2255, and other interfaces 2260. The device interfaces shown in FIG. 22 are examples shown for the purpose of illustration. The disclosure and claims herein extend to any suitable device interfaces, including device interfaces for devices known today as well as device interfaces for devices developed in the future.

Each device interface provides the logic and intelligence to interact with a specific type of device or with a specific device. Thus, phone interfaces 2205 could include an iPhone interface and an Android interface. In addition, phone interfaces 2205 could include different interfaces for the same type of device. Thus, phone interfaces 2205 could include separate phone interfaces for an iPhone 4 and an iPhone 5. In the alternative, phone interfaces 2205 could be combined into a single phone interface that has the logic and intelligence to communicate with any phone. In the most preferred implementation, a device interface is provided for each specific device that will interact with the U-Me system. This could be a requirement for a device to become U-Me certified, that the manufacturer of the device provide the device interface that meets U-Me specifications.

Figure 23:
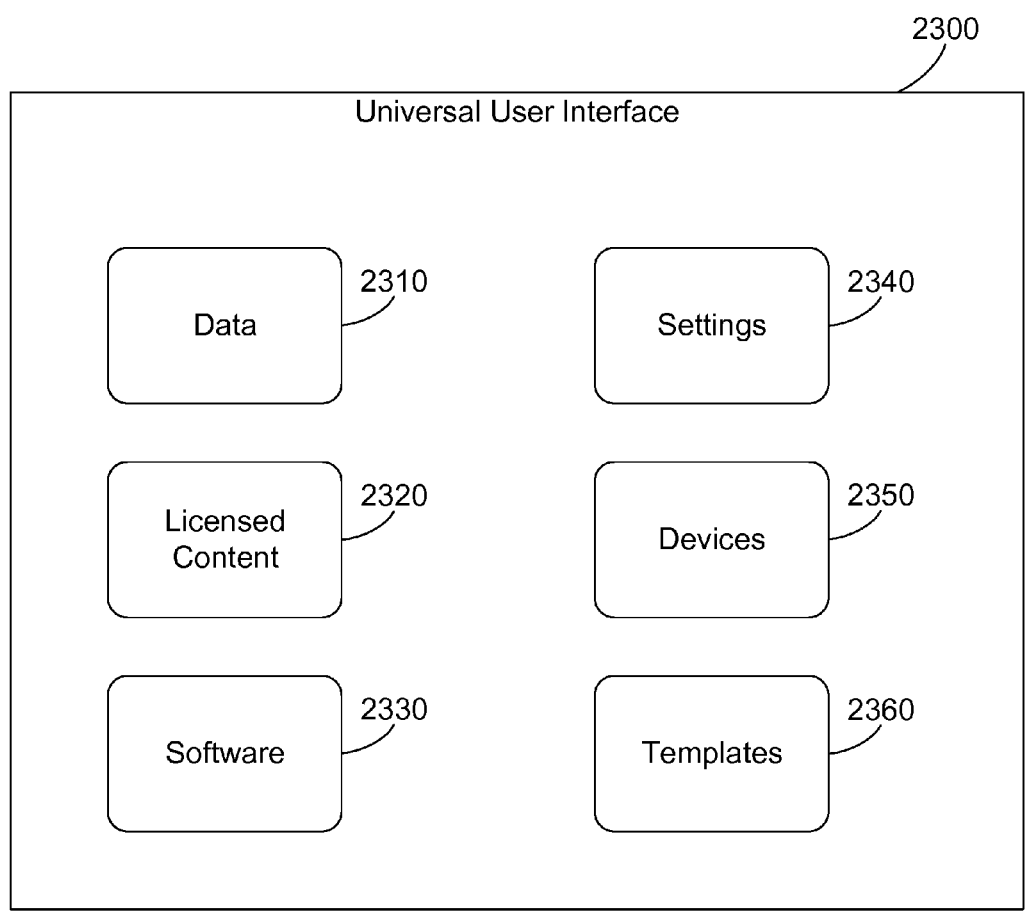
FIG. 23 is a block diagram of a universal user interface.

The U-Me system preferably includes a universal user interface 142 shown in FIG. 5. The universal user interface 2300 shown in FIG. 23 is one suitable example of a specific implementation for the universal user interface 142 shown in FIG. 5. The universal user interface 2300 in FIG. 23 includes several icons the user may select to access various features in the U-Me system. The icons shown in FIG. 23 include a data icon 2310, a licensed content icon 2320, a software icon 2330, a settings icon 2340, a devices icon 2350, and a templates icon 2360. Selecting the data icon 2310 gives the user access to the user data 120 stored in the user's U-Me account, including the types of data shown in FIG. 6. One way for the user to access the user data 120 is via a data search engine, discussed in more detail below. Selecting the licensed content icon 2320 gives the user access to any and all of the user's licensed content 130, including the categories of licensed content shown in FIG. 7. Selecting the software icon 2330 gives the user access to software available in the user's U-Me account. While software is technically a category of licensed content (see 735 in FIG. 7), a separate icon 2330 is provided in the universal user interface 2300 in FIG. 23 because most users would not mentally know to select the licensed content icon 2320 to run software. Selecting the software icon 2330 results in a display of the various software applications available in the user's U-Me account. The user may then select one of the software applications to run. The display of software icons could be considered a "virtual desktop" that is available anywhere via a browser or other suitable interface.

Selecting the settings icon 2340 gives the user access to any and all of the user settings 140, including the categories of settings shown in FIG. 8. Selecting the devices icon 2350 gives the user access to virtual devices, which are discussed in more detail below, where the virtual devices correspond to a physical device used by the user. The user will also have access to the device interfaces 156, including the device interfaces shown in FIG. 22. Accessing devices via the device interfaces allows the user to have remote control via the universal user interface over different physical devices. Selecting the templates icon 2360 gives the user access to the templates in the user's U-Me account, including: universal templates, including the universal templates shown in FIG. 9; and device-specific templates, including the device-specific templates shown in FIGS. 10-21. The devices icon 2350 and the templates icon 2360 provide access to information in the user's U-Me account pertaining to devices and templates, which can be part of the settings in the user's U-Me account. While the Devices icon 2350 and Templates icon 2360 could be displayed as a result of a user selecting the Setting icon 2240, these icons 2350 and 2360 that are separate from the settings icon 2340 are provided in FIG. 23 to make using the universal user interface 2300 more intuitive for the user.

The universal user interface gives the user great flexibility in accessing a user's U-Me account. In the most preferred implementation, the universal user interface is browser-based, which means it can be accessed on any device that has a web browser. Of course, other configurations for the universal user interface are also possible, and are within the scope of the disclosure and claims herein. For example, a user on vacation in a foreign country can go into an Internet café, invoke the login page for the U-Me system, log in, and select an icon that causes the universal user interface (e.g., 2300 in FIG. 23) to be displayed. The user then has access to any and all information stored in the user's U-Me account.

Because the universal user interface allows a user to access the user's U-Me account on any device, the universal user interface also provides a way for a user to change settings on the user's devices. Because the user's U-Me account includes virtual devices that mirror the configuration of their physical device counterparts, the user could use a laptop or desktop computer to define the settings for the user's phone. This can be a significant advantage, particularly for those who don't see well or who are not dexterous enough to use the tiny keypads on a phone. A simple example will illustrate. Let's assume a U-Me user wants to assign a specific ringtone to her husband's contact info in her phone. The user could sit down at a desktop computer, access the universal user interface 2300, select the Devices icon 2350, select a Phone icon, which then gives the user access to all of the settings in the phone. The user can then navigate a menu displayed on a desktop computer system using a mouse and full-sized keyboard to change settings on the phone instead of touching tiny links and typing on a tiny keyboard provided by the phone. The user could assign the ringtone to her husband's contact info in the settings in the virtual device in the U-Me account that corresponds to her phone. Once she makes the change in the virtual phone settings in the U-Me account, this change will be automatically propagated to her phone. The universal user interface may thus provide access to the user to set or change the settings for all of the user's physical devices.

The universal user interface 142 can include any suitable interface type. In fact, the universal user interface 142 can provide different levels of interfaces depending on preferences set by the user. Thus, the universal user interface may provide simple, intermediate, and power interfaces that vary in how the information is presented to the user depending on the user's preferences, which could reflect the technical prowess and capability of the user. Those who are the least comfortable with technology could select a simple interface, which could provide wizards and lots of help context to help a user accomplish a desired task. Those more comfortable with technology could select the intermediate interface, which provides fewer wizards and less help, but allows a user to more directly interact with and control the U-Me system. And those who are very technically-oriented can select the power interface, which provides few wizards or help, but allows the user to directly interact with and control many aspects of the U-Me system in a powerful way.

Figure 24:
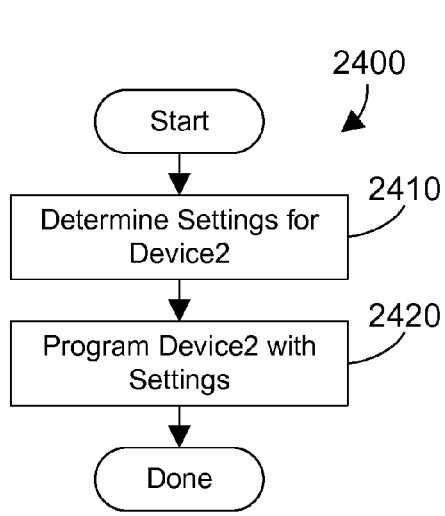
FIG. 24 is a flow diagram of a method for programming a physical device with settings from the U-Me system.
Figure 25:
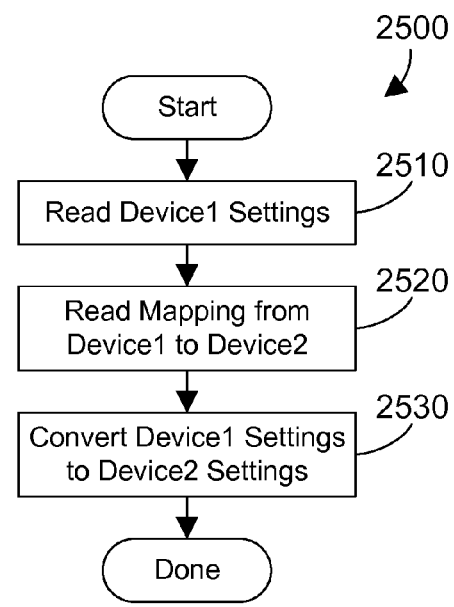
FIG. 25 is a flow diagram of a first suitable method for performing step 2410 in FIG. 24 using a mapping between two physical devices.
Figure 26:
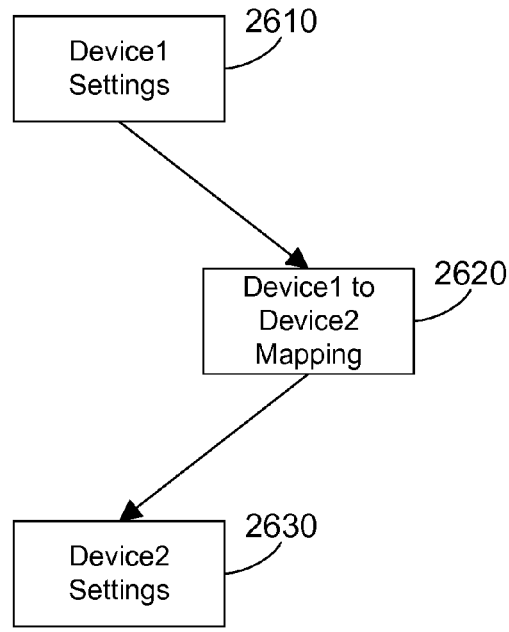
FIG. 26 is a block diagram showing the generation of settings for Device2 from settings for Device 1 as shown in the flow diagram in FIG. 25.

There are many different ways to program a device using the information in the user's U-Me account. Referring to FIG. 24, a method 2400 for programming a device called Device2 begins by determining settings for Device2 (step 2410), then programming the device with those settings (step 2420). There are different ways to determine the settings for Device2 in step 2410. Referring to FIG. 25, method 2500 shows one suitable implementation for step 2410 in FIG. 24. Settings for a device called Device1 are read (step 2510). A mapping from Device1 to Device2 is then read (step 2520). The settings for Device1 are then converted to the settings for Device2 (step 2530). This is shown graphically in FIG. 26, where the Device1 settings 2610 are converted using the Device1 to Device2 mapping 2620 to Device2 settings 2630. This first example in FIGS. 25 and 26 show how to program a device by converting settings from one device to settings for a different device. For example, let's assume a user has been using an iPhone 4, then decides to change to a Samsung Galaxy S4 phone. Assuming there are device-specific templates 154 for both phones, the conversion mechanism 160 in FIG. 5 can convert the settings on the iPhone 4 to settings on the Samsung Galaxy S4, provided there is a mapping in the phone templates between the device-specific settings of the two devices. The example in FIGS. 25 and 26 shows how to program a device by converting from settings of a different device.

Figure 27:
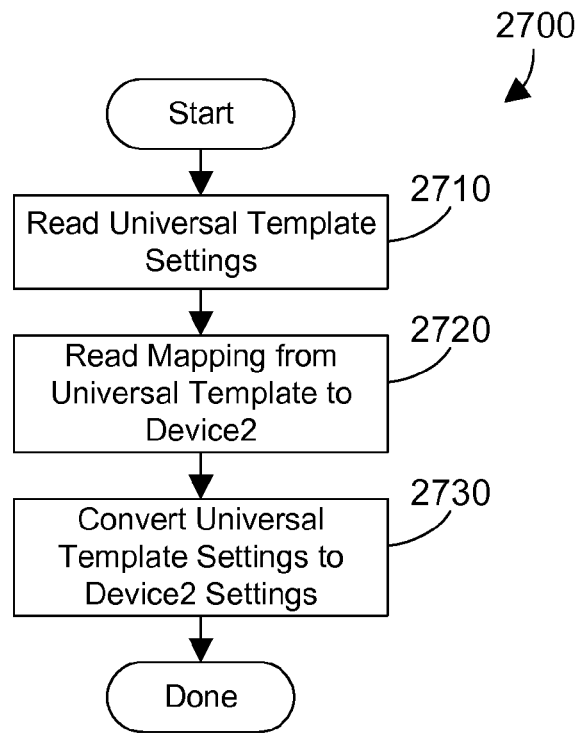
FIG. 27 is a block diagram of a second suitable method for performing step 2410 in FIG. 24 using a universal template.
Figure 28:
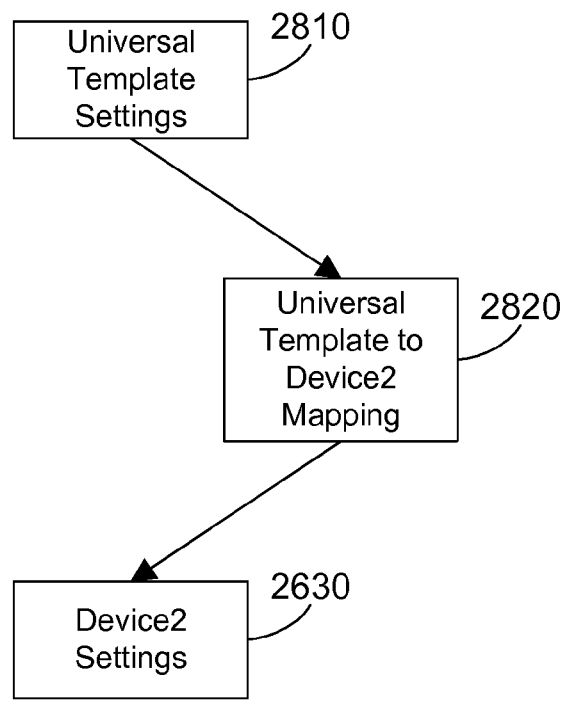
FIG. 28 is a block diagram showing the generation of settings for Device2 from a universal template as shown in the flow diagram in FIG. 27.

A second suitable implementation for step 2410 in FIG. 24 is shown in FIGS. 27 and 28. In this implementation, Device2 is programmed from settings stored in the Universal Template corresponding to Device2. The universal template settings are read (step 2710). A mapping from the universal template to Device 2 is read (step 2720). The conversion mechanism then converts the settings from the universal template to the settings for Device2 (step 2730). This is shown graphically in FIG. 28, where universal template settings 2810 are converted using the universal template to Device2 mapping 2820 to generate Device2 settings 2630. This second implementation in FIGS. 27 and 28 vary from the first implementation in steps 25 and 26 because the conversion of settings is between the universal template settings to the Device2 settings, not from the settings of another device (such as Device1).

Figure 29:
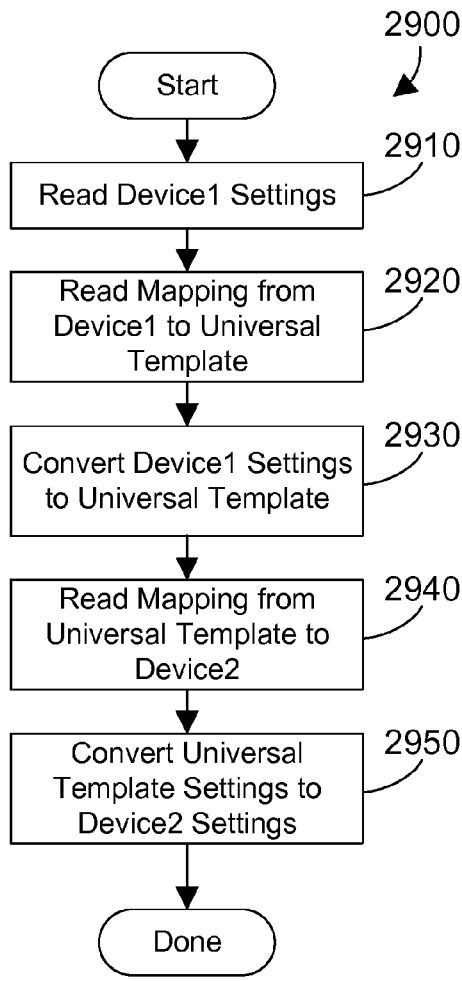
FIG. 29 is a block diagram of a third suitable method for performing step 2410 in FIG. 24 using settings from a first device and a universal template.
Figure 30:
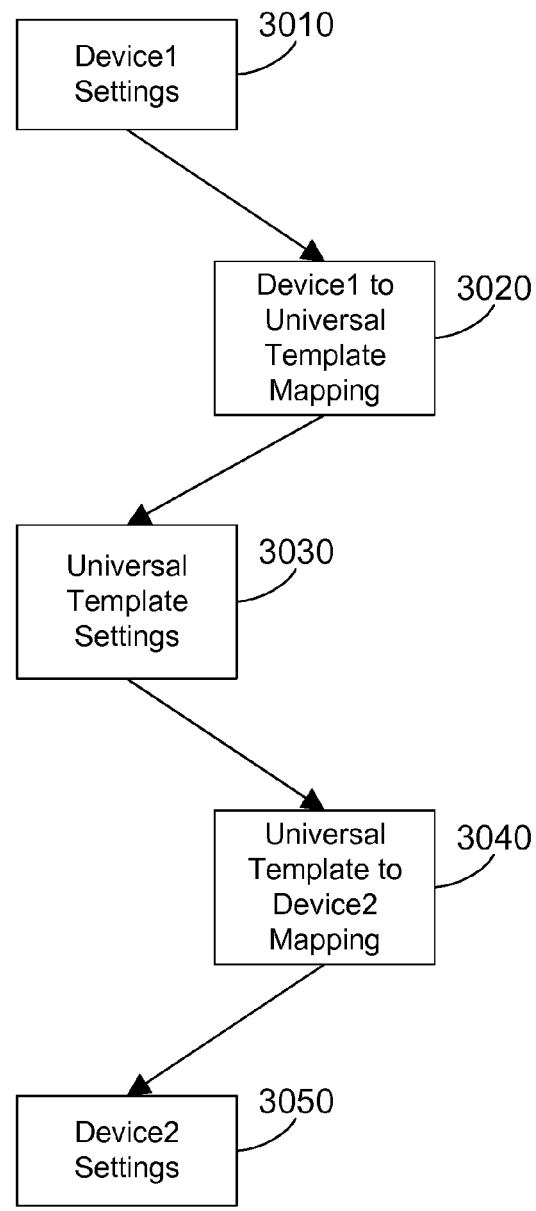
FIG. 30 is a block diagram showing the generation of settings for Device2 as shown in the flow diagram in FIG. 29.

A third suitable implementation for step 2410 in FIG. 24 is shown in FIGS. 29 and 30. Device1 settings are read (step 2910). A mapping from Device1 to the universal template is also read (step 2920). The Device1 settings are then converted to the universal template settings (step 2930). A mapping from the universal template to Device2 is then read (step 2940). The universal template settings are then converted to Device 2 settings (step 2950). This is shown graphically in FIG. 30, where the Device1 settings are converted using the Device1 to universal template mapping 3020 to universal template settings 3030, which are then converted using the universal template to Device2 mapping 3040 to Device2 settings 3050. This third implementation converts settings between two devices, similar to the first implementation shown in FIGS. 25 and 26, but this is not a direct mapping between two devices, but is rather a mapping to and from universal template settings.

We now consider one specific usage of the U-Me system with regards to television equipment with respect to FIGS. 31-37. We assume a user's television settings are store in the user's U-Me account. Examples of suitable television settings 835 are shown in FIG. 32 to include one or more favorite channels list 3210, shows set to record 3220, blocked channels 3230, parental controls 3240, channel numbers for stations 3250, and an unlock password 3260. These are all settings the user can define, for example, in a DVR for Dish Network. For this specific example, we assume the user has Dish Network at the user's home, and programs the Dish Network DVR with some or all of the user television settings 835 shown in FIG. 32. We now assume the user travels to a new location during a vacation, such as a hotel room, a resort, a relative's house, etc., and we further assume the new location has DirecTV. Referring to FIG. 33, method 3300 begins by detecting the target system (at the new location) is a DirecTV system (step 3360). The user's Dish Network television settings are converted to equivalent or similar DirecTV settings in the user's U-Me account (step 3320). The converted DirecTV settings from the user's U-Me account are then downloaded to the DirecTV target system (e.g., DVR) at the new location. The result is the user's Dish Network television settings are now available on the DirecTV DVR. One part of the conversion in step 3320 is converting the channel numbers from Dish Network to the equivalent channel numbers in DirecTV. A sample mapping for ten channels is shown at 3100 in FIG. 31. Note the channels ABC, NBC, CBS and Fox in the mapping 3100 show "local" instead of a number, because the channel numbers will vary from one geographic region to the next. The indication of "local" in the channel mapping will indicate a need to determine the location of the target system, and determining the appropriate mapping to the target system using the channel numbers that are specific to the geographic region where the target system is located. This is a task easily accomplished by the U-Me system.

Note that known DVRs for Dish Network and DirecTV do not allow downloading settings as discussed above with respect to method 3300 in FIG. 33. For television providers to work in conjunction with the U-Me system, each provider's DVR will need to be "U-Me Certified", meaning the DVR includes logic and intelligence that allows the DVR to interact with the U-Me system. This certification process will also preferably provide a device-specific template for each DVR, along with information that allows mapping the settings from one provider to another provider. In the most preferred implementation, a universal template for a DVR could be defined with required fields, and each device-specific template for each DVR will have to have the required fields specified in the universal DVR template.

Figure 34:
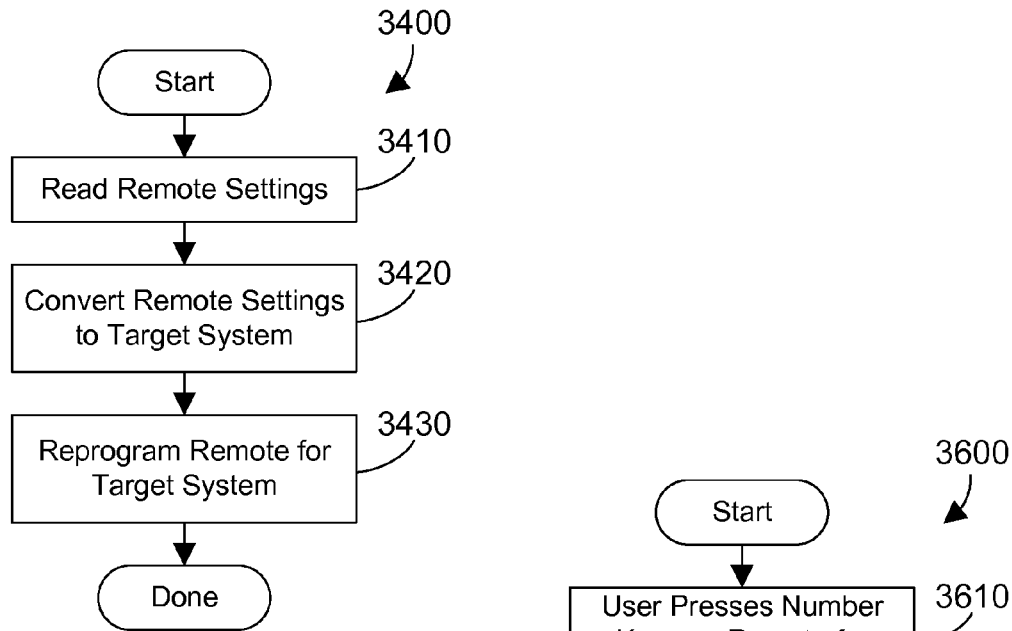
FIG. 34 is a flow diagram of a method for reprogramming a remote control for a television.
Figure 36:
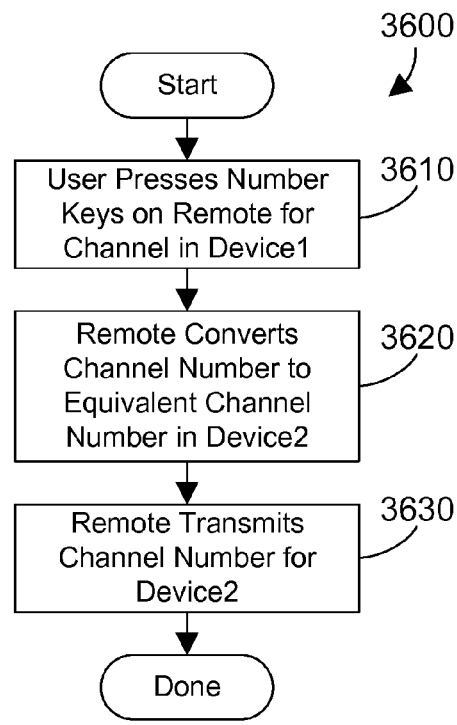
FIG. 36 is a flow diagram of a method for converting a channel number entered by a user to a corresponding different channel number for a target system.
Figure 35:
FIG. 35 is an example of a display of a television remote control.

Changing television settings in the new location would not be very helpful unless the user has a remote that can accommodate the change. We assume for this example a user has a remote control with a screen that displays channel icons, such as shown in FIG. 35. Such remote controls, such as the Pronto touch-screen remote control and the RCA RCU1010 remote control, allow displaying a channel icon. Method 3400 in FIG. 34 can be used to reprogram a remote control to accommodate the change of location in the example above. This example also assumes the remote control is "U-Me Certified", meaning the remote control includes logic and intelligence that allows the remote control to interact with the U-Me system. The settings for the remote control are read (step 3410). Thus, the mapping of channel icons to channel numbers is determined in step 3410. The settings are converted to equivalent or similar settings for the target system (step 3420). This means the channel numbers of the displayed icons in display 3500 in FIG. 35 for Dish Network are converted to the equivalent channel numbers using the mapping 3100 in FIG. 31. The conversion of settings is preferably performed by the conversion mechanism 160 shown in FIG. 5. The remote control is then reprogrammed for the target system (step 3430). This means the channel numbers that are sent by the remote control are now the channel numbers for DirecTV, not Dish Network. Thus, when the user is home and presses the Fox News icon, the remote control sends channel 205 to the Dish Network DVR. But after the remote control has been reprogrammed for the target system at the new location as shown in FIG. 34, when the user presses the Fox News icon, the remote control will now send channel 360 to the DirecTV DVR. This reprogramming thus allows a user to use a remote control with icon-based channels by reprogramming the underlying channel numbers that are sent by the remote control when an icon is pressed. The user is thus able to travel with the user's home remote control, and have the remote control be automatically reprogrammed to accommodate the television system at the new location, assuming the television system at the new location is U-Me compliant.

In addition to reprogramming the remote to transmit different channel numbers when an icon is pressed, the remote can also be reprogrammed to transmit different channel numbers than channel number pressed by the user. This is shown in method 3600 in FIG. 36. A user uses the numeric keypad on the remote control to key in a channel number for Device1 (step 3610). The remote automatically converts the channel number entered by the user to the equivalent channel number in the target system (step 3620). The remote then transmits the channel number for Device2 (step 3630). For the simple example given above, with Dish Network at the user's home and DirecTV at the new location, when the user presses channel 138 on the remote control keypad (step 3610), the remote control keypad will detect the number and convert the number 138 for TNT in Dish Network to number 245 for TNT in DirecTV (as shown in FIG. 31) (step 3620). The remote control then transmits channel number 245 to the DirecTV DVR (step 3630). In this manner the user need not learn the new channel numbers at the new location, but can instead use the old channel numbers from home to access the same television channels on the system at the new location.

Note there are apps for Android smart phones that allow turning the phone into a touch-screen remote control for certain types of TVs. One such app is Smart VE Remote Control that can serve as a remote control for certain Samsung televisions. Because known Android smart phones typically do not have an infrared (IR) transmitter that is commonly used in many remote controls, a smart phone cannot be used in the same manner as conventional remote controls. Instead, these apps send signals via the Wi-Fi network, and these signals are transmitted via the Wi-Fi network to the television, which is Wi-Fi enabled. As televisions that are Wi-Fi enabled that can be controlled by a Wi-Fi remote (such as a smart phone with the appropriate app) become more popular, the methods discussed above with respect to FIGS. 31-36 could be carried out by reprogramming a smart phone app. This will be incredibly convenient because the user will always travel with the user's smart phone, which means the user will always have a remote control that can be reprogrammed by the U-Me system to work on a target system at a new location. Of course, this scenario is many years into the future after such televisions are widely available and after manufacturers of televisions, television equipment, and remote controls all become U-Me certified.

Figure 37:
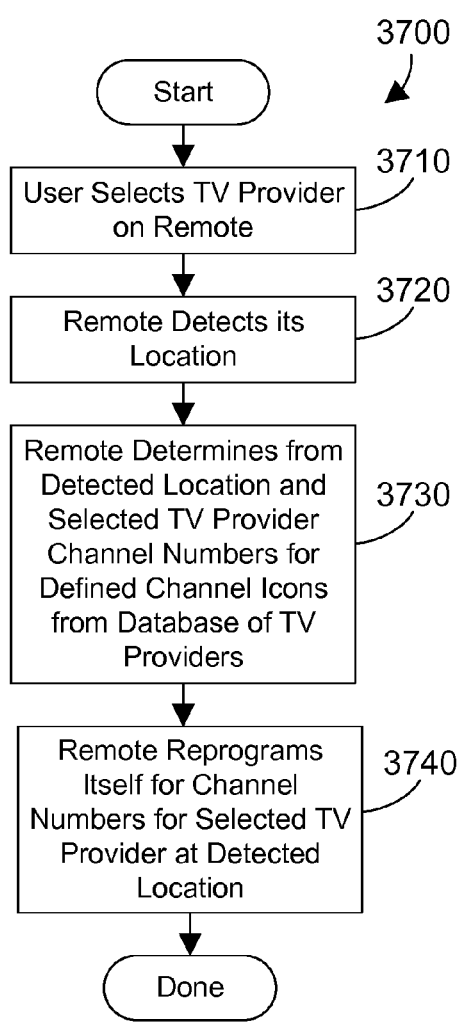
FIG. 37 is a flow diagram of a method for reprogramming a television remote control according to a target system at a location.

Method 3700 in FIG. 37 shows another method for reprogramming a remote control. A user selects a TV provider on the remote control (step 3710). The remote control detects its location (step 3720). The remote determines from the detected location and from the selected TV provider channel numbers for defined channel icons from a database of TV providers (step 3730). The remote then reprograms itself for channel numbers for the selected TV provider at the detected location (step 3740). A simple example will illustrate. Let's assume the same scenario discussed in detail above, where a user has Dish Network at home and travels to a location that has DirecTV. The user could press a button, icon, or selection from a drop-down list on the remote control that selects DirecTV in step 3710. The remote control could detect its location in step 3720 in any suitable way, including an internal GPS device, a wireless network interface that detects an Internet Protocol (IP) address and determines a geographic location for that IP address, or in any other suitable way. The remote then consults a database of channel numbers for various TV providers at that geographic location. In one embodiment, the database will be stored in the remote control itself. In another embodiment, the database will be stored external to the remote, such as at a website, and could be accessed by the remote control via a Wi-Fi connection. Once the remote control determines the channel numbers that correspond to DirecTV at the geographic location, the remote control reprograms itself for those channel numbers (step 3740). Note that method 3700 supports changing the underlying channel numbers for displayed channel icons, similar to that discussed with respect to FIG. 34, as well as dynamically changing channel numbers entered by the user, similar to that discussed above with respect to FIG. 36. The U-Me system provides a very powerful way for a user to use settings the user is accustomed to using at home while interacting with an entirely unfamiliar system at a new location.

One area that has not benefited much from modern technology is receipts for purchases. For example, let's assume a person buys a television at Best Buy that has a two year warranty. The purchaser is given a paper receipt. Let's then assume that six months later, the television quits working Let's further assume that for this television, Best Buy's warranty policy states to return the television to the store if warranty service is needed within 90 days of purchase date, and to return the television to the manufacturer if warranty service is needed after 90 days of the purchase date but within the two year warranty period. When the TV quits working, the purchaser will have to locate the paper receipt, then call or e-mail Best Buy to determine where and how to make a warranty claim. This is grossly inefficient, especially in a world where electronic communications and transactions are so easily accomplished.

Some retailers have made efforts to create electronic receipts and records of purchases. For example, Lowes offers to its customers a MyLowes card. After a person signs up for a MyLowes card, for each purchase, the person offers his or her MyLowes card to be scanned. The result is the receipt is made available electronically at the Lowes website when the Lowes customer logs in. This gives a central place where a customer can review all receipts for all purchases made at Lowes. While this is progress, it is one solution for one retailer. What is needed is a way to create electronic receipts for all purchases so a user can easily track all purchases electronically.

Figure 38:
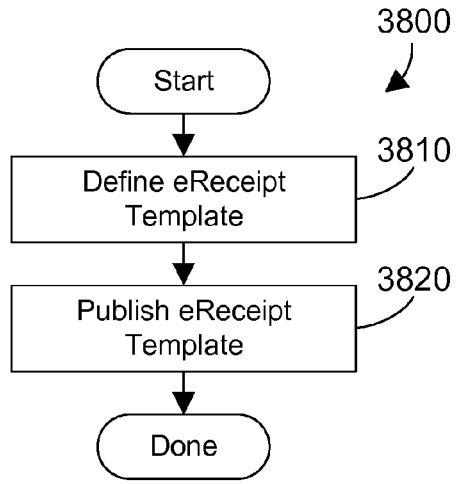
FIG. 38 is a flow diagram of a method for defining an eReceipt template.

The U-Me system introduces the concept of an eReceipt, which is simply a receipt in electronic form. In the most preferred implementation, the eReceipt may include warranty information as well as a record of a purchase. An eReceipt is processed by the eReceipt mechanism 178 shown in FIG. 5. Referring to FIG. 38, a method 3800 begins by defining an eReceipt template (step 3810). The eReceipt template is then published (step 3820). Once published, any and all vendors may create eReceipts that conform to the published eReceipt template.

The eReceipt template can be defined in any suitable way. One suitable way uses a markup language such as XML to define fields, some of which are mandatory and some of which are optional. A seller can determine based on the fields in the eReceipt template how to format an eReceipt according to the definition of the eReceipt template.

Figure 39:
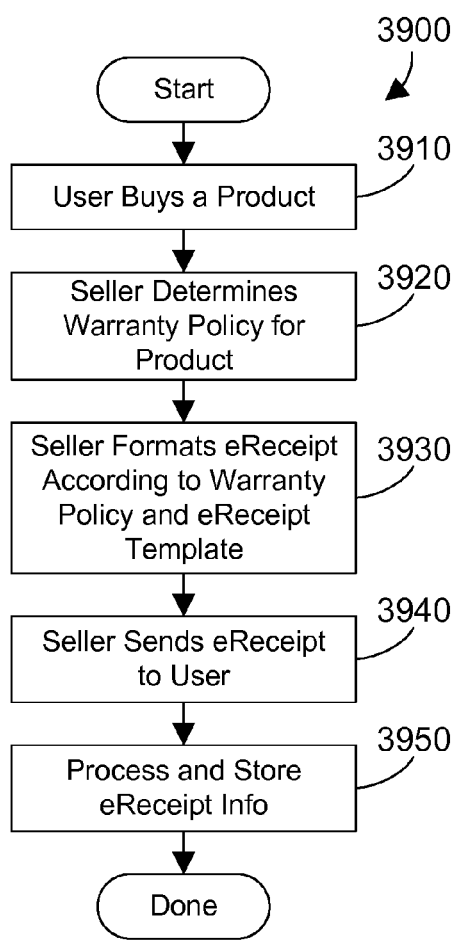
FIG. 39 is a flow diagram of a method for sending and storing an eReceipt to a user's U-Me account.

Method 3900 in FIG. 39 shows how eReceipts are used. A user buys a product (step 3910). The seller determines the warranty policy for the product (step 3920). The seller formats an eReceipt according to the warranty policy and the eReceipt template (step 3930). The seller sends the eReceipt to the user (step 3940), preferably to the user's U-Me account. The eReceipt is then processed and stored (step 3950) in the user's U-Me account. The result of method 3900 is an electronic copy of a receipt that is automatically stored in the user's U-Me account when the user makes a purchase. This assumes a seller delivers eReceipts that are formatted according to the eReceipt template. This is easily done by attaching an eReceipt file to an e-mail. The U-Me system monitors all incoming e-mail, and when an eReceipt is detected in an incoming e-mail, the U-Me system reads the eReceipt. The U-Me system will then will process and store the eReceipt in the user's U-Me account. In the most preferred implementation, the eReceipt will be processed and stored in the user's U-Me account without any further input required by the user. However, in an alternative implementation, the user may be prompted to enter information related to the purchase before the eReceipt is stored in the user's U-Me account.

Figure 40:
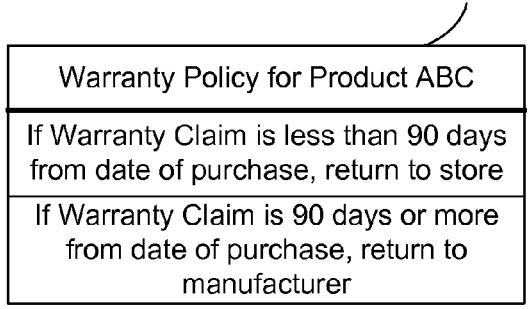
FIG. 40 is a table showing an example warranty policy for a product ABC.

FIG. 40 shows a sample warranty policy 4000. If a warranty claim is less than 90 days from the date of purchase, the item will be returned to the store. If a warranty claim is 90 days or more from the data of purchase, the item will be returned to the manufacturer. This warranty policy information may be included in the eReceipt. In one specific implementation, the warranty policy is included in the eReceipt in the form of a timed warranty link, discussed in more detail below.

FIG. 41 shows a method 4100 that illustrates a specific example for method 3900 in FIG. 39. A user buys a television from manufacturer ABC from seller XYZ (step 4110). The seller XYZ formats an eReceipt with a timed warranty link according to the eReceipt template (step 4120). The e-Receipt with the timed warranty link is e-mailed to the user (step 4130). The information in the eReceipt is then extracted and stored in fields in an eReceipt database in the user's U-Me account (step 4140), where the fields correspond to the fields defined in the eReceipt template.

The eReceipt can include a timed warranty link, which allows the user to submit a warranty claim by clicking on the timed warranty link. A timed warranty link may be created and maintained using any suitable method. Two such methods are disclosed herein by way of example. The first method is shown in method 4200 in FIG. 42. We assume the U-Me system detects a timed warranty link (step 4210). For this specific example, we assume the timed warranty link is according to the warranty policy 4000 shown in FIG. 40. Based on the warranty policy, the warranty link in the U-Me system is initially set to point to the seller's warranty return system (step 4220). The U-Me system then sets a timer according to the timed warranty link (step 4230). For the example warranty policy 4000 shown in FIG. 40, the timer will be set for 90 days from the date of purchase. As long as the timer does not fire (step 4240=NO), method 4200 waits. Once timer 4240 fires (step 4240=YES), the warranty link is set to point to the manufacturer's warranty return system. Method 4200 thus shows how the U-Me system can determine the presence of a timed warranty link in an eReceipt, and can then change the warranty link accordingly.

Figure 47:
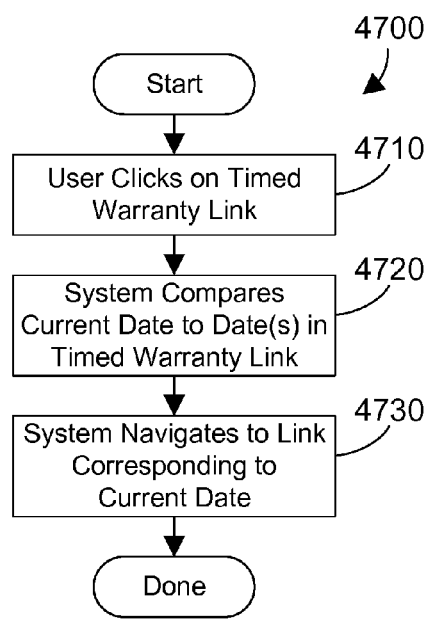
FIG. 47 is a flow diagram of a method for handling a timed warranty link.

A second method for defining a timed warranty link is shown in FIG. 43. This timed warranty link appears to the user as a link in plain language, such as "Click here to make a warranty claim." However, the logic shown in FIG. 43 underlies the warranty link. The timed warranty link in FIG. 43 includes a date that is 90 days from the date of purchase (in accordance with the warranty policy 4000 in FIG. 40). If the current date is less than or equal to the set date at 90 days, selecting the link takes the user to the Best Buy warranty claim website. If the current date is greater than the set date at 90 days, selecting the link takes the user to the Mitsubishi warranty claim website. This is shown in method 4700 in FIG. 47. A user clicks on the timed warranty link (step 4710). The system compares the current date to one or more dates in the timed warranty link (step 4720). The system then navigates to the link corresponding to the current date (step 4730). By providing timed warranty links, the user has an improved experience because the appropriate place to submit a warranty claim is automatically presented to the user when the user selects a timed warranty link.

Other information could also be included in the eReceipt. For example, a link to order parts could be included. Thus, an eReceipt for a lawnmower could include a link to a parts web page that would allow the user to order parts for the lawnmower, including blades, belts, or any other parts. The advantage of providing a parts link with the eReceipt is the information in the eReceipt can be used to direct the user to the correct parts page automatically. The user no longer has to go to the garage and find the sticker on the lawnmower that indicates the name, model and serial number, because this information is preferably included in the eReceipt. The eReceipt thus provides a very effective way for sellers and manufacturers to provide valuable information to customers.

Figures 44, 45:
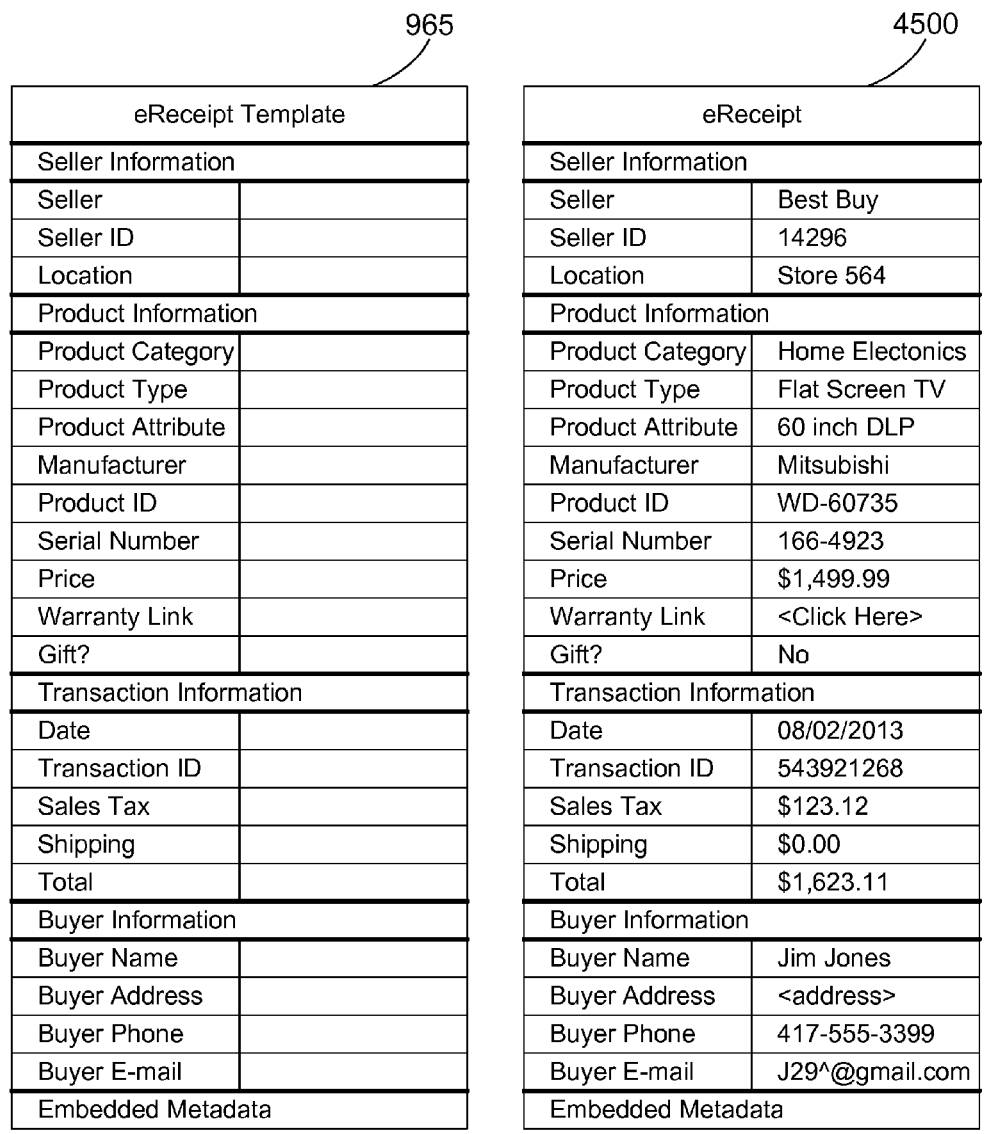
FIG. 44 is an example of an eReceipt template.
FIG. 45 is an example of an eReceipt formatted according to the eReceipt template shown in FIG. 44.

An example of an eReceipt template 965 is shown in FIG. 44 to include multiple sections, including a Seller Information section, a Product Information section, a Transaction Information section, a Buyer Information section, and an Embedded Metadata section. The Seller Information section includes fields for Seller, Seller ID and Location. The Product Information section includes fields for Product Category, Product Type, Product Attribute, Manufacturer, Product ID, Serial Number, Price, Warranty Link, and Gift. Note the Product Information fields are preferably replicated for each item that is purchased. The Transaction Information section includes fields for Date, Transaction ID, Tax, Shipping and Total. The Buyer Information section includes fields for Buyer Name, Buyer Address, Buyer Phone, and Buyer E-mail. The Embedded Metadata field includes data that is in the eReceipt but that is not visible when an eReceipt is viewed. Of course, any suitable field could be included in an eReceipt. The fields shown in FIG. 44 are by way of example, and are not limiting.

Embedded Metadata includes a unique identifier that allows uniquely identifying the eReceipt. Values stored in the Embedded Metadata field include constant values, or values generated using any suitable heuristic. For example, a manufacturer could provide embedded metadata in the form of <SellerID.Date.ValidationCode>, where the SellerID and Date are from the values stored in the eReceipt and the Validation Code is a unique code that is dynamically generated by the seller and assigned to this eReceipt. The Embedded Metadata provides an electronic identifier that can identify this receipt as genuine.

An example of an eReceipt 4500 formatted according to the eReceipt template 965 in FIG. 44 is shown in FIG. 45. This particular eReceipt is for a Mitsubishi 60 inch television purchased at Best Buy. The Seller is listed as Best Buy. The Seller ID is shown as 14296, which could be a code that uniquely identifies Best Buy from other sellers. The TV was purchased at Store 564, which is a code that tells Best Buy where the TV was purchased. The Product Category is Home Electronics. The Product Type is Flat Screen TV. The Product Attribute is 60 inch DLP. The manufacturer is Mitsubishi. The Product ID is WD-60735. The serial number is 166-4923. The price is $1,499.99. The Warranty Link shows <Click Here to make a Warranty Claim>, which is abbreviated in FIG. 45 due to space constraints. The Warranty Link includes a timed warranty link as discussed above. The Gift field has a value of No because this TV was not purchased as a gift.

The purchase date of the TV was Aug. 2, 2013. The transaction ID is 543921268. The Sales Tax is $123.12. The shipping is zero (because the customer purchased the TV at a store). The total for the purchase is $1,623.11. The Buyer Name is Jim Jones. The Buyer Address is 21354 Dogwood, Carthage, Mo. 64836 (not shown in FIG. 45 due to space constraints). The Buyer Phone is 417-555-3399. The buyer e-mail is J29^@gmail.com. The Embedded Metadata is data that uniquely identifies the eReceipt and can be used in the future to validate the eReceipt.

Some sellers could include the buyer information, and some may not. In the most preferred implementation, the eReceipt received from the seller includes the Buyer Information. However, in an alternative implementation, the eReceipt could be e-mailed to the buyer without all of the Buyer Information. When this happens, the eReceipt mechanism could automatically add the buyer information to the eReceipt, or could leave the buyer information incomplete.

Figure 46:
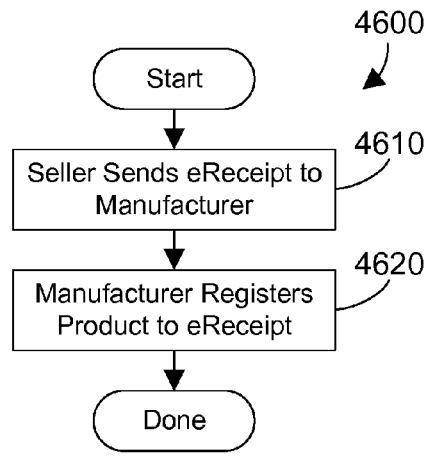
FIG. 46 is a flow diagram of a method for a seller to automatically register a product with a manufacturer by sending the manufacturer an e-Receipt.

One advantage of using eReceipts is this allows manufacturers to receive from sellers a record of who purchased their product and when. Referring to FIG. 46, method 4600 shows a seller sending an eReceipt to a manufacturer that provided the product sold in the eReceipt (step 4610). The manufacturer can then register the product to the eReceipt. Note the product is registered to the eReceipt and not necessarily to the buyer, although the eReceipt includes the buyer's information. This is because many products are purchased as gifts, especially during the Christmas season.

Having eReceipts for gifts is a great advantage, because the eReceipts can be forwarded to gift recipients so they can have the purchase and warranty information for the gifts they received. Thus, after the holiday season is over, a user could do a search for all eReceipts for items purchased in November and December, where the eReceipt indicates the product was a gift. For each such eReceipt, the user who bought the gift could forward the eReceipt via e-mail to the gift recipient. If the gift recipient is a user of the U-Me system, the eReceipt will be processed and put into the user's eReceipt database. Even if the gift recipient is not a user of the U-Me system, having the eReceipt as an attachment to an e-mail will make the eReceipt available on the gift recipient's system so the gift recipient does not have to keep track of a paper gift receipt. Note the eReceipt mechanism 178 can also include the ability to delete price information when forwarding an eReceipt to a gift recipient. A user could check on a "Gift Receipt" box which would delete all financial information from the gift receipt, such as price, sales tax, and shipping, before sending the eReceipt to the gift recipient. The eReceipt mechanism 178 can thus provide an eGiftReceipt to the gift recipient for the product that was given as a gift, which includes all pertinent product information without including the financial information.

Because many products are purchased by one person then given as a gift to a different person, the method 4600 in FIG.

46 registers a product to an eReceipt received from the seller. Let's assume the eReceipt is then transferred from a first U-Me user to a second U-Me user who received the product as a gift from the first U-Me user. If the second U-Me user needs to make a warranty claim, the second U-Me user can click on the warranty link in the eReceipt, which we assume for this example directs the second U-Me user to the manufacturer's warranty claim website, and submits the eReceipt to the manufacturer to identify the product. The manufacturer can then search its database and locate the corresponding eReceipt to which the product was registered. The manufacturer could check the embedded metadata in the eReceipt to verify it is the same as the eReceipt to which the product was originally registered. When the fields in the eReceipt sent by the second user are verified by the manufacturer as matching the fields in the eReceipt to which the product was registered, and when the embedded metadata in both eReceipts match, the manufacturer can then provide the warranty service to the new user.

The eReceipt concept can also be extended to help a user report and potentially recover stolen goods. Let's assume a burglar robs a television, a computer, and a home theater audio system from a U-Me user's house. If the user has eReceipts for these stolen goods, the user can submit the eReceipts to the police, to an insurance company, and to the U-Me system to report the goods as stolen. The U-Me system could, in turn, contact the manufacturer and/or insurance company to inform them these goods were stolen. Because the eReceipt includes all the pertinent information for the product, including serial number, the eReceipt should contain all information law enforcement and insurance companies needs to identify the stolen property if it is recovered.

Figure 48:
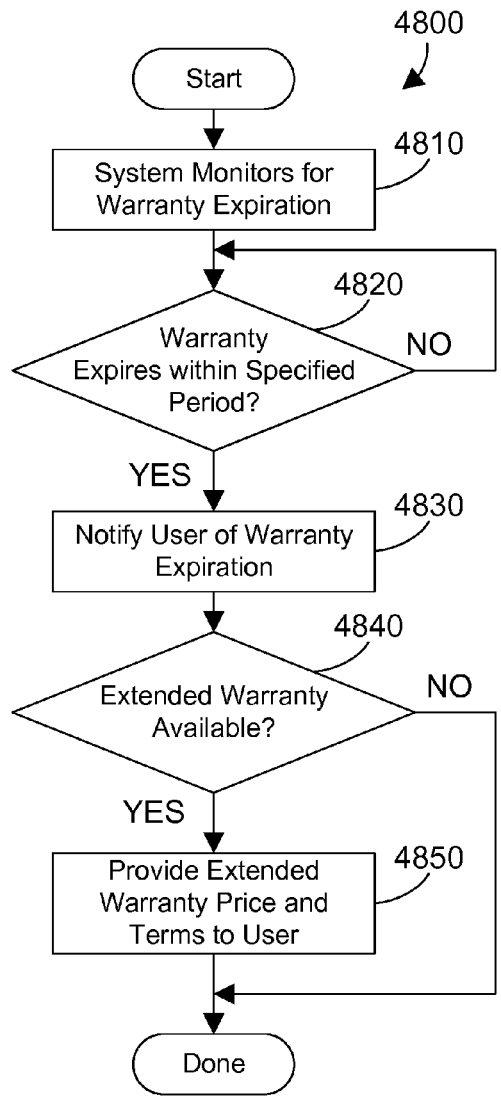
FIG. 48 is a flow diagram of a method for prompting a user to purchase an extended warranty when a warranty is about to expire.

Having eReceipts stored in a user's U-Me account allows monitoring the eReceipts for warranty expiration. Referring to FIG. 48, in method 4800 the U-Me system monitors for warranty expiration (step 4810). This can be done, for example, by logging warranty information embedded in eReceipts. Where there are no warranties near expiration (step 4820=NO), method 4800 loops back and waits. When a warranty for a product in an eReceipt will expire within a specified time period (step 4820=YES), such as two months, the user is notified of the impending warranty expiration (step 4830). When there is an extended warranty available (step 4840=YES), the price and terms of the extended warranty are provided to the user (step 4850). When no extended warranty is available (step 4850=NO), method 4800 ends. Method 4800 provides a way for the U-Me system to provide reminders of warranties that are about to expire, which provides an opportunity for the manufacturer to sell an extended warranty. Even when an extended warranty is not available, the user is still given the notice that the warranty is about to expire.

Figures 49, 50, 51:
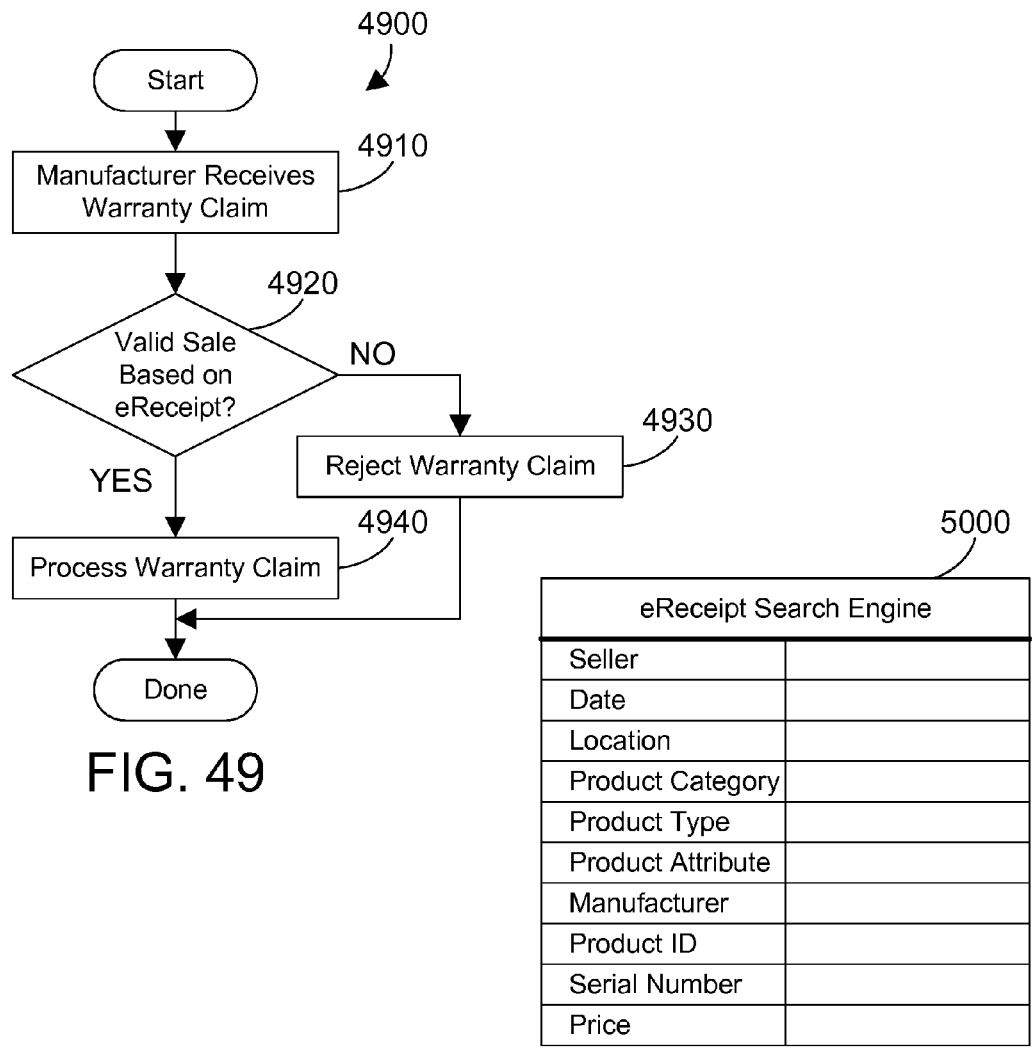
FIG. 49 is a flow diagram of a method for handling a warranty claim using an eReceipt.
FIG. 50 shows an example of a screen for one suitable implementation of an eReceipt search engine.
FIG. 51 shows examples of eReceipt queries that could be submitted via the eReceipt search engine screen shown in FIG. 50.

When a manufacturer receives a warranty claim, the manufacturer can verify the validity of the eReceipt before processing the warranty claim, as shown in method 4900 in FIG. 49. The manufacturer receives a warranty claim (step 4910). When the eReceipt indicates the sale was a valid sale (step 4920=YES), the warranty claim is processed (step 4940). When the eReceipt does not indicate a value sale (step 4920=NO), the warranty claim is rejected (step 4930). The eReceipt can be validated in step 4920 in any suitable way. For example, if the seller sent the eReceipt to the manufacturer at the time of sale, the manufacturer can compare the eReceipt submitted by the user as part of the warranty claim process to the eReceipt received from the seller at the time of sale. If the two match, the sale is valid. Of course, other mechanisms and methods could be used to determine whether a sale based on an eReceipt is a valid sale in step 4920, and the disclosure and claims herein expressly extend to all suitable mechanisms and methods for determining how to validate an eReceipt to make sure it represents a valid sale. This check prevents a user from receiving warranty service when the user submits a bogus eReceipt.

An example of a display for an eReceipt search engine is shown at 5000 in FIG. 5. The eReceipts are stored in the user's U-Me account in an eReceipt database using the fields in the eReceipt as indexing information. This allows eReceipts to be searched using power database query techniques. Examples of eReceipt queries that could be formulated using the eReceipt search engine 5000 are shown in FIG. 51. The example queries 5100 in FIG. 51 include "All purchases this year", "Home Electronics purchased in the last 5 years", and "All products over $500." While certain fields are shown in FIG. 50, these are shown by way of example. The eReceipt search engine could include many fields not shown in FIG. 50. The disclosure and claims herein extend to using any suitable fields or search criteria for searching for eReceipts.

Figure 52:
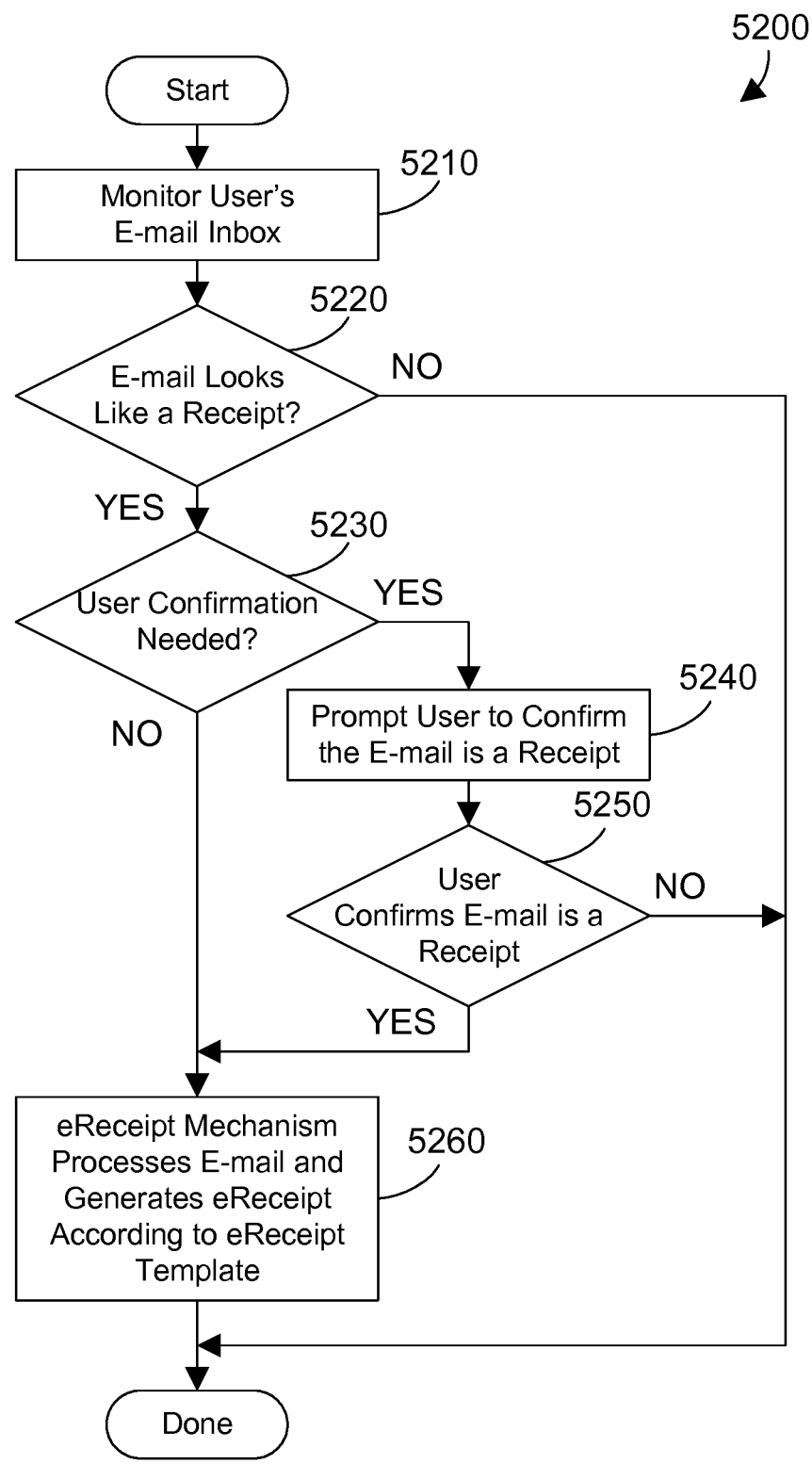
FIG. 52 is a flow diagram of a method for processing an e-mail receipt to generate an eReceipt.

While the U-Me system contemplates users receiving eReceipts from sellers in a format defined by the eReceipt template, such as via an attachment to an e-mail, sellers that do not provide eReceipts in the defined format may still e-mail receipts to users. This is particularly true for online sales. Even when e-mailed receipts are received that do not conform to the eReceipt template, the eReceipt mechanism 178 in the U-Me system can process receipt information in an e-mail and generate a corresponding eReceipt, as shown in method 5200 in FIG. 52, which is preferably performed by eReceipt mechanism 178 in FIG. 5. The user's e-mail inbox is monitored (step S210). If an e-mail does not look like a receipt (step S220=NO), method 5200 is done. When an e-mail looks like a receipt (step S220=YES), a determination is made whether user confirmation is needed (step S230). A user could configure the eReceipt mechanism, for example, to always prompt the user when an e-mail looks like a receipt so the user can confirm the e-mail is a receipt. When user confirmation is needed (step S230=YES), the user is prompted to confirm the e-mail is a receipt (step S240). When the user confirms the e-mail is a receipt (step S250=YES), the eReceipt mechanism processes the e-mail and generates an eReceipt (step S260), filling in fields of the eReceipt with information in the e-mail. When user confirmation is not needed (step S230=NO), the eReceipt mechanism proceeds to process the e-mail and generate an eReceipt (step S260) without further input from the user, filling in fields of the eReceipt with information in the e-mail. While generating an eReceipt from an e-mail is less ideal than receiving an eReceipt in a format that complies with the eReceipt template, the result is still an eReceipt with many of the fields filled in that will allow a user to do searches based on the information in the eReceipt. Method 5200 thus provides a way to convert an ordinary e-mail that includes receipt information into an eReceipt that can be stored in the user's U-Me account and that can be searched using the eReceipt search engine.

Generating eReceipts instead of paper receipts saves trees because paper receipts are not needed. In addition, having receipt and warranty information in electronic form provides many advantages, discussed in detail above.

The U-Me system can be used to store vehicle settings for a user and to download those settings to a different vehicle, even a vehicle the user has never driven before. Let's assume a user travels from Kansas City to Chicago via airplane for a business meeting. Upon arriving in Chicago, the user rents a rental car. Let's assume the rental car is U-Me certified. The user can identify the rental car to the U-Me system, which can then determine the type of car, convert any of the user's settings as required for that car, and download the settings to the car. The user thus benefits from having the U-Me system configure the rental car according to his or her settings stored in the user's U-Me account. The various functions with respect to FIGS. 53-63 discussed below are preferably performed by the vehicle mechanism 180 in FIG. 5.

Figure 53:
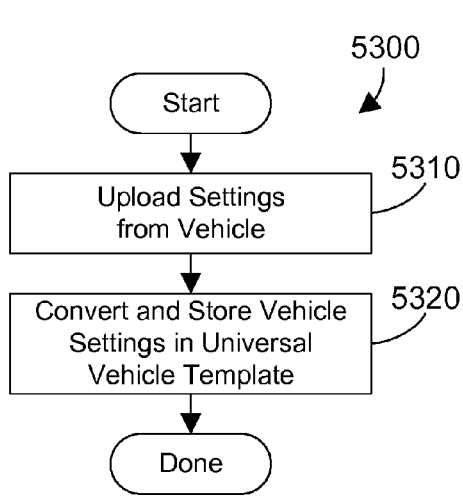
FIG. 53 is a flow diagram of a method for generating settings in a universal vehicle template based on settings from a vehicle.
Figure 54:
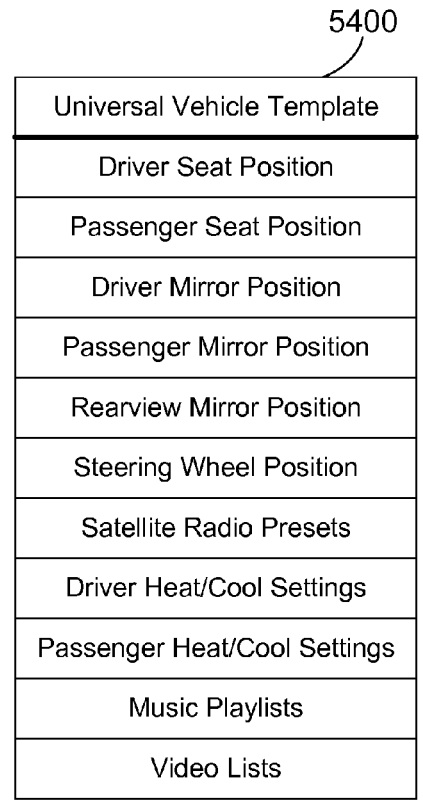
FIG. 54 shows examples of items that could be included in a universal vehicle template.

Referring to FIG. 53, method 5300 begins by uploading settings from a vehicle (step S310). The vehicle settings may then be converted and stored in a universal vehicle template (step S320). The vehicle settings could also be stored in a device-specific template for the user's vehicle. The conversion of settings in step S320 may be performed by the conversion mechanism 160 shown in FIG. 5. One suitable universal vehicle template is shown at 5400 in FIG. 54, which is an example of a suitable universal vehicle template 940. The universal vehicle template 5400 includes settings for driver seat position, passenger seat position, driver mirror position, passenger mirror position, rearview mirror position, steering wheel position, satellite radio presets, driver heat/cool settings, passenger heat/cool settings, music playlists, and video playlists.

Figure 56:
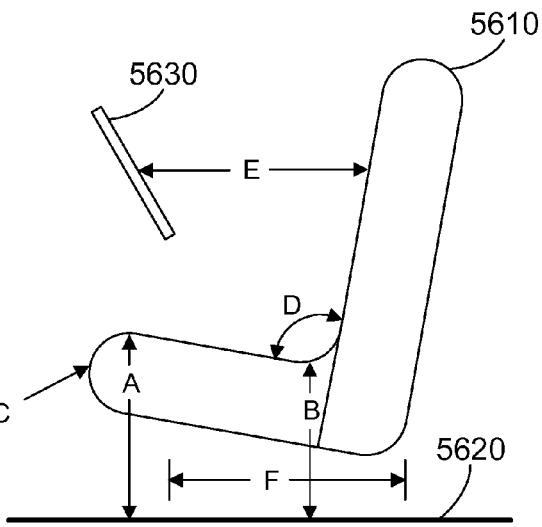
FIG. 56 is a representation of a vehicle seat with respect to the vehicle floor, the vehicle accelerator pedal, and the vehicle steering wheel.

The universal vehicle template is preferably defined such that settings from different car manufacturers can all be converted to and from the settings in the universal vehicle template. We take the example of seat position to illustrate. Referring to FIG. 56, the position of seat 5610 can be expressed in numerous different ways. For example, the position of seat 5610 can be expressed in terms of the height A of the front of the seat above some reference point, such as the floor of the vehicle; height B of the rear of the seat above some reference point; distance C from the accelerator pedal 5640 to a front of the seat; angle D of the back portion with respect to the bottom portion; distance E from the center of the steering wheel to the seat back; and distance F from a reference point on the seat (such as the back) to some fixed reference point.

The way a car represents seat position may vary with the car manufacturer. For example, let's assume one car manufacturer allows adjusting the forward/backward position of the driver's seat over a ten inch span, and uses a stepper motor to do the adjusting. The position of the seat could be expressed as a numerical value for the stepper motor. A different manufacturer may allow adjusting the forward/backward position of the driver's seat over a twelve inch span using an analog motor and a position sensor, where the seat position is stored as a value of the position sensor. The universal vehicle template 5400 preferably describes seat position in a way that is actually descriptive of the position of the seat itself, not based on some motor settings or sensor readings of any particular manufacturer. This may require converting a vehicle's settings to a more universal measure of seat position, such as distance and angle, as represented in FIG. 56. In the most preferred implementation, the process of a car vendor becoming U-Me certified includes the car vendor providing a device-specific template for the car that includes mapping information for converting the car vendor's settings to the types of settings referenced in the universal vehicle template. In this scenario, the device-specific template will be used to do the conversion in step S320 in FIG. 53 from the vehicle settings to the equivalent settings in the universal vehicle template.

Let's assume the user drives a 2012 Lexus RX350. When the user's settings in the 2012 Lexus RX350 are uploaded to the user's U-Me account, there may be multiple device-specific vehicle templates that apply to this vehicle, such as: a vehicle template for the 2012 Lexus RX350; a vehicle template for 2012 Lexus vehicles; a vehicle template for Lexus small SUVs; etc. These vehicle templates are preferably provided by the vehicle manufacturer to identify user settings in their vehicles, and how these settings map to the universal vehicle template.

Figure 55:
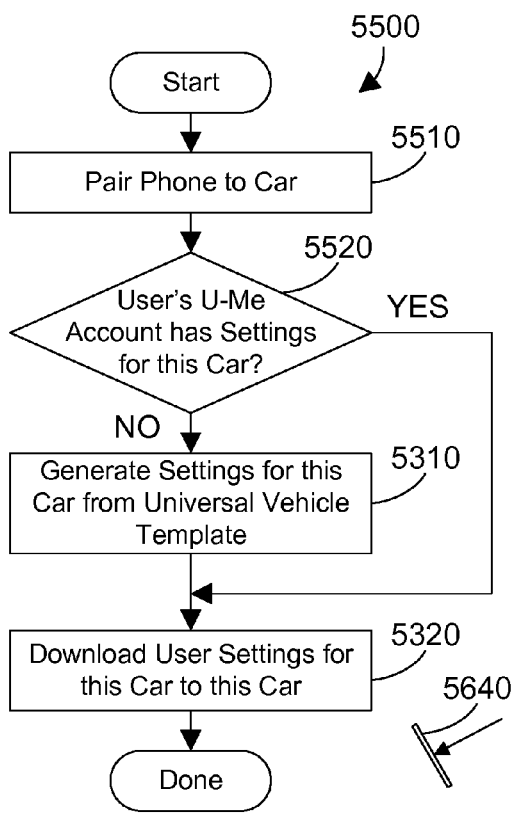
FIG. 55 is a flow diagram of a method for downloading user settings to a car from the user's U-Me account.

FIG. 55 shows a method 5500 that could be representative, for example, of the steps when a user rents a car that is U-Me certified. First, the phone is paired to the car (step S510). Pairing the phone to the car allows the user's phone to send the information identifying the car to the U-Me system, and to authenticate the user to the U-Me system via the user's phone. When the user's U-Me account already has settings for this car (step S520=YES), the user settings for this car are downloaded from the user's U-Me account to the car (step S320). This can happen, for example, when the user rents a car that is the same type of car the user drives at home, or is the same type of U-Me certified car the user has rented before. When the user's U-Me account does not have settings for this car (step S520=NO), the settings for this car are generated from the universal vehicle template (step S310), and those settings are then downloaded to the car (step S320). As a result, all of the user's preferred settings (see FIG. 54) are made available in the rental car. The result is a car that is configured to the user's taste with minimal effort from the user. While the discussion above assumes the car communicates with the user's phone, which in turn communicates with the U-Me system, other configurations are possible. For example, a car or other vehicle could include a transceiver that allows the vehicle to directly interact with the U-Me system, instead of going through the user's phone.

Figure 57:
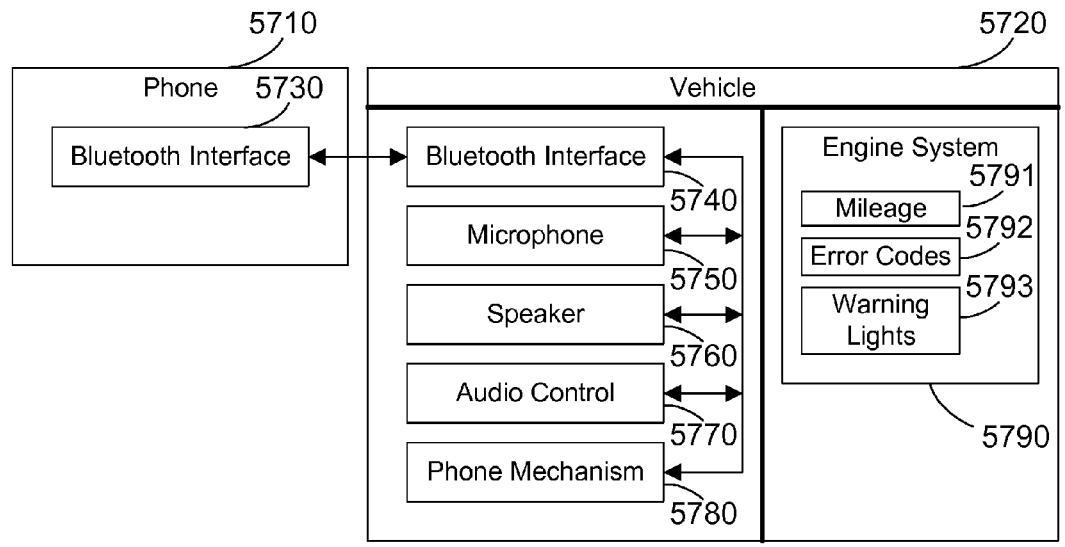
FIG. 57 is a block diagram of a system for using a phone hands-free in a prior art vehicle.

FIG. 57 shows a block diagram of a phone 5710 coupled via Bluetooth interfaces 5730 and 5740 to a prior art vehicle 5720. The Bluetooth interface 5740 of known cars provides a way to pair the phone 5710 to the vehicle 5720 so the user may use the phone hands-free while driving. The Bluetooth interface 5740 thus communicates with a phone mechanism 5780, which controls the microphone 5750, speaker 5760 and controls of the audio system 5770 during a phone call. For example, when the user is listening to the radio and a call comes in, the phone mechanism 5780 mutes the radio using the audio control 5770, announces via speaker 5760 the user has an incoming call, and when the user presses a button to answer the call, the phone mechanism 5780 then communicates with the phone 5710 to service the call, including playing the call audio on the speaker 5760 and receiving the user's voice input to the call via microphone 5750.

In known vehicles, a user cannot access any of the engine system 5790 via the Bluetooth interface 5740 that communicated with the user's phone. The engine system 5790 includes information in electronic form that could be useful to the user, including mileage 5719, error codes 5792, and warning lights 5793. Because prior art vehicles do not allow the phone to communicate with the engine system 5790, the user cannot use information that is generated in the engine system 5790.

Figure 58:
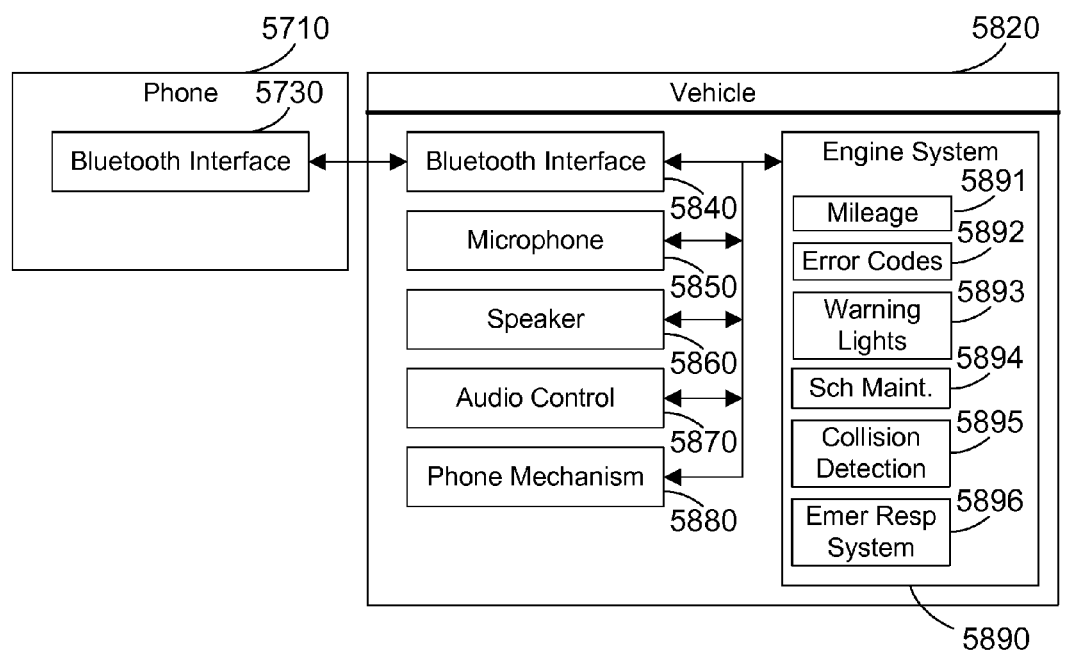
FIG. 58 is a block diagram of a system for using a phone hands-free and also for accessing information in the vehicle's engine system.

Referring to FIG. 58, the same phone 5710 with its Bluetooth interface 5730 communicates with the Bluetooth interface 5840 to service telephone calls using microphone 5850, speaker 5860, audio control 5870, and phone mechanism 5880, similar to what is done in the prior art system shown in FIG. 57. Note, however, the Bluetooth interface 5840 has access to the engine system 5890. This means information in the engine system 5890 can be communicated via the Bluetooth interface 5840 to the user's phone, and from there to the user's U-Me account. Information such as mileage 5891, error codes 5892, warning lights 5893, scheduled maintenance 5894, collision detection 5895, and emergency response system 5896 can be made available to the U-Me system by a vehicle such as vehicle 5820 that has been U-Me certified.

Figure 59:
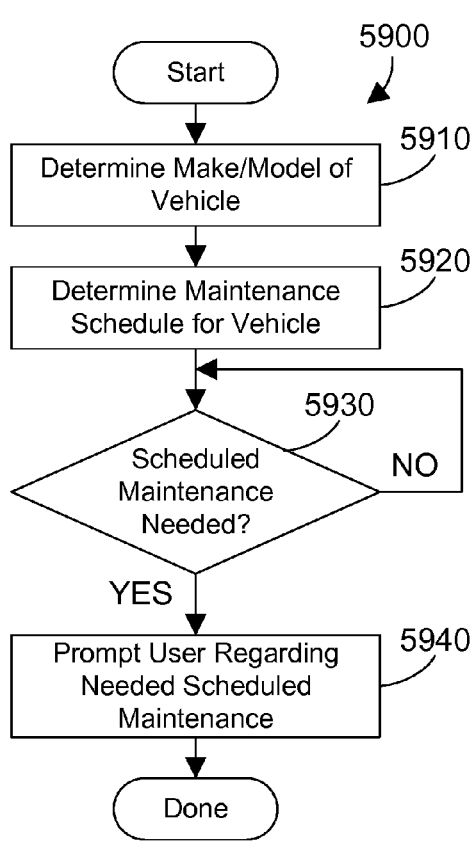
FIG. 59 is a flow diagram of a method for prompting a user regarding scheduled maintenance for a vehicle.

Method 5900 is shown in FIG. 59, and begins by determining the make and model of the vehicle (step S910). The maintenance schedule for the vehicle is then determined (step S920). When no scheduled maintenance is needed (step S930=NO), method 5900 waits until scheduled maintenance is needed (step S930=YES). The user is prompted regarding the needed scheduled maintenance (step S940). Method 5900 is then done. Note the information in steps 5910 and 5920 may be stored in the engine system itself, as shown at 5894 in FIG. 58. In the alternative, the information in steps 5910 and 5920 may be retrieved from a manufacturer's website, from a third party website, or from the U-Me system. Because the U-Me system now has access to the engine system 5890 in FIG. 58 via the user's phone, the U-Me system can provide information regarding the status of the engine to the U-Me user.

Figure 60:
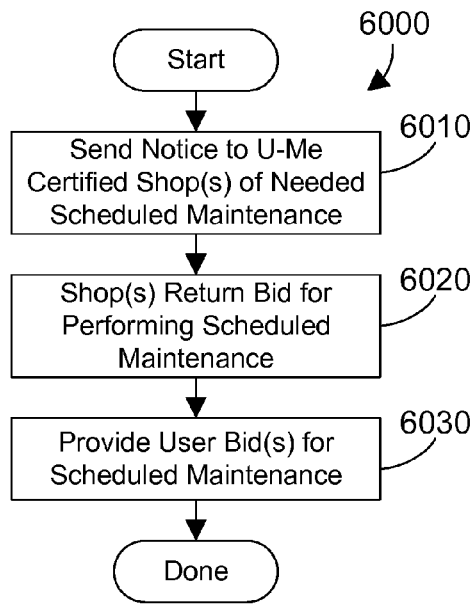
FIG. 60 is a flow diagram of a method for providing shop bids to a user for scheduled maintenance.

When scheduled maintenance is needed (step S930=YES in FIG. 59), the U-Me system can perform method 6000 in FIG. 60. A notice can be sent to one or more U-Me certified shops of the needed scheduled maintenance (step 6010). The notified shop(s) then return a bid for performing the scheduled maintenance to the U-Me system (step 6020). The U-Me system then provides the bids to the user (step 6030). In this manner the user can automatically receive bids from one shop or from competing shops with the bids for doing the scheduled maintenance. Note while FIG. 60 shows the specific case of scheduled maintenance, a similar method could be performed when an error code or engine warning light comes on so the user can automatically receive one or more bids for performing the repair that is needed based on the error code or warning light.

Figure 61:
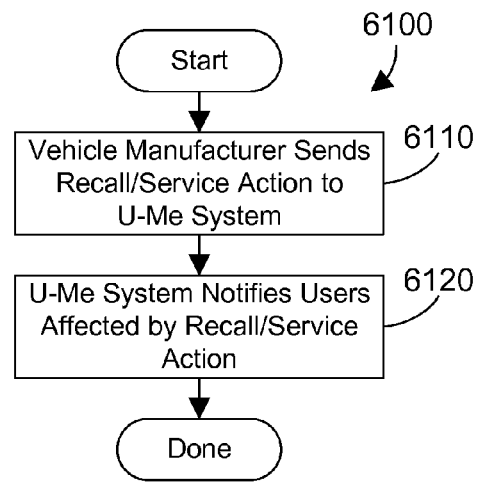
FIG. 61 is a flow diagram of a method for notifying users of the U-Me system of manufacturer recalls and service actions for the manufacturer's vehicles.

The U-Me system also provides a central place for vehicle manufacturers to notify customers of recalls or service actions, as shown in method 6100 in FIG. 61. Referring to FIG. 61, the vehicle manufacturer sends the recall or service action information to the U-Me system (step 6110). The U-Me system then notifies its users who are affected by the recall or service action (step 6120).

Figure 62:
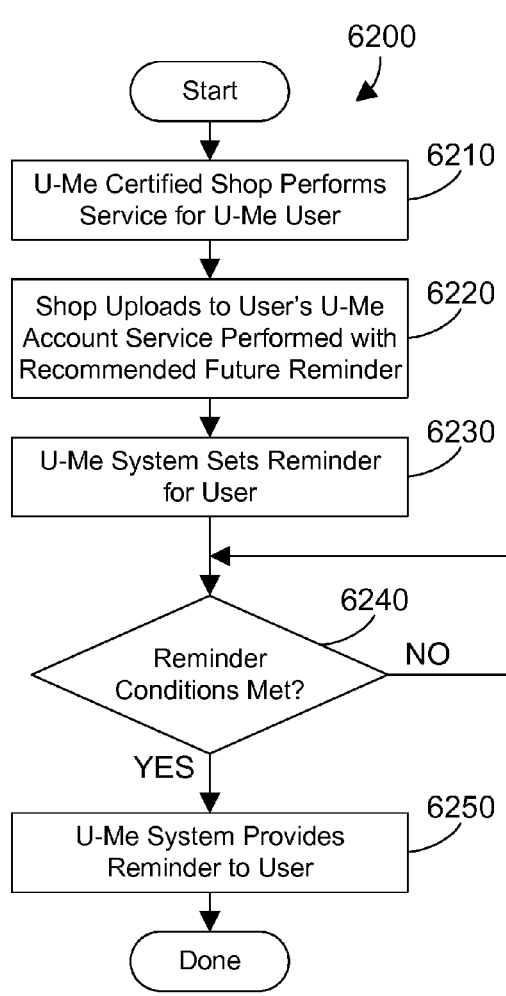
FIG. 62 is a flow diagram of a method for providing vehicle service reminders to a user.

A great advantage to the U-Me system is having U-Me certified shops store the service performed on a user's vehicle to the user's U-Me account, which can trigger reminders for the user. Referring to FIG. 62, a method 6200 begins when a U-Me certified shop performs service for the U-Me user (step 6210). The shop uploads to the user's U-Me account the service performed by the shop, with a recommended future reminder (step 6220). For example, if the shop changes the oil, the shop could upload a record of the oil change along with a recommendation that a reminder be set to change the oil in 5,000 miles. The U-Me system sets the reminder for the user (step 6230). When the reminder conditions are not met (step 6240=NO), method 6200 waits, until the reminder conditions have been met (step 6240=YES). The U-Me system then provides a reminder to the user (step 6250). Method 6200 is especially useful for service that needs to be performed at specified mileage and/or time intervals, such as oil changes and rotation of the tires.

Figure 63:
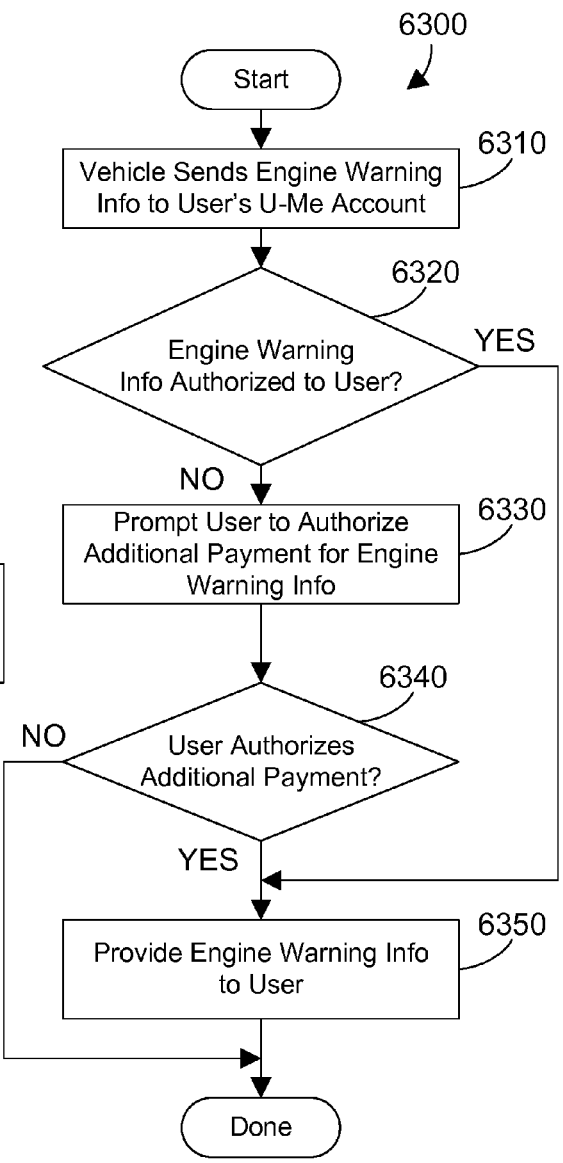
FIG. 63 is a flow diagram of a method for prompting the user when engine warning information is sent to the user's U-Me account.

Once the user has access to the vehicle's engine system as shown in FIG. 58, other methods are possible, such as method 6300 shown in FIG. 63. The vehicle sends engine warning information to the user's U-Me account (step 6310). Engine warning information can include, for example, information from error codes 5892, warning lights 5893, a collision detection system 5895, or an emergency response system 5896. When the engine warning is authorized to the user (step 6320=YES), the engine warning information is provided to the user (step 6350). When the engine warning is not authorized to the user (step 6320=NO), the user may be prompted to authorize additional payment for access to the engine warning information (step 6330). When the user does not authorize the additional payment (step 6340=NO), method 6300 is done. When the user authorizes the additional payment (step 6340=YES), the engine warning information is provided to the user (step 6350). A simple example will illustrate. Let's assume the engine produces an error code that indicates the fuel pump is failing. This could be indicated on the dash by a "service engine soon" light, but this does not give the user any meaningful information regarding what service is required. Having access to this engine warning information could cost a premium above the normal U-Me subscription, so the user could be prompted in step 6330 to authorize an additional charge of, say $5, to access the information. If the user is on a long highway trip and the "service engine soon" light comes on, the user doesn't know whether the warning is minor or more serious. In the case of a fuel pump that is failing, knowing the fuel pump is failing may allow the user to stop at a repair shop in the next town. In this scenario, paying an extra $5 for the engine warning information is money well-spent.

As discussed above, the widespread acceptance of digital photography has been accompanied by a corresponding widespread problem of most users having thousands of digital photos that are stored using cryptic names in many different directories or folders on their computer systems, making retrieval of photographs difficult. The U-Me system provides an improved way to manage photos, including photos that originated from a digital camera or other digital device, along with hard copy photos that have been digitized for electronic storage. The U-Me system improves over the known art of software that adds metadata to photos by providing a people-centric approach to managing photos, as described in detail below with reference to FIGS. 64-79. The methods discussed with respect to FIGS. 64-79 are preferably performed by the photo mechanism 182 shown in FIG. 5.

Figure 64:
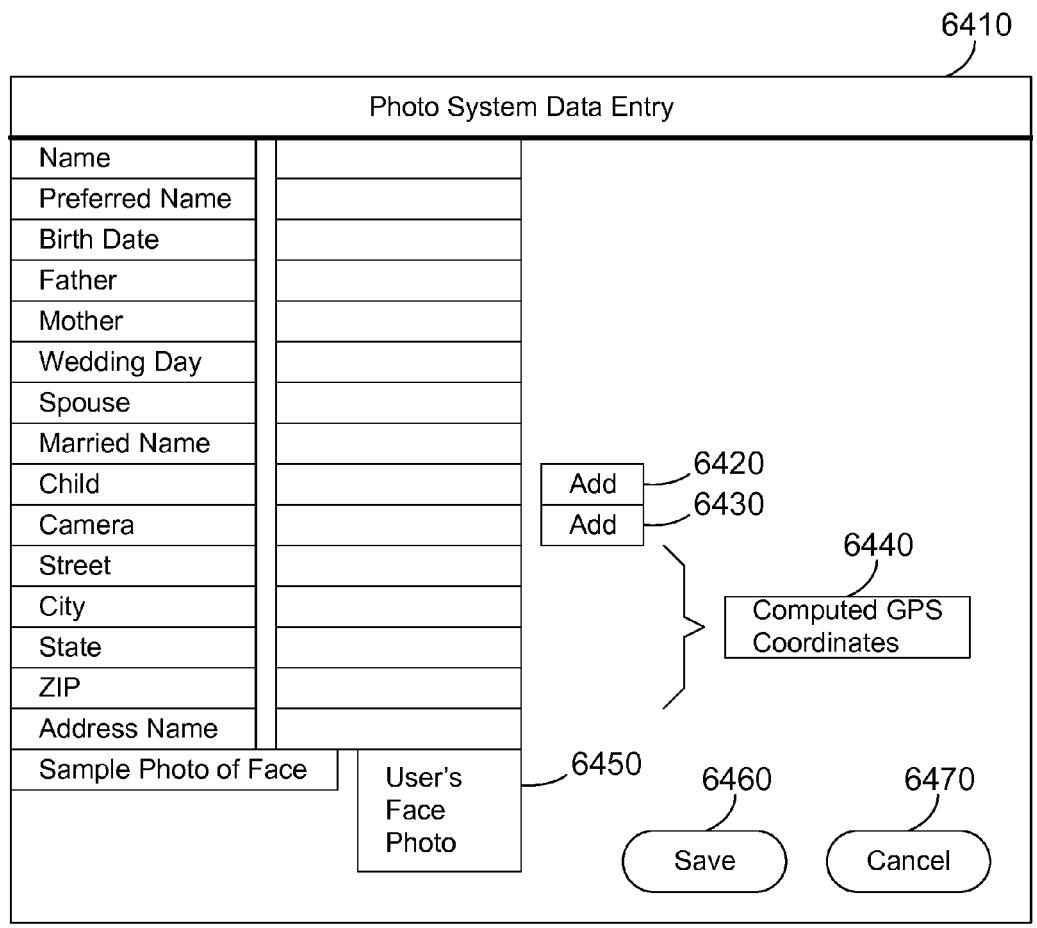
FIG. 64 is an example of a photo system data entry screen.

The U-Me system includes a photo system data entry screen, such as screen 6410 shown in FIG. 64 by way of example. The photo system data entry screen 6410, like all of the U-Me system, is person-centric. Thus, when a user decides to have the U-Me system manager the user's photos, the user starts by entering data for a particular person in the photo system data entry screen 6410. Fields in the photo system data entry screen 6410 include Name, Preferred Name, Birth Date, Father, Mother, Wedding Day, Spouse, Married Name, Child, Camera, Street, City, State, ZIP and address name. The user can provide a sample photo of the person's face at 6450 to help train the facial recognition engine in the U-Me photo system. Note the Child field includes an Add button 6420 that allows the user to add additional children. Similarly, the Camera field includes an Add button 6430 that allows the user to enter all cameras the user uses to take digital photos. When the user enters the location information in the Street, City, State, and ZIP fields, the U-Me system computes GPS coordinates for that location, and stores those GPS coordinates at 6440 relating to the address of the person whose information appears on the screen 6410.

Figures 65, 66:
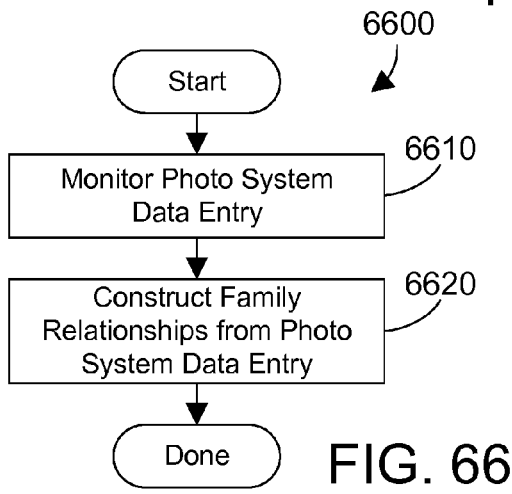
FIG. 65 is the example photo system entry screen in FIG. 64 filled with sample data.
FIG. 66 is a flow diagram of a method for the U-Me system to construct family relationships from information entered in the photo system data entry screen.

A sample photo system entry page 6510 with data filled in is shown in FIG. 65. The name of the person is Jim Jones, his preferred name is Jimmy, his birth date is Aug. 3, 1957, his father is Fred Jones, his mother is Sally Jones, his wedding day was Jun. 21, 1983, his spouse is Pat Jones, the Married Name field is empty indicating his married name is the same as what was entered above, he has two children Billy Jones and Sandy Jones, the camera he uses to take photos is a Nikon Coolpix S01, his address is 21354 Dogwood, Carthage, Mo. 64836. The name chosen for this address is "Jim and Pat's House." A photo is provided at 6550 that is a good photo of Jim's face. The GPS coordinates for the address is computed and displayed at 6540. Once the user is satisfied with the content in the data entry screen 6510, the user can select the Save button 6360 to save this information to the user's U-Me account. If the user wants to abort the data entry, the user can select the Cancel button 6370.

Referring to FIG. 66, as entries are made into the photo system (e.g., as shown in FIG. 65), method 6600 monitors the photo system data entry (step 6610) and constructs family relationships from the photo system data entry (step 6620). People naturally think along the lines of family relationships. While known software for adding metadata to a photo allows adding name labels such as "Katie" and perform facial recognition, these labels have no meaning within the context of other people in the photos. The U-Me system, in contrast, constructs family relationships that allow storing and retrieving photos much more effectively than in the prior art.

The initial entry of photo system data for all the people in a user's immediate and extended family may take some time, but once this work is done the U-Me system can use this data in many ways that allow easily storing photos to and easily retrieving photos from the user's U-Me account.

Figure 67:
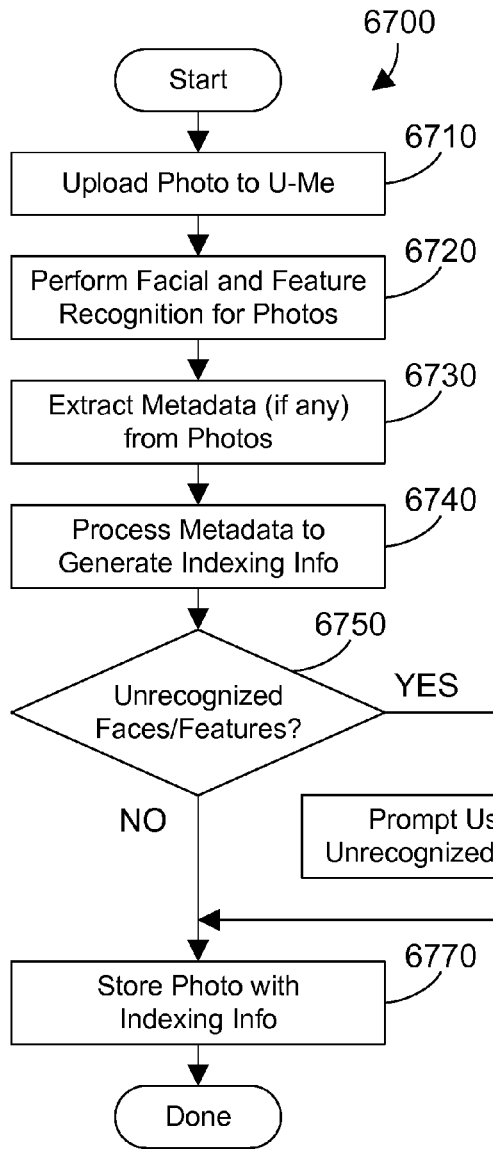
FIG. 67 is a flow diagram of a method for generating indexing information for photos and for storing photos with the indexing information.

Referring to FIG. 67, a method 6700 begins by uploading a photo to the user's U-Me account (step 6710). Facial and feature recognition is performed on the photo (step 6720). Facial recognition is known in the art, but the processing in step 6720 preferably also includes feature recognition. Feature recognition may recognize any suitable feature or features in the photo that could be found in other photos. Examples of features that could be recognized include a beach, mountains, trees, buildings, a ball, a birthday cake, a swing set, a car, a boat, etc. Any existing metadata in the photo is extracted (step 6730) and processed to generate indexing information for the photo (step 6740). If there are unrecognized faces or features (step 6750), the user may be prompted to identify the unrecognized faces and/or features (step 6760). The photo is then stored with the indexing information generated in step 6740 (step 6770). The result is a digital photo stored with indexing information that may be used to retrieve the digital photo later using a powerful database search engine, discussed in more detail below.

By prompting the user for unrecognized faces and features, method 6700 gives the user the chance to build up a library of faces and features that the system will have an easier time recognizing next time around. For example, step 6760 might display the photo with various different faces and regions defined. The user could select a face, then enter the name for the person, or if the person will appear in many photos, the user could enter some or all of the person's data in a photo system data entry screen, similar to that shown in FIG. 65. The user could also select various regions of the photo to define features that could be recognized in future photos. For example, if a photo shows a couple on a beach with a cruise ship in the background, the user could click on each face to define information corresponding to those two people, and could also click on the sand on the beach and define this feature as "beach", click on the water and define this feature as "water", and click on the cruise ship and define this feature as "boat." Using various heuristics, including artificial intelligence algorithms, these features may be recognized in other photos, which allows adding indexing information that describes those features automatically when the photo is processed, as shown in method 6700 in FIG. 67.

The indexing information generated in step 6730 preferably includes data that is not in the metadata for the photo, but is generated based on the metadata and information stored in the user's U-Me account. For example, when the U-Me system recognizes a date in the photo metadata that corresponds to Jim & Pat's wedding anniversary, the U-Me system can generate indexing info for the photo that identifies the Event for the photo as Jim & Pat's Wedding Anniversary. Having dates, locations and relationships defined in the user's U-Me account provides a way to add indexing info to a photo that will help to retrieve the photo later using a powerful search engine, discussed in more detail below.

Figure 68:
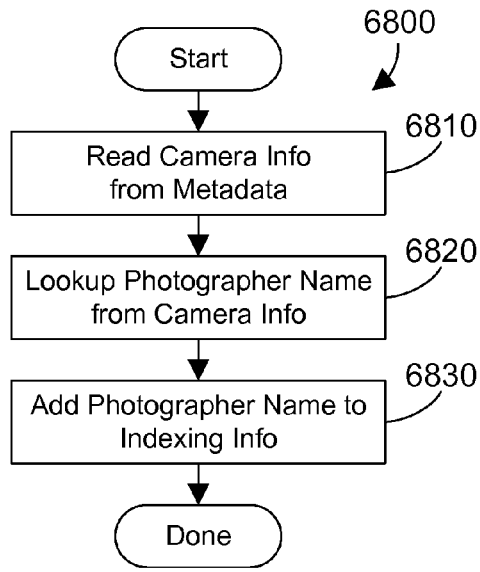
FIG. 68 is a flow diagram of a method for adding a photographer's name to indexing information for a photo.

One advantage to the U-Me system being person-centric is camera information can be converted to the corresponding person who took the photo. Referring to FIG. 68, a method 6800 reads camera info from the metadata for a photo (step 6810), looks up the photographer name that corresponds to the camera info (step 6820), and adds the photographer's name to the indexing info (step 6830). In this manner, the metadata in the photo that identifies the camera is used to go a step further to identify the person who uses that camera so the photographer can be specified in the indexing information for the photo.

FIG. 69 shows sample metadata 6900 that may exist in known digital photos. Note the term "metadata" is used herein to mean data that is not part of the visible image in the digital photo that describes some attribute of the photo. The metadata 6900 in FIG. 69 is shown to include fields for Camera Make, Camera Model, Camera Serial Number, Resolution of the photo, Image Size of the photo, Date/Timestamp, and Geocode Info. The metadata shown in FIG. 69 is shown by way of example. Many other fields of metadata are known in the art, such as the metadata fields defined at the website photometadata.org. The photo metadata disclosed herein expressly extends to any suitable data, whether currently known or developed in the future, that is placed in the digital photo file by the device that took the photo to describe some attribute that relates to the photo.

When photo metadata includes geocode info as shown in FIG. 69 that defines the geographical location of where the camera was when the photo was taken (as is common in smart phones), method 7000 in FIG. 70 reads this geocode info from the metadata (step 7010). The geocode info can be in any suitable form such as GPS coordinates or other forms of geocode info that specifies location, whether currently known or developed in the future. The geocode info is processed to determine whether the geocode info corresponds to a recognized location (step 7020). If not (step 7020=NO), method 7000 is done. When the geocode info corresponds to a recognized location (step 7020=YES), the location name is added to the indexing info for the photo (step 7030). For example, let's assume Jim Jones takes a photo with his cell phone of his daughter at his house. The geocode info will reflect that the location corresponds to a stored location, namely, Jim & Pat's House. Jim & Pat's House can then be added to the indexing information, which makes retrieval of photos much easier using a photo search engine.

While most young adults and children have taken only digital photographs for their entire lives, older people typically have hundreds or thousands of hard copy photographs. These people need a way to store those photos electronically so they can be easily searched and retrieved as needed. Referring to FIG. 71, method 7100 begins by scanning a hard copy photo (step 7110). Facial and feature recognition is performed (step 7120). A wizard prompts the user to enter indexing information for the photo (step 7130). The indexing information is appended to the scanned image data for the photo (step 7140). The photo with its indexing info is then stored in the user's photo database (step 7150).

Repeating method 7100 for hundreds or thousands of individual photos may be too time-consuming. Instead, the user may process photos in groups. Referring to FIG. 72, method 7200 begins by a user invoking a photo indexing info generator (step 7210). The user can then define indexing info for groups of photos or for individual photos (step 7220).

Figures 73, 74, 75:
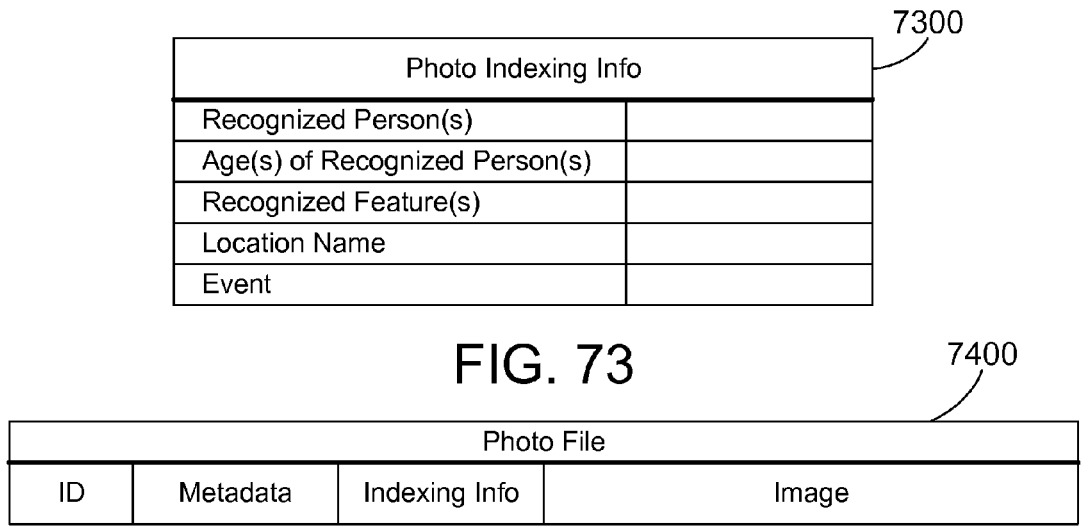
FIG. 73 shows examples of photo indexing info.
FIG. 74 shows an example photo file stored in a user's U-Me account.
FIG. 75 is an example of a screen for a user to generate indexing info for one or more photos as shown in the method in FIG. 72.

Examples of suitable indexing info 7300 are shown in FIG. 73 to include fields for Recognized Person(s), Age(s) of Recognized Person(s), Recognized Feature(s), Location Name and Event. Note the Recognized Person(s), Age(s) of Recognized Person(s) and Recognized Feature fields could be replicate for as many recognized persons or features that exist in the photo. A sample photo file 7400 is shown in FIG. 74 to include an identifier (ID), Metadata, Indexing Info, and the Image. While the indexing information is "metadata" in a general sense, the term "metadata" as used herein relates to data generated by the camera that describes some attribute related to the image, while "indexing info" as used herein relates to data that was not included in the metadata for the image but was generated by the U-Me system to facilitate retrieval of photos using a powerful search engine.

An example of a photo indexing info generator screen 7500 is shown in FIG. 75 to include Date fields, a People field, an Event field, a Location field, and a display of thumbnails of photos. The user specifies a date or range of dates in the Date fields. The user specifies one or more people in the People field. The user specifies location in the Location field. An example will illustrate how a user might use the photo indexing info generator in FIG. 75 to generate indexing info for scanned hard copy photos. Let's assume Jim Jones has a stack of 163 photos of all the wedding-related photos of when he married Pat, including some on the morning of their wedding day showing the wedding ceremony, some that were taken later on their wedding day at the reception, and some a week later at a second reception in Pat's hometown. Instead of defining indexing info for each photo, Jim could enter a date range that begins at the wedding day and extends to the date of the second reception, could define an event called "Jim & Pat's Wedding", and could select the 163 thumbnails that correspond to the wedding and reception photos. Once this is done, the user selects the Save button 7560, which results in the photos being saved in Jim's photo database with the appropriate dates and event information as indexing information. Note the Event and Location fields can include drop-down lists that list events and locations that have been previously defined, along with a selection to define a new event or location. If the user decides to abort entering the indexing info for photos, the user may select the Cancel button 7570.

A significant advantage of generating indexing info for photos is the ability to search for and retrieve photos using the indexing info. No longer must a user search through hundreds or thousands of thumbnails stored in dozens or hundreds of directories with cryptic names that mean nothing to a person! Instead, the user can use a photo search engine to retrieve photos based people, their ages, family relationships both entered and computed, location, and dates.

One example of a screen 7600 for a photo search engine is shown in FIG. 76. The example shown in FIG. 76 includes fields for Date(s), Event, Location, People, Relationship, and Photographer. Because of the family relationships generated by the U-Me system (e.g., in step 6620 in FIG. 6), searches or queries for photos can now be formulated based on those generated relationships. Examples of photo queries supported by the photo search engine 7600 in FIG. 76 are shown at 7700 in FIG. 77, and include: photos of grandchildren of Jim Jones between the ages of 6-18 months; photos of the wedding of Sandy Jones; and photos taken at the Lake House in 2010. These simple examples illustrate that adding indexing info that relates to people and locations allows for much more powerful querying and retrieving of photos than is known in the art.

The user may want to share photos stored in the user's U-Me account. This can be done using a photo share engine, a sample display of which is shown at 7800 in FIG. 78. The photo share engine is preferably provided as a feature of the sharing mechanism 174 shown in FIG. 5. The user defines criteria for photos to share, then specifies other U-Me users with which to share the photos. The user can also select whether to share the metadata and whether to share the indexing info. The criteria for photos to share can include any suitable criteria, including any suitable criteria that could be entered into the photo search engine for retrieving a photo. The "Share with" field could be a drop-down list with people in the U-Me system, could be a drop-down list of people the user has defined in the user's U-Me account, or could be an e-mail address or other unique identifier for the person. A user could thus enter the e-mail address of a person who is not a U-Me member, and this could result in the U-Me system sending an e-mail to the person inviting the person to join U-Me to view the photos the user is trying to share with the person.

Figure 79:
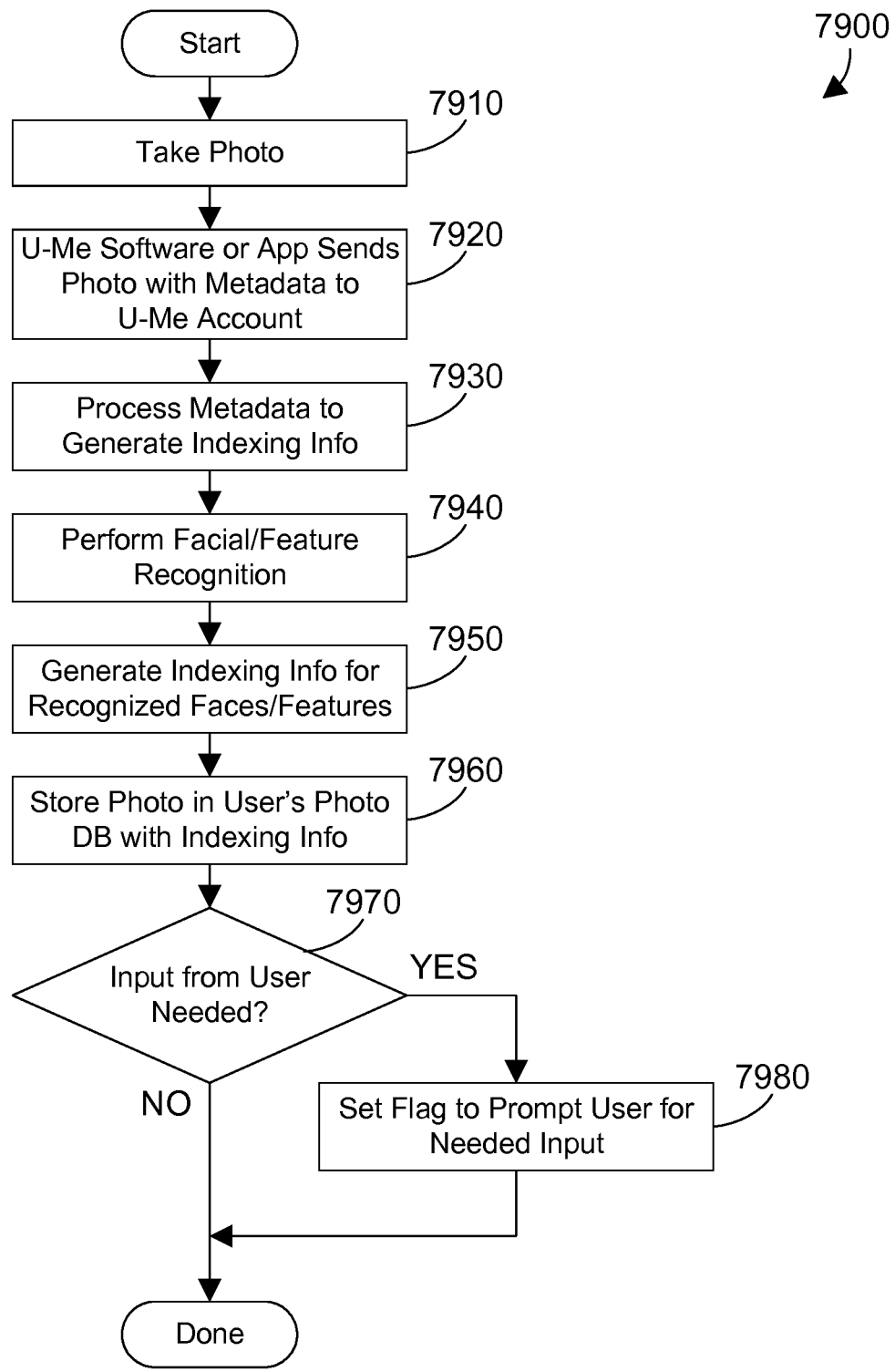
FIG. 79 is a flow diagram of a method for processing a photo just taken and storing the photo with automatically-generated indexing information in the user's U-Me account.

Method 7900 in FIG. 79 shows a method for storing a photo with corresponding indexing information. The user takes the photo (step 7910). The U-Me software or app sends the photo with metadata to the user's U-Me account (step 7920). The U-Me software or app can send the photo with metadata to the user's U-Me account in any suitable way, including a direct connection from the U-Me software or app to the U-Me system. In the alternative, the U-Me software or app can send one or more e-mails to the user. The U-Me system monitors incoming e-mail, and when a photo is detected, embedded in an e-mail or as an attachment, the U-Me system recognizes the file as a photo. The metadata is processed to generate indexing info (step 7930). Facial and feature recognition is performed (step 7940). Indexing information is generated for all recognized faces and features (step 7950). The photo is then stored with its metadata and with the generated indexing info in the user's photo database (step 7960). When input from the user is needed (step 7970=YES), a flag is set to prompt the user for the needed input (step 7980). Setting a flag lets the user decide when to enter the needed input. Thus, when a user has some spare time, the user may log into the U-Me account and enter all needed input that has accumulated for many photos that have been taken. Method 7900 could be carried out by a user taking a photo with a smart phone that is running the U-Me app, which results in the photo being automatically uploaded, processed, and stored in the user's U-Me account.

The generation of location-based indexing info for photos may be done using any suitable heuristic and method. For example, let's assume Jim & Pat live on 40 acres of land. The GPS coordinates for their address may correspond to the mailbox at the road, which could be several hundred yards away from the actual house. Using the U-Me app on his smart phone, Jim could walk the perimeter of their 40 acres, identifying the corner points of the property by selecting a button on the app. When Jim arrives back at the point of origin, the U-Me app will recognize the various points define a closed area, and will define a region that includes the entire area. Jim could repeat the procedure on the outside corners of the house. Jim could then define the 40 acres as "Jim & Pat's Property" and the house as "Jim & Pat's House." If Jim takes a photo of a grandson at a birthday party in his living room in his house, the U-Me system will recognize the location as Jim & Pat's House, and will store this location as indexing info with the photo. If Jim takes a photo of the grandson fishing at a pond on the property, the U-Me system will recognize the smart phone is not at the house but is on the property, and will recognize the location as "Jim & Pat's Property", and will store this location as indexing info with the photo. In addition, various heuristics could be defined to generate location descriptors. For example, anything within 100 yards of a defined location but not at the defined location could be "near" the defined location. In addition, some geographic regions may be predefined within the U-Me system. For example, anything within the city limits of a city could be "within" the city. Large tourist destinations such as Disney World could be included in a location database, so the name Disney World can be added as a location to indexing information for all photos taken while at Disney World. The same could be done for state and national parks, and for any other defined geographical region. The disclosure and claims herein expressly extend to any suitable location information that could be generated and included as indexing information to describe location of where a photo was taken.

The medical field is one area where technology has led to great advances in some areas. For example, modern medical equipment such as Magnetic Resonance Imaging (MRI) machines allows imaging the body in non-invasive ways with sufficient resolution that allows diagnoses based on graphical images. However, some areas of the medical field have lagged way behind technology. One of these areas is how medical records are generated, stored, and retrieved. Most doctors and other medical providers still use hard-copy files. This is grossly inefficient. In addition, the medical files are typically kept by each medical provider in each provider's respective offices. For example, let's assume a patient goes to her dentist, who exams the patient and believes the patient needs a root canal on a tooth. Assuming the dentist does not do root canals, the dentist could refer the patient to an Endodontist for the root canal. Because the files are in hard-copy form, the dentist could make a copy of the exam notes and the X-ray of the tooth, and provide these to the patient, who carries these hard copy records by hand to the Endodontist. The medical profession needs to modernize and create electronic files instead of hard copy files.

Any patient who has seen many doctors soon realizes what an inefficient system we currently have for medical records. One doctor may request copies of a patient's medical records from another doctor, but this takes written authorization by the patient and also takes time due to the time needed to process and mail the hard copy records. A patient has a right to obtain copies of their medical records, and can request copies in writing. But managing hard copy files of medical information is grossly inefficient in our highly-computerized world today. The U-Me system addresses this problem by making a user's medical information available in the user's U-Me account.

Figure 80:
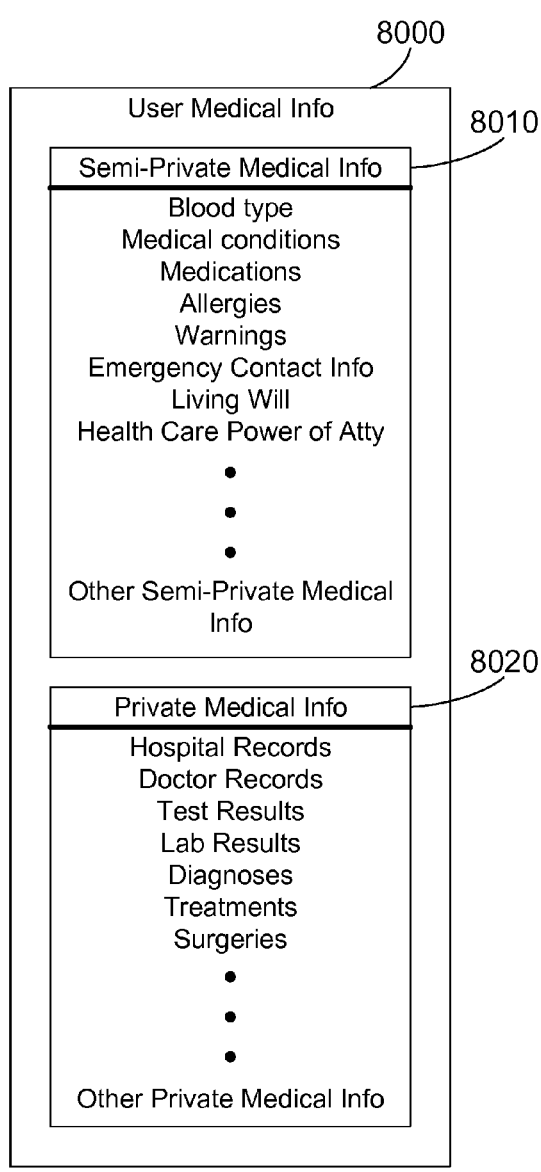
FIG. 80 shows an example of medical information for a user.

Various functions relating to medical info are shown in FIGS. 80-92 and are discussed in detail below. These functions are preferably performed by the medical info mechanism 184 shown in FIG. 5. Referring to FIG. 80, user medical info 8000 is one suitable example for user medical info 660 in FIG. 6. User medical information 8000 includes semi-private medical info 8010 and private medical info 8020. Semi-private medical info 8010 may include any information the user decides to make available to medical personnel in case of an emergency, while the private medical info 8020 includes the rest of the user's medical info, which can only be shared by the user granting access. Examples of semi-private medical info 8010 include blood type, medical conditions, medications, allergies, warnings, emergency contact info, a living will, a health care power of attorney, and other semi-private medical info. Private medical info 8020 is shown in FIG. 80 to include hospital records, doctor records, test results, lab results, diagnoses, treatments, surgeries, and other private medical information. In the most preferred implementation, all of the user's medical information is initially set to be private medical info 8020. The user may then select which of the private medical info 8020 to make available as semi-private medical info 8010. The medical conditions can include any medical condition the user may have. Allergies can include allergies to medications as well as allergies to food, insects, or other items. Warnings could include any suitable warning that medical personnel should have, such as severe allergies that could send the patient into anaphylactic shock, warnings about brittle bones, warning the patient only has one kidney, or any other suitable warning. Emergency contact info can include the name and contact information in a hierarchical list for those who should be notified of the patient's condition. The emergency contact info could include names, addresses, cell phone numbers, e-mail addresses, relationship to the user, etc. A living will can give the medical person knowledge regarding the patient's wishes if the patient is in a vegetative state. A health care power of attorney will inform the medical person to whom the user has given power of attorney for health care in case of the user's incapacity.

Figure 81:
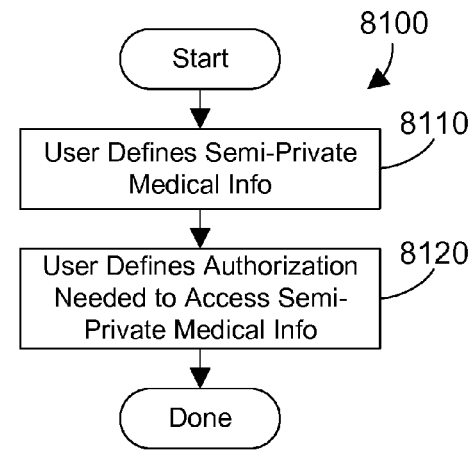
FIG. 81 is a flow diagram of a method for a user to define semi-private medical info in the user's U-Me account.

Referring to FIG. 81, method 8100 begins by a user defining semi-private medical info (step 8110). The semi-private medical information could be entered by the user, but could also be selected from the private medical info 8020. The user also defines the authorization needed to access the semi-private medical info (step 8120). The semi-private medical info defined by the user can be accessed by medical personnel when the authorization defined by the user in step 8120 is satisfied, as discussed in more detail below.

Figure 82:
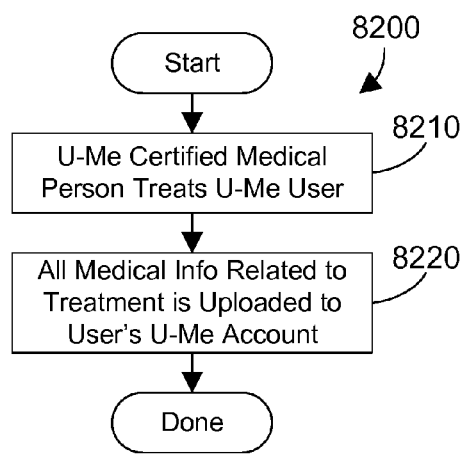
FIG. 82 is a flow diagram of a method for uploading medical information to a user's U-Me account.

One of the benefits of the U-Me system is having a user-centric place to store all of the user's information, including medical info. Referring to FIG. 82, method 8200 shows how the U-Me system can store medical information for a user. A U-Me certified medical person treats a U-Me user (step 8210). All medical info related to the treatment is uploaded to the user's U-Me account (step 8220). The result is the user has electronic copies of all the user's medical info. The user can thus make these records available to a doctor if the user decides to switch doctors without having to request those records from the previous doctor. By automatically storing the user's medical info in the user's U-Me account, all of the user's medical info will be present in one place, in electronic form, in a searchable format, which can be easily shared as needed. The result is a vast improvement over known methods for handling medical information.

Figure 85:
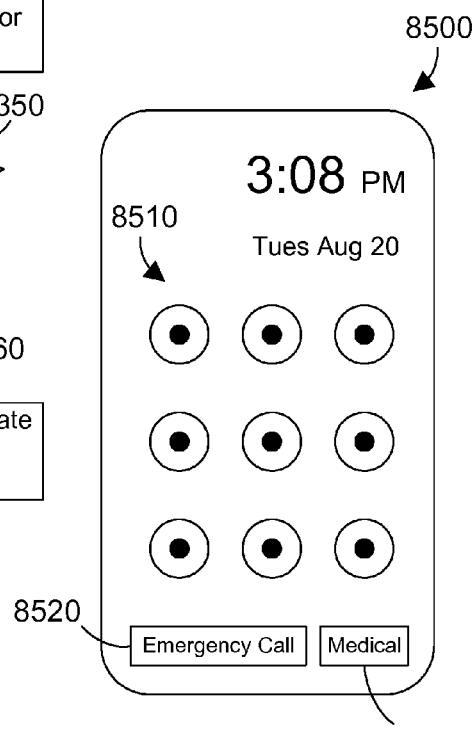
FIG. 85 is an example of a display on a U-Me user's smart phone showing a medical button that allows bypassing any security on the smart phone to access the semi-private medical information for the user.
Figure 86:
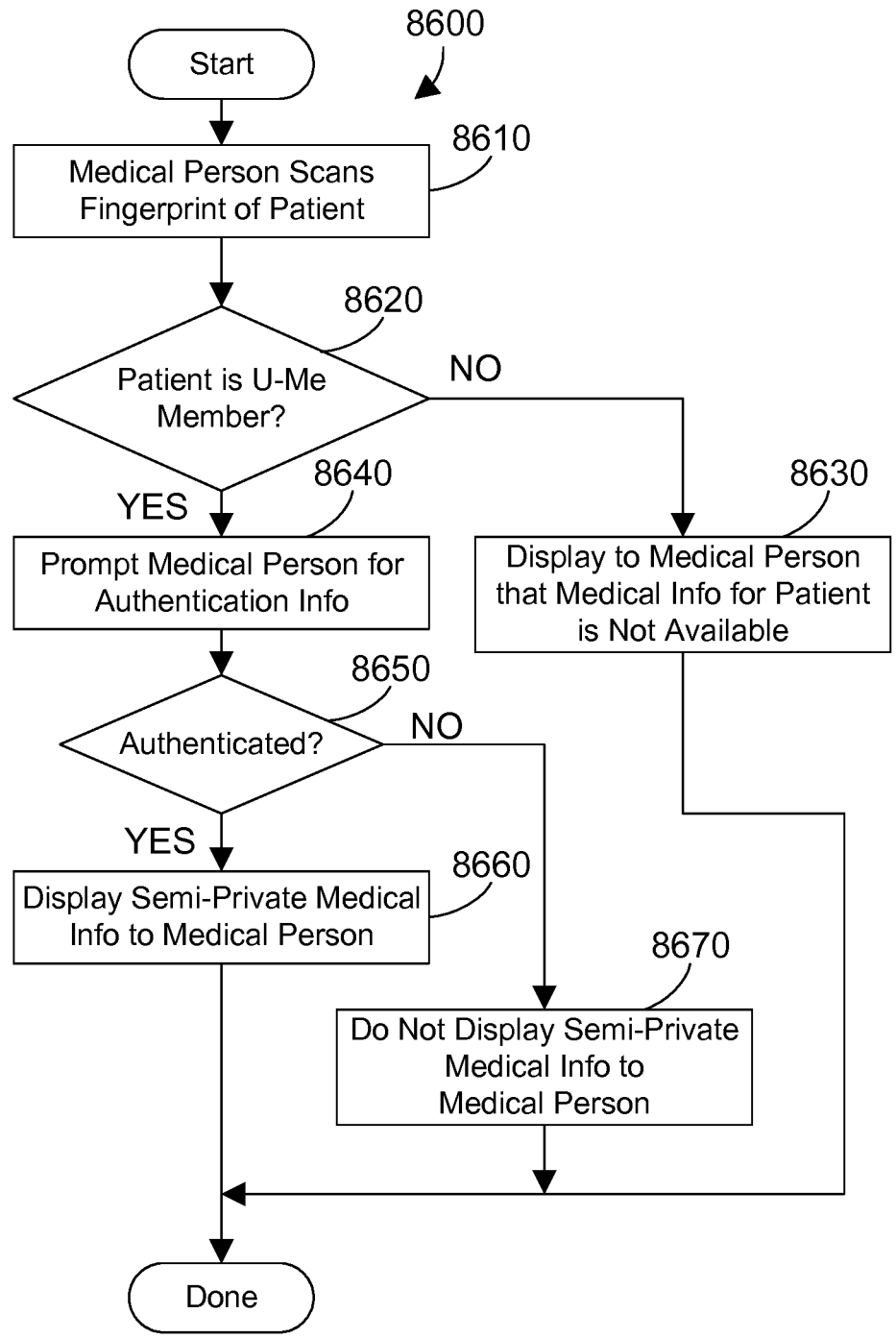
FIG. 86 is a flow diagram of a method for a medical person to attempt to gain access to a patient's medical information.

FIG. 85 shows a sample display of a smart phone 8500. Some smart phones, such as Android phones, include security displays that require a user to enter a password or perform some other action to access the functions of the phone. One such display of a security screen 8510 is shown in FIG. 85 to include nine circles. The user may set a pattern of four circles in a path, and when the security screen 8510 is displayed, the user drags a finger over the four circles in the defined path, which then unlocks the phone for use. While this is an effective way to stop a stranger from using the smart phone, it can also prevent a medical person from accessing medical information for the user. Known Android smart phones, such as the Samsung Galaxy S3 phone, include an Emergency Call button 8520 on the security screen 8510 that allow someone to bypass the security screen 8510 and make an emergency call. A similar function for accessing medical information could be provided by the phone's operating system or by a U-Me app running on the phone. Thus, a Medical bypass button 8530 could be provided on the security screen 8510 that allows a medical person to access the user's medical info stored in the smart phone 8500. The medical bypass button 8530 could have text, or could have a symbol such as a red cross.

Figure 83:
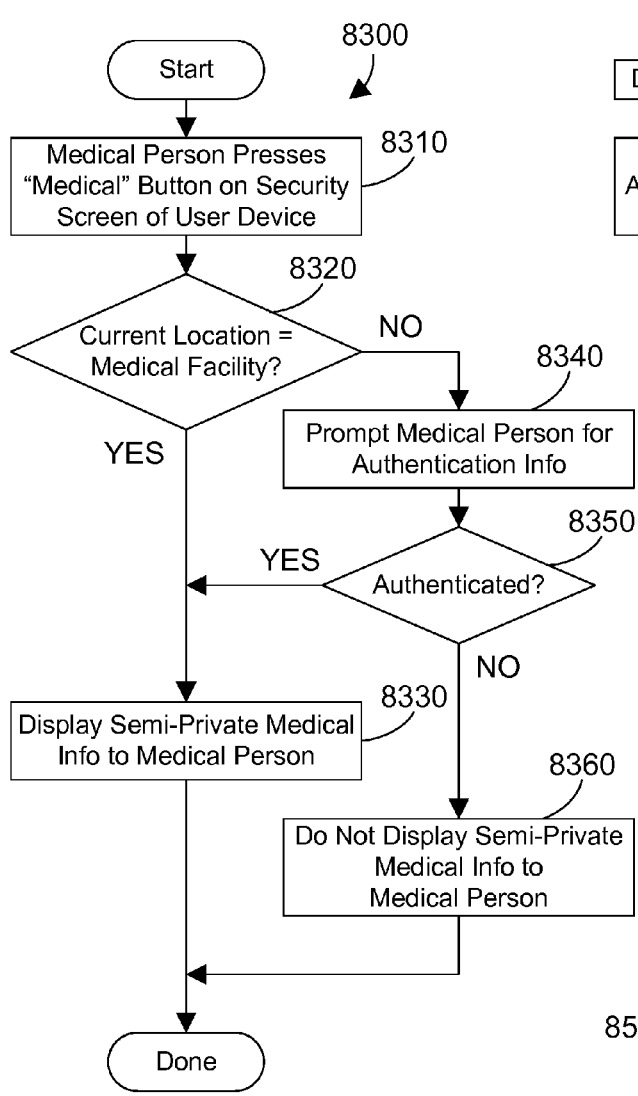
FIG. 83 is a flow diagram of a method for a medical person to attempt to access medical information stored on a U-Me user's device.

Method 8300 in FIG. 83 shows a method 8300 for a medical person to access a user's semi-private medical info 8010. Let's assume the U-Me user is in a car accident, is injured and unconscious, and arrives via ambulance to an emergency room of a hospital for treatment. Let's further assume the user has a smart phone with the U-Me app running, and the smart phone provides a medical bypass button, such as 8530 shown in FIG. 85. A nurse or doctor can press the medical bypass button 8530 on the security screen of the user device (step 8310). When the current location of the device is a medical facility (step 8320=YES), the user's semi-private medical info is displayed on the user device to the medical person (step 8330). This would be the case when the user is being treated in the emergency room of a hospital. However, what if the medical person is an Emergency Medical Technician (EMT) on-site at the car accident? In this case, the current location is not a medical facility (step 8320=NO), so the U-Me app prompts the EMT for authentication info to authenticate to the U-Me system (step 8340). Assuming the EMT or the ambulance company is U-Me certified, the EMT enters authentication info. If the user is not authenticated to the U-Me system (step 8350=N0), which would happen if the EMT does not have an account to authenticate to the U-Me system, the semi-private medical info for the user is not displayed on the user's device (step 8360). When the EMT is authenticated to the U-Me system (step 88350=YES), the user's semi-private medical info is displayed on the user's device (step 8330). Method 8300 is then done. Method 8300 thus provides two tiers of security, a first tier where the user's medical info is displayed at the touch of the Medical bypass button 8530 when the location of the user device is determined to be a medical facility, and a second tier that requires the medical person to authenticate to the U-Me system when the location of the user device is not a medical facility. Of course, the same method for the medical person to authenticate to the U-Me system can be performed when a user is at a medical facility. This would prevent someone from stealing the user's phone, driving to a parking lot of a hospital, and accessing the user's semi-private medical info.

The display of the user's semi-private medical info to a medical person could also trigger display of the user's emergency contact info to the medical person. This could include a data input screen that allows the medical person to enter the user's condition and the medical person's contact information. The relevant information could then be texted and sent via e-mail according to the information in the user's emergency contact info, or phone numbers could be called by the medical person.

Figure 84:
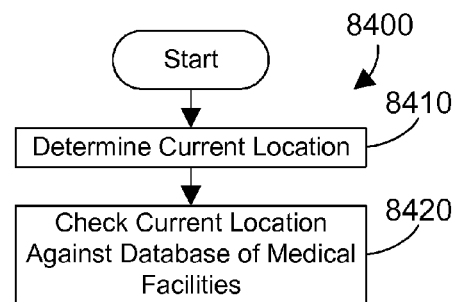
FIG. 84 is a flow diagram of a method for determining whether the current location of the U-Me user's device is at a medical facility.

One suitable way to determine whether the current location is a medical facility in step 8320 is shown by method 8400 in FIG. 84. The current location is determined (step 8410). This could be done, for example, using the Global Positioning System (GPS) in the user's smart phone. The current location is then checked against a database of medical facilities (step 8420). The database of medical facilities may be stored on the user device, or may be stored in the U-Me system in the cloud and be accessed via the user's device.

Let's go back to the scenario outlined above that a U-Me user has been in a car accident, is injured and unconscious, and arrives via ambulance to an emergency room of a hospital for treatment. Let's further assume the user's smart phone is not available, perhaps because the smart phone is still in the car that was wrecked. The U-Me system still allows for displaying the user's semi-private medical info to a medical person if the medical person or the medical facility is U-Me certified. A method 8600 shows one suitable example for displaying a U-Me user's medical info when the U-Me user is not conscious or otherwise able to provide access to the user's medical info. A medical person could use a handheld electronic device with a fingerprint scanner to scan a fingerprint of the patient (step 8610). If the patient is not a U-Me member (step 8620=NO), the handheld device will display that medical info for the patient is not available (step 8630). When the patient is a U-Me member (step 8620=YES), the medical person is then prompted for authentication info (step 8640). Assuming the medical person or the medical facility is U-Me certified, the medical person will be authenticated to the U-Me system (step 8650=YES), and the semi-private medical info for the patient is displayed to the medical person (step 8660). If the medical person is not authenticated to the U-Me system (step 8650=NO), the semi-private medical info for the patient is not displayed (step 8670). Method 8600 is then done. Method 8600 illustrates one specific way for a medical person to access the private medical info for a patient when both the patient and the medical person or medical facility are U-Me members or users.

Figures 87, 88, 89:
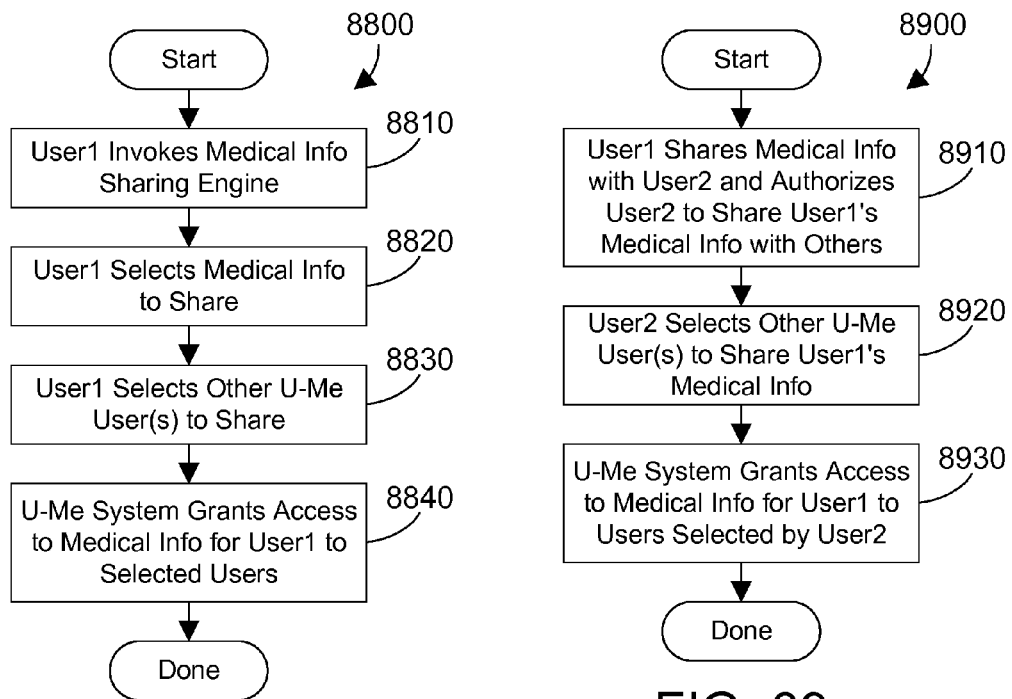
FIG. 87 shows an example of a screen for a medical information sharing engine.
FIG. 88 is a flow diagram of a method for a user to share the user's medical information with one or more other users.
FIG. 89 is a flow diagram of a method for a user who was authorized to share medical information for a different user to share that medical information with one or more other users.

A medical information sharing engine 8700 in FIG. 87 allows easily sharing a user's medical info with others. The medical info sharing engine is preferably provided as a feature of the sharing mechanism 174 shown in FIG. 5. The sharing engine 8700 includes a data entry screen that allows the user to select medical info in the user's U-Me account, then to specify one or more users to share this medical info. In the example shown in FIG. 87, we assume the user had a car accident on May 14, 2013, and was treated in an emergency room on that day. The user puts in a date or date range. In this case, to assure the user catches all relevant medical info pertaining to the injuries from the car accident, the user enters the date of the car accident as the beginning date of a date range and enters a date a week later as the end date of the date range. The U-Me system then displays all medical information in the User's U-Me account for that date range. The example in FIG. 87 shows three items of medical information: X-rays taken on May 14, 2013; ER treatment on May 14, 2013; and a lab report dated May 16, 2013. The user can select the "Share All" box, which will automatically select all three items to share. In the particular example in FIG. 87, the user has selected the X-rays and ER treatment for sharing and has not selected the lab report for sharing. The user can then specify one or more parties with whom to share the selected medical information.

In the most preferred implementation, the user can share medical info with one or more other U-Me users, which may include individuals such as family members and doctors as well as organizations such as hospitals, insurance companies, etc. Referring to FIG. 87, a user we call User1 invokes the medical info sharing engine (step 8810). User1 selects medical info to share (step 8820). User1 selects one or more U-Me users to share the selected info (step 8830). The U-Me system then grants access to the selected medical info for User1 by the selected users (step 8840). Granting access can mean the selected users are given permission by the U-Me system to access the selected medical info stored in User1's U-Me account. Granting access could also mean copying the selected medical info from User1's U-Me account to the U-Me account of the selected users.

In some circumstances, a doctor may need to share a patient's medical information with other doctors. For example, some patients suffer from a condition that may require consultation with doctors of different areas of expertise. We assume User 1 has consulted with a doctor, who asks permission to share User 1's medical info with other doctors. Referring to FIG. 89, method 8900 begins by User1 sharing selected medical info with User2 (e.g., the first doctor) with authorization to allow User2 to share User1's medical info with others (step 8910). User2 can then select one or more other U-Me users (e.g., other doctors) to share User1's medical info (step 8920). The U-Me system then grants access to the medical info for User 1 to the U-Me users selected by User2 (step 8930). Method 8900 is then done.

Figure 90:
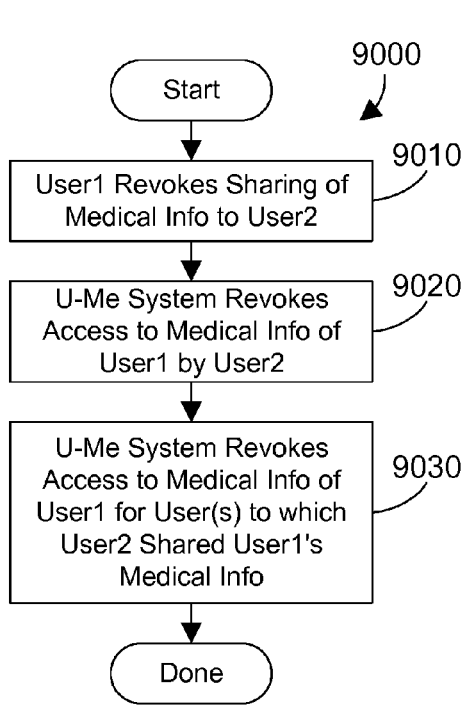
FIG. 90 is a flow diagram of a method for a user to revoke sharing of medical information by other users.

In one implementation, when a user has shared medical information stored in the user's U-Me account with other U-Me users, the sharing may be revoked at any time. Referring to FIG. 90, method 9000 begins when User1 revokes sharing of User1's medical info to User2 (step 9010). The U-Me system revokes access to User1's medical info by User2 (step 9020). Revoking access can mean not allowing User2 to access the medical info in User1's U-Me account. Revoking access can also mean deleting any of User1's medical info that was copied to User2's U-Me account. The U-Me system also revokes access to medical info of User1 for all users to which User2 shared User1's medical info (step 9030). Method 9000 is then done. A user will be much more likely to share his or her medical info when the user retains control to revoke the access at a later time.

Figure 91:
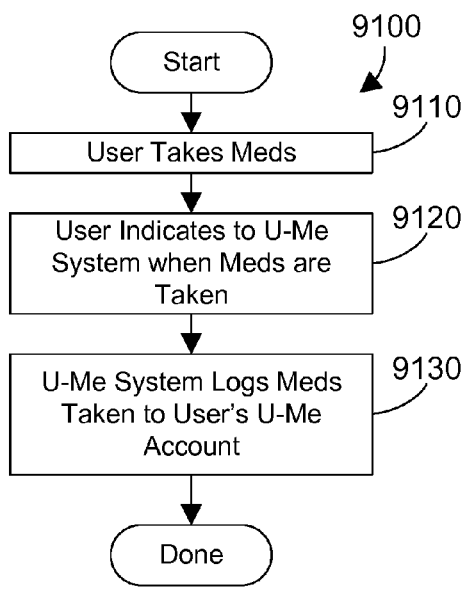
FIG. 91 is a flow diagram of a method for the U-Me system to track when a user takes meds.

The U-Me system can also track when a U-Me user takes medication, as shown in method 9100 in FIG. 91. A user takes meds (step 9110). The user indicates to the U-Me system when the user took the meds (step 9120). This could be done, for example, vie the U-Me app on the user's smart phone. The U-Me system logs the meds taken and the time to the user's U-Me account. This information of when meds are taken can be enabled to the user's semi-private medical info so medical personnel will know what medications the user took and when. Method 9100 can track not only prescription medications, but non-prescription (over the counter) meds as well. In addition, method 9100 could be used to track the user's consumption of food, vitamins, supplements, herbs, etc.

Figure 92:
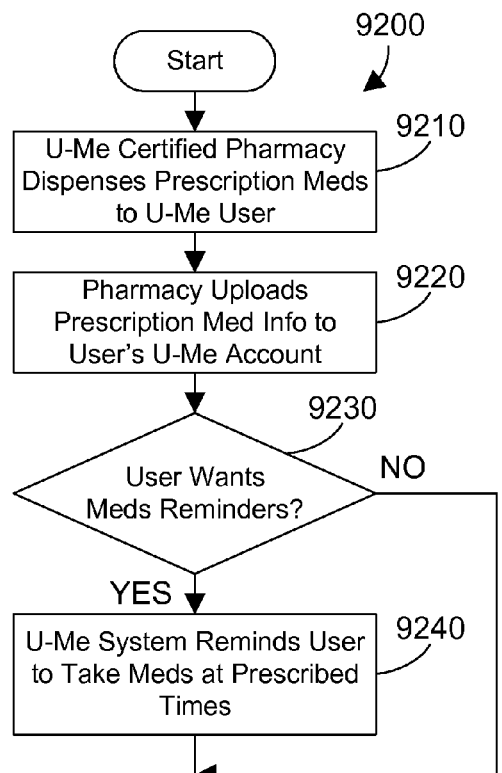
FIG. 92 is a flow diagram of a method for the U-Me system to provide reminders to a user to take the user's meds.

The U-Me system can also provide reminders for a user to take meds at the appropriate time, as shown in method 9200 in FIG. 92. We assume a U-Me certified pharmacy dispenses prescription meds to a U-Me user (step 9210). The pharmacy uploads the prescription med info to the user's U-Me account (step 9220). When the user has set an option in the U-Me account for meds reminders (step 9230=YES), the U-Me system reminds the user to take meds at the prescribed times (step 9240). When the user does not want meds reminders (step 9230=NO), method 9200 is done. Even when the user does not want reminders, the user's U-Me system will have an exact record of which prescriptions were filled and when. Note the meds reminders may include any relevant information to taking the meds, such as "take with food", "do not drive after taking this medication", drug interaction warnings, etc.

Figure 93:
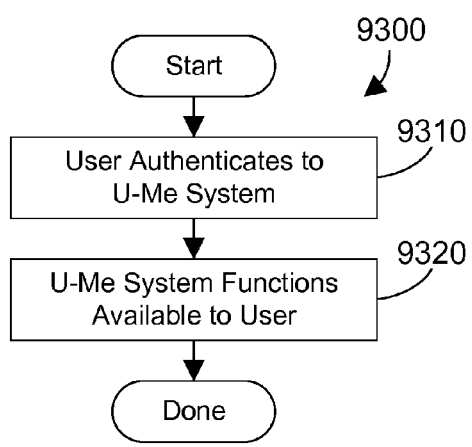
FIG. 93 is a flow diagram of a method for a user to authenticate to the U-Me system.

The U-Me system includes a user authentication mechanism 194 shown in FIG. 5. The user authentication mechanism 194 can perform suitable methods for authenticating a user to the U-Me system, including the methods shown in FIGS. 93 and 95. Referring to FIG. 93, method 9300 requires a user to authenticate to the U-Me system (step 9310). Once authenticated, the U-Me system functions are available to the user (step 9320). One suitable example of the user authentication mechanism 194 in FIG. 5 is shown as user authentication mechanism 9400 in FIG. 94. User authentication mechanism can use biometric authentication 9410 as well as non-biometric authentication 9420. Suitable examples of biometric authentication 9410 shown in FIG. 94 include fingerprint, retina scan, voice print, DNA, and other biometric authentication. Of course, any suitable biometric authentication could be used, whether currently known or developed in the future. Biometric authentication as used herein refers to authentication related to some aspect of a person's body that is unique for each person. Due to the large amount of sensitive data stored in the user's U-Me account, biometric authentication is preferred to assure unauthorized parties cannot access the user's U-Me account. Biometric authentication is performed by providing a sample, storing the sample as the reference, then comparing the reference sample to future samples submitted for authentication. Thus, a user could scan the fingerprint of the user's right index finger, and the scanned fingerprint could be processed and stored as a reference fingerprint. When the user wants to authenticate to the U-Me system, the user scans the same fingerprint, and the newly scanned fingerprint is processed and compared to the stored reference fingerprint. If the new fingerprint scan matches the stored reference fingerprint, the U-Me system is assured the user trying to gain access to the user's U-Me account is, indeed, the user.

Figure 94:
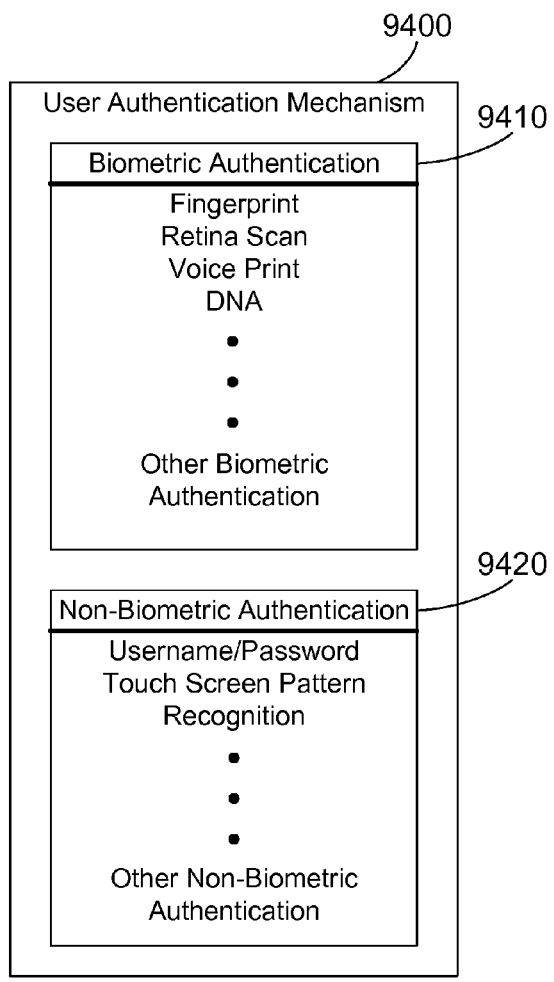
FIG. 94 shows examples of authentication types that could be used by a user to authenticate to the U-Me system as shown in FIG. 93.

Suitable examples of non-biometric authentication 9420 shown in FIG. 94 include username/password, touch screen pattern recognition, and other non-biometric authentication. Non-biometric authentication as used herein refers to authentication that is not necessarily unique to a person's body. Most online services today use the username/password paradigm for authenticating a user. The disadvantage of using non-biometric authentication is the possibility of somebody hacking a user's authentication information and accessing the user's U-Me account. The most preferred authentication for the U-Me system is biometric authentication because this assures only the user can access the user's U-Me account. In addition, biometric authentication can become an important way to address potential fears of licensing content such as music to a user instead of to a device. If the U-Me system requires biometric authentication, the U-Me system can be assured: 1) the user is who the user claims to be; and 2) the user can only be in one place at one time, so a user's licensed content can be provided to the user at this place and at this time. This should minimize pirating concerns because only the user can access the user's licensed content after the user authenticates to a location or device.

Fingerprint scanners are becoming more and more common. Many laptop computers now include a small slit near the keyboard over which a person may slide a fingertip, causing the sensor under the slit to scan the person's fingerprint. These fingerprint scanners are becoming very common, and can be added to many systems without great cost to help the system interact in a secure way with users and with the U-Me system. For example, a fingerprint scanner could be added to vehicles that authenticate the driver to the vehicle. When a user rents a rental car, a slot-type fingerprint scanner on the rental car can be used for the user to authenticate to the car, which can, in turn, authenticate to the U-Me system. When the user is authenticated to the car, the U-Me system knows it can provide the user access to the user's music because the user has scanned a fingerprint to gain access to the U-Me system, and only the user has that fingerprint.

Figure 95:
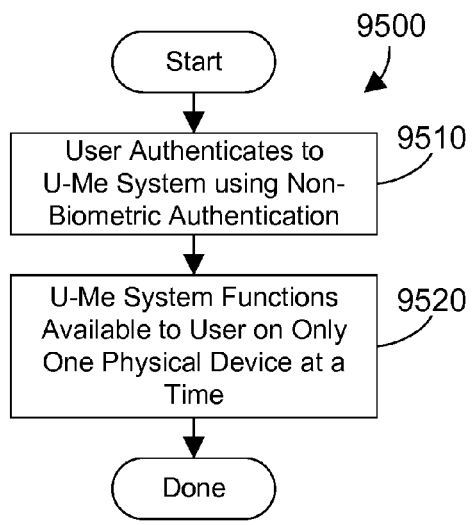
FIG. 95 is a flow diagram of a method for assuring the U-Me system functions are available to a user on only one physical device at a time when the user authenticates using non-biometric authentication.

Method 9500 in FIG. 95 uses non-biometric authentication. The user authenticates to the U-Me system using non-biometric authentication (step 9510). The U-Me system functions are made available to the user only on one physical device at a time (step 9520). By restricting U-Me functions to one device at a time, this reduces the likelihood of a user sharing the user's username and password to provide access to the user's U-Me account by others, and also reduces the likelihood of a person who hacked a user's U-Me username and password gaining access to the user's U-Me account, at least while the user is logged in to the U-Me system.

The security of the U-Me system allows a paradigm shift in how licensed content may be licensed. Currently, if someone uses Apple iTunes to purchase and download music to the person's computer, the iTunes account is tied both to the computer and to the device to which the music may be copied. Thus, when a user configures iTunes on a computer system and configures iTunes for the user's iPad, the iTunes account will only function with the user's iPad, not with other devices. This creates a real problem in the event of a crash of the hard disk on the computer system. If the person has not faithfully backed up their hard drive, the person risks losing the licensed content that was in the iTunes account. This is true even when Apple can verify the purchases were made by the user from the iTunes store. Having purchased music tied so tightly to a computer system is a real problem with the computer system fails.

All of the ills associated with tying licensed content to specific devices can be cured by the U-Me system. But this requires a paradigm shift in how content is licensed to users. Referring to FIG. 96, method 9600 shows licensing licensed content to a user (a human person), not to a physical device (step 9610). The licensed content can then be made available to the user on any physical device (step 9620). But what about piracy concerns? The piracy concerns go away when the user must use biometric authentication to gain access to licensed content in the user's U-Me account. From a logical perspective, when a user purchases a song, shouldn't the user be able to listen to that song regardless of what device the user may have access to? This is the philosophy underlying the U-Me system, to make the user's data, licensed content, and settings available anywhere the user might be on any device the user might use. This is what allows "me to be me, anywhere", which is the goal of the Universal Me system.

One suitable example for method 9600 in the context of licensed music is shown in method 9700 in FIG. 97. A user purchases music (step 9710). The license for the music is to the user, and is not connected to any physical device (step 9720). The user's licensed music may then be made available by the U-Me system to any U-Me certified music player (step 9730). Method 9700 is then done.

A user may define settings related to the user's music, as shown in method 9800 shown in FIG. 98. The user defines music settings by organizing music into favorites, playlists, genres, etc. (step 9810). All of the user's music settings are then made available on any U-Me certified music player (step 9820).

Examples of physical music players 9900 are shown in FIG. 99 to include a phone, a tablet computer, a laptop computer, a desktop computer, a portable MP3 player, a car audio system, a home audio system, and other music player. Of course, these are listed as examples, and the disclosure and claims herein expressly extend to any suitable music player or type of music player, whether currently known or developed in the future.

With the paradigm shift to licensing to a person and not to any physical device comes the opportunity to provide creative licensing schemes for licensed content. Referring to FIG. 100, different music licenses for a song could be offered that are priced according to duration of the license. Thus, FIG. 100 shows a user can purchase a one week license for $0.49; a one year license for $0.89; a five year license for $1.29; a license for the life of the purchaser for $1.59; and a perpetual license for $1.99. The change of licensing to a person and not to any physical device gives rise to the concept of "digital estate planning" where a person may own perpetual rights to licensed content that may be transferred to someone upon the user's death. Such transfers could be handled by the U-Me system automatically once proof of death is verified by a U-Me system administrator according to transfer-on-death rules defined by the user in the user's U-Me account, or according to a user's will or other estate planning documents.

Figure 101:
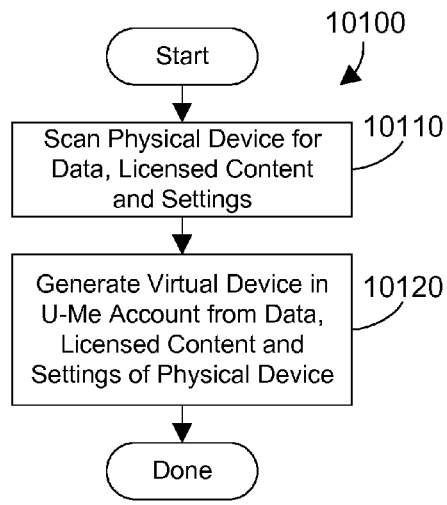
FIG. 101 is a flow diagram of a method for generating virtual devices in a user's U-Me account that correspond to physical devices used by the user.
Figure 102:
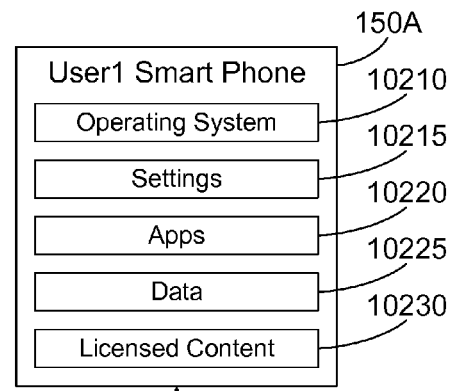
FIG. 102 shows an example of a smart phone and corresponding example of a virtual smart phone that is stored in the user's U-Me account.
Figure 103:
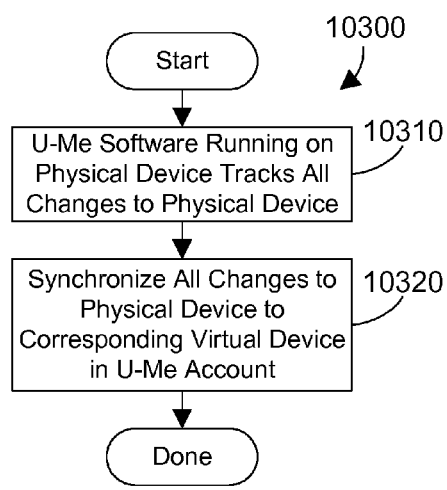
FIG. 103 is a flow diagram of a method for tracking all changes to a physical device and synchronizing all the changes to a corresponding virtual device in the user's U-Me account.

One of the features of the U-Me system is the generation of virtual devices for the user in the user's U-Me account that correspond to physical devices the user uses. The goal is to have as much information as possible in the virtual device so if a physical device is lost, stolen, or malfunctions, a similar device may be easily configured using the information in the virtual device. Referring to FIG. 101, a physical device is scanned for all data, licensed content, and settings (step 10110). A virtual device is then generated in the U-Me account from the data, licensed content and settings of the physical device (step 10120). In the most preferred implementation, the virtual device will have virtually all information needed to configure a new device to have the exact same configuration as a previous device. An example will illustrate. Let's assume a user has a Samsung Galaxy S3 smart phone, and takes hours to get the phone configured exactly as he wants, with many apps installed and configured, with many different ringtones assigned to different contacts, with photos for many of his contacts, etc. Let's now assume the user registers this device with the U-Me system, which causes a process, such as method 10100 in FIG. 101, to create a virtual device that corresponds to the Samsung Galaxy S3 phone in the user's U-Me account, with all of the data, licensed content, software, and settings that define how the phone is configured and functions. Once the virtual device is created, if the user accidentally flushes his Samsung Galaxy S3 phone down a toilet, the user can go to his phone store, purchase a new Samsung Galaxy S3 phone, install the U-Me app, then log into his U-Me account. In the most preferred implementation, once the user registers the new phone with the user's U-Me account, the U-Me system will ask of the user wants to configure this phone to match the stored configuration in the virtual device in the U-Me account. When the user selects "Yes", the new phone is configured to exactly match the old phone, so the user can have the new phone up and running in very little time with the exact configuration on the new phone that the user spent so many hours defining on the old phone.

Current limitations may not allow all of the user's data, licensed content, and settings to be transferred to the virtual device in the user's U-Me account or from the virtual device in the user's U-Me account to a new device. For example, the operating system may prevent copying its code to the virtual device. Other apps could likewise prevent copying their code as well. The goal of the virtual device is to contain as much information as possible so a new device can be more easily configured than using known techniques used today, which typically takes hours of time to configure a new device. The U-Me system can still be helpful even when not all needed information is contained within the corresponding virtual device. When the U-Me app scans the physical device for data, licensed content, and settings, the U-Me app can log when copying something to the virtual device is not allowed, and can provide a list of instructions for the user to follow. For example, let's assume when the user creates a virtual device that corresponds to his Samsung Galaxy S3 phone (discussed above), the U-Me app cannot copy the operating system or two of the eighteen apps installed on the phone to the virtual device in the user's U-Me account. The U-Me app can then provide a list of instructions stored in the U-Me account for configuring a new device. Thus, in the scenario above where the user flushes his phone down a toilet and buys a new phone to replace it, when the user registers the new phone to the user's U-Me account, a list of instructions will be provided, such as: install OS update 2.6.4, then install Southwest Airlines app, then install Yelp app. Once these preliminary things are done by the user, the U-Me system can then configure the phone using the data, licensed content and settings stored in the corresponding virtual device in the user's U-Me account.

Known apps may include features that prevent copying their software and settings. This problem can be addressed by providing a process for an app to become U-Me certified. A U-Me certified app will have defined interfaces and methods that allow completely copying the entire app, including all of its settings, to a virtual device. In this manner, U-Me certified apps will allow fully automatic copying of the app and its settings to a new device. Once customers start demanding that apps and devices are U-Me certified, the providers of these apps and device will feel pressure get their products U-Me certified, which will aid in the widespread proliferation of the U-Me system.

For the virtual devices in the user's U-Me account to be up-to-date, a method is needed to synchronize any changes in the device to the virtual device stored in the user's U-Me account. An example of such a method is shown at 10400 in FIG. 104, which is preferably performed by the data tracker 162 shown in FIG. 5. All data additions and deletions in all of the user's physical devices are tracked (step 10410). All data additions and deletions in the user's U-Me account that affect the configuration of the physical devices are also tracked (step 10420). All data is then synchronized between the physical devices and the virtual devices stored in the user's U-Me account (step 10430).

Figure 104:
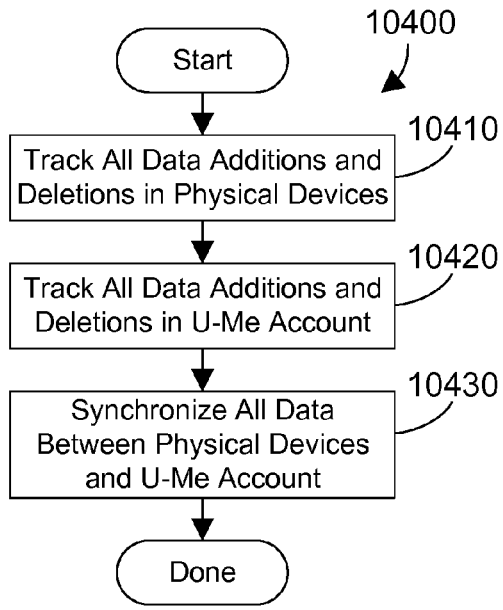
FIG. 104 is a flow diagram of a method for synchronizing all data changes between the user's physical devices and the user's U-Me account.
Figure 105:
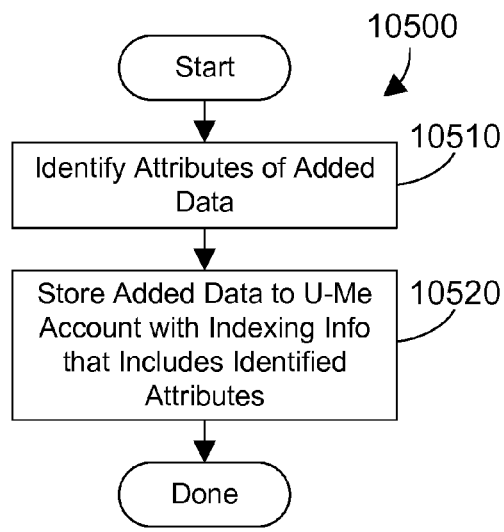
FIG. 105 is a flow diagram of a method for storing data to a user's U-Me account with indexing information that allows retrieving the data later via a search engine.
Figure 106:
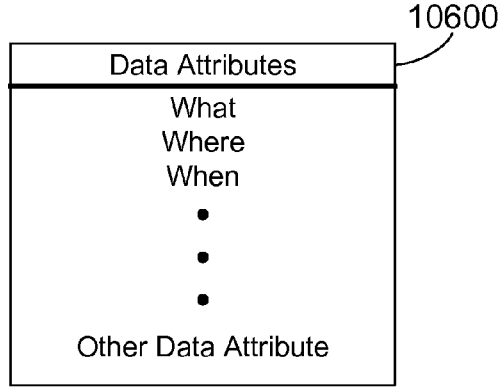
FIG. 106 shows examples of data attributes.
Figure 107:
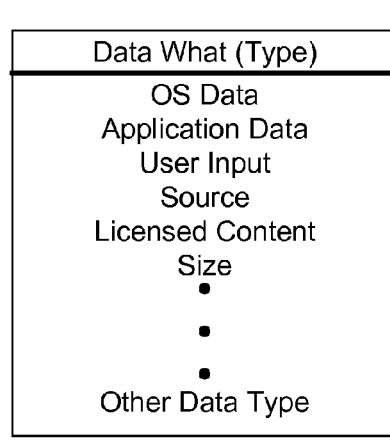
FIG. 107 shows examples of data attributes that could be stored as indexing info to identify type of data stored.
Figure 108:
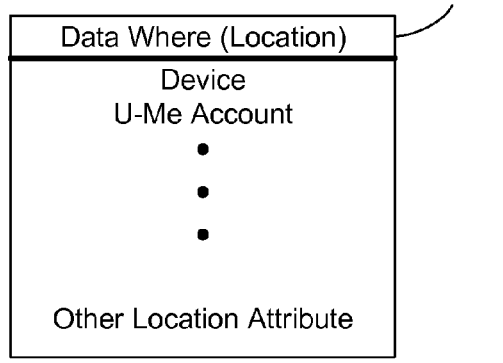
FIG. 108 shows examples of data attributes that could be stored as indexing info to identify location of where data was created.
Figure 109:
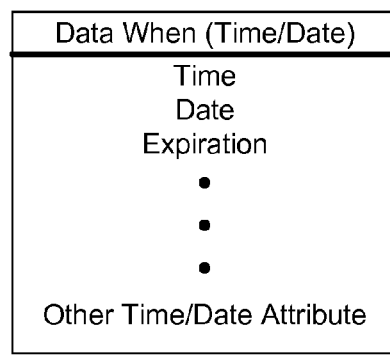
FIG. 109 shows examples of data attributes that could be stored as indexing info to identify time-related parameters for data.

Tracking data as shown in FIG. 104 requires identifying data attributes that describe the data. Note that "data" as discussed in FIGS. 105-109 refers to user data, user licensed content, and user settings. Attributes of the added data are identified (step 10510). The added data is stored to the U-Me account with indexing info that includes the identified attributes (step 10520). The indexing info will help the U-Me system know how the data should be stored, retrieved and handled. Examples of suitable data attributes 10600 are shown in FIG. 106 to include what, where, when, and other data attributes. "What" could refer to the type of data. "Where" could refer to where the data was generated. "When" could refer to a time and date relating to the changed data. Referring to FIG. 107, examples of data type attributes 10700 include operating system data, application data, user input, source, licensed content, size, and other data type. Referring to FIG. 108, examples of location data attributes include a device, the user's U-Me account, and other location attribute. Referring to FIG. 109, examples of time/date attributes include time, date, expiration, and other time/date attribute. By storing data to the user's U-Me account with the indexing info that includes attributes of the data, the data can be appropriate handled when synchronizing the data between the user's U-Me account and the user's devices.

Figure 110:
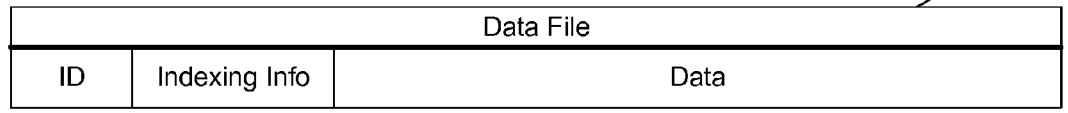
FIG. 110 shows an example of a data file format for data stored in the U-Me system.
Figure 111:
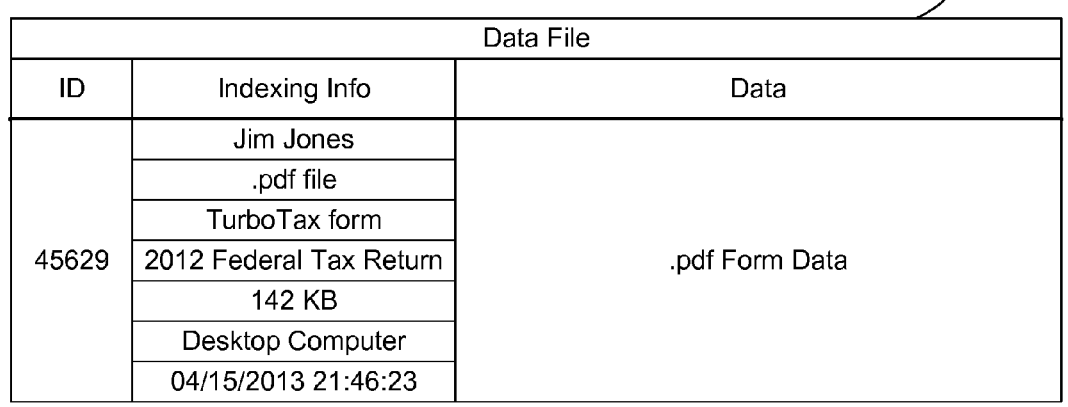
FIG. 111 shows an example of a data file that complies with the format shown in FIG. 110 and that includes examples of indexing info that helps to retrieve the data later via a search engine.

Referring to FIG. 110, a data file 11000 represents data that is stored in the user's U-Me account. Each data file preferably includes an identifier ID, indexing info, and data. One example of a suitable data file that conforms to the format shown in FIG. 110 is shown in data file 11100 in FIG. 111. The ID is a numerical identifier that uniquely identifies this data record from other data records in the user's U-Me account. The indexing information in the example in FIG. 11 includes Jim Jones, .pdf file, TurboTax form, 2012 Federal Tax Return, 142 KB, Desktop Computer, and Apr. 15, 2013 at 21:46:23. The data is the .pdf form data. The indexing info shows Jim Jones created this file, a .pdf file, which is a TurboTax form that is part of his 2012 Federal Tax Return, the size of the file is 142 KB, and the file was generated on Jim's desktop computer on Apr. 15, 2013 at 9:46.23 PM. By storing data files in the user's U-Me account using indexing info, the data can be retrieved using a powerful data search engine.

The first desktop computers included a file system that included a hierarchy of directories and subdirectories where files were stored. The same paradigm exists today more than thirty years later. Although some refer to the directory/subdirectory structure as folder/subfolders, regardless of the label, the directory structure is the same, and the end result is the same—the user must decide where to store data on a computer system, and how to name files being stored. Requiring the user to decide where to store data and what file names to use also requires a user to remember the directory and file name when the user wants to retrieve the data. Most computer users have had the experience of storing a file using a directory and filename the user selected, then having great difficulty locating the file later on because the user cannot remember what directory or subdirectory the user saved the file to, or what name the user gave the file when the file was stored. To put users through this frustration is just plain silly given the fact that the computer always knows were data is stored because it is the entity that stores the data.

Figure 112:
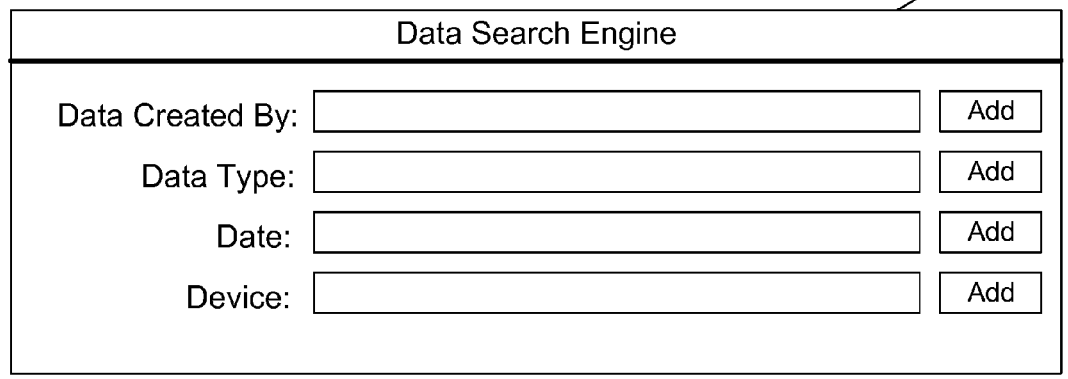
FIG. 112 shows an example of a data search engine that allows a user to query data stored in the user's U-Me account.

We need to get away from the very antiquated and outdated directory/subdirectory paradigm that has frustrated and plagued so many computer users for so long. The U-Me system provides a much easier way to store and retrieve data from a user's U-Me account. Instead of using a directory/subdirectory file system that requires a user to remember directory names and file names, the U-Me system allows a user and/or the U-Me system to add indexing info that describes the data, such as indexing info shown in data file 11100 in FIG. 111. Because this indexing info is stored with the data, the indexing info may be used to retrieve the data as well using a suitable search engine, such as data search engine 164 in FIG. 5. One example of a screen 11200 for a data search engine is shown in FIG. 112. Screen 11200 includes fields for Data Created By, Data Type, Date and Device. Note each field includes an Add button to add more fields of that type. Data search engine screen 11200 is an example of a screen that could be provided by the data search engine 164 in FIG. 5. A screen for a search engine could include any suitable field that can be used as indexing info that can be used to locate the stored data. The data search engine 164 in FIG. 5 can provided different screens, including the eReceipt search engine screen in FIG. 50, the photo search engine screen in FIG. 76, and the data search engine screen in FIG. 112. The data search engine disclosed herein includes any suitable way to specify index information for retrieving data stored previously, whether currently known or developed in the future.

The U-Me system can provide a level of abstraction that hides the underlying file system. This can be done by creating "containers" for different item types. For example, when the user stores the first photo to the user's U-Me account, the U-Me system can recognize from the file type and the indexing info that this is a photo, and can create a container where all photos are stored. The "container" is also a logical construct, and can be implemented using any suitable technology under-the-covers. Thus, a virtual machine that is provisioned to run a user's U-Me account could have a directory/subdirectory/filename file system, but this could be hidden from the U-Me user by the containers defined in the user's U-Me account.

While the concept of data search engines is very well-known in the database field, these concepts have not yet been applied to user interfaces for most physical devices. As a result, the prior art is stuck in the same antiquated directory/subdirectory paradigm for disk file systems. The U-Me system can use any disk file system, including a directory/subdirectory structure. However, the U-Me system preferably provides a layer of abstraction that hides the directory/subdirectory file structure from the U-Me user, and instead provides easy-to-use data entry screens for storing data and search screens for retrieving data.

Figure 113:
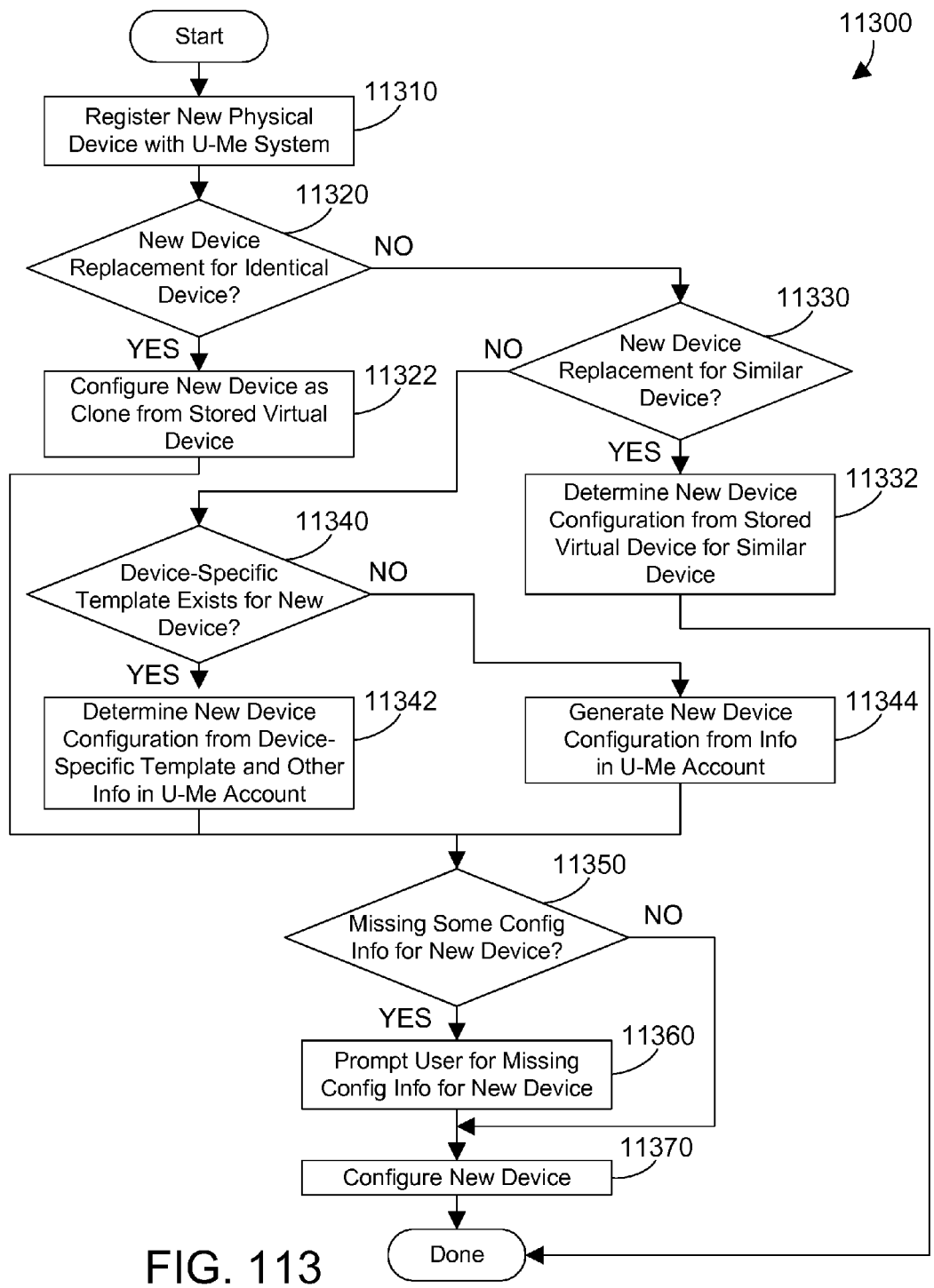
FIG. 113 is a flow diagram of a method for configuring a new physical device from information in a user's U-Me account.

Referring to FIG. 113, a method 11300 is performed by the U-Me system when a new physical device needs to be configured. The new physical device is registered with the U-Me system (step 11310). When the new device is a replacement for an identical device (step 11320=YES), the new device is configured as a clone of the stored virtual device (step 11322). For example, in the scenario discussed above where a U-Me user flushes his Samsung Galaxy S3 phone down the toilet, and purchases a new Samsung Galaxy S3 phone as a replacement, the new phone can be configured as a clone of the virtual device in the user's U-Me account. When the new device is not a replacement for an identical device (step 11320=NO), a determination is made whether the new device is a replacement for a similar device (step 11330). For example, if the user who flushed his Samsung Galaxy S3 phone down the toilet buys a Samsung Galaxy S4 phone as a replacement, the new device is not a replacement for an identical device (step 11320=NO), but is a replacement for a similar device (step 11330=YES). The new device configuration for the Samsung Galaxy S4 phone can be determined from the stored virtual device for the Samsung Galaxy S3 phone (step 11332) because these are phones in the same family by the same manufacturer. Of course, any suitable criteria for "similar" could be defined. Note the new device may have settings that were not included in the stored virtual device because the new device is similar, but not identical. Method 11300 configures the new device as closely as possible to the old device, hopefully leaving a minimum of manual configuration for the user to perform. Once the new device is configured, if there are settings on the new device that were not available on the old device, the U-Me system could display those settings to the user for configuration.

When the new device is not a replacement for a similar device (step 11330=NO), the U-Me system determines whether a device-specific template exists for the new device (step 11340). When a device-specific template exists for the new device (step 11340=YES), the new device configuration is determined from the device-specific template and info in the user's U-Me account (step 11342). When no device-specific template exists for the new device (step 11340=NO), the new device configuration is generated from info in the user's U-Me account (step 11344), such as from a universal template, or from converting settings between two device-specific templates.

When the configuration for the new device is missing some info (step 11350=YES), the user may be prompted to provide the missing configuration info for the new device (step 11360). When the configuration for the new device is not missing any info (step 11350=NO), or after the user has provided all missing info in step 11360, the new device is configured (step 11370). Configuration of the new device occurs by the U-Me system copying the configuration information to the new device.

The definition of "similar" in step 11330 in FIG. 113 can be related to whether a device is of the same type or of a different type. The definition of "type" can be related to the physical characteristics of the device, the operational characteristics, and the manufacturer. Thus, in one scenario, a Samsung Galaxy S4 phone can be deemed to be of the same type as a Samsung Galaxy S3 phone because they both come from the same manufacturer and run the same Android operating system, while an iPhone could be deemed to be of a different type because it has a different manufacturer and runs a different operating system. In a different scenario, an iPhone can be deemed to be of the same type as a Samsung Galaxy S3 phone when the definition of type includes smart phones. The conversion mechanism 160 in FIG. 5 can convert settings between two different types of devices, regardless of how "type" is defined in any specific scenario.

Figure 114:
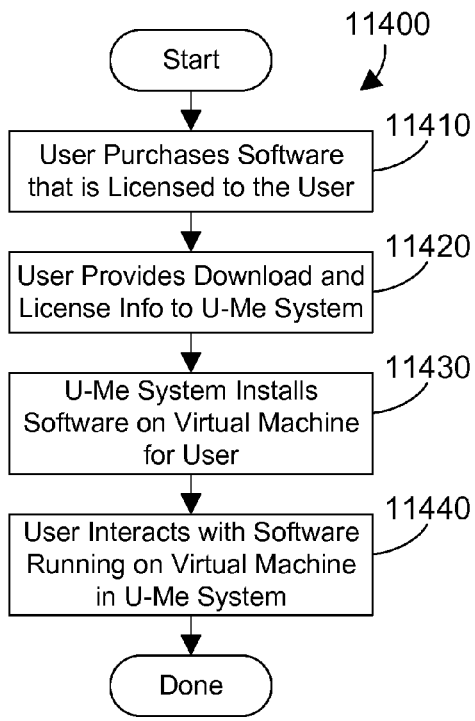
FIG. 114 is a flow diagram of a method for the U-Me system to host software that is licensed to the user.

As shown in FIG. 96, it is preferred in the U-Me system for licensed content, including software, to be licensed to a human user, and not to any physical device. Method 11400 in FIG. 114 shows an example for handling software that is licensed to a user. The user purchases the software that is licensed to the user (step 11410). For this specific example in FIG. 114, we assume this means the software is not licensed to any physical device. The user provides the download and license information to the U-Me system (step 11420). For example, an installer file could be the download information, and the license information could be a license key received via e-mail after purchasing the software. The U-Me system installs the software on a virtual machine for the user (step 11430). The user then interacts with the software running on the virtual machine in the U-Me system (step 11440). By installing purchased software to a U-Me virtual machine instead of to a physical machine, the functions of the software can be made available to the user on any device the user may be using.

As shown in FIG. 96 and discussed above, it is preferred in the U-Me system for licensed content to be licensed to a human user, and not to any physical device. However, this is not how licensing works today for most software. As a result, there needs to be a path for gradually migrating from the current paradigm of licensing software to a user for use on a particular device, to the new paradigm of licensing licensed content to the human user and not to any particular device. This path can be provided using method 11500 in FIG. 115. A user purchases software that is linked to a physical device (step 11510). The user provides the download and license info to the U-Me system (step 11520). The U-Me system generates a virtual device ID for the software (step 11530). The virtual device ID can be the physical ID of any computer system in the U-Me system, or could be a spoofed ID that is not from any physical computer system. The U-Me system then installs the software on a virtual machine for the user (step 11540). The user then interacts with the software running on the virtual machine in the U-Me system (step 11550).

Figure 116:
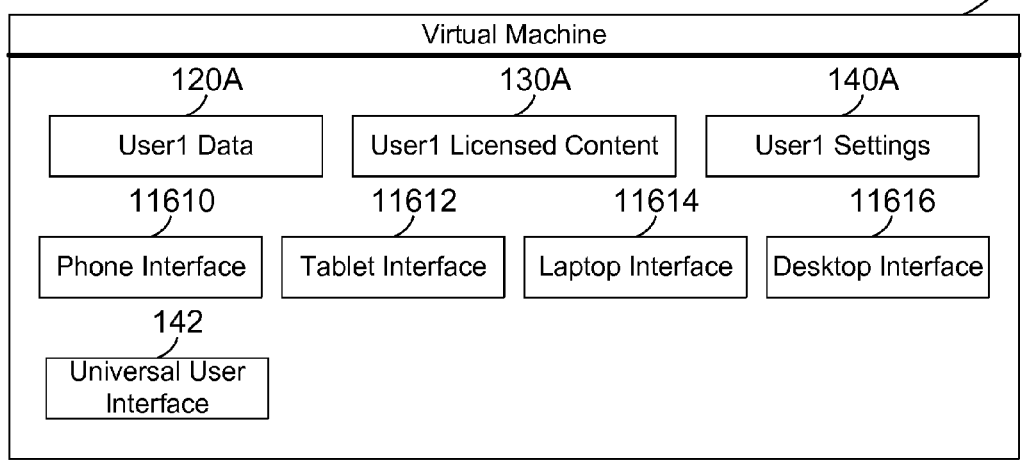
FIG. 116 is a block diagram of a virtual machine for the user.

A suitable example of a virtual machine 11600 is shown in FIG. 116. In this particular example, the virtual machine 11600 hosts the user's data 120A, the user's licensed content 130A, the user's settings 140A, a phone interface 11610, a tablet interface 11612, a laptop interface 11614, a desktop interface 11616, and the universal user interface 142. These interfaces 11610, 11612, 11614 and 11616 are suitable examples of device interfaces 156 in FIG. 5 that allow the U-Me system to communicate with each of the user's physical devices. Note that any and all of the items shown in FIG. 5 could run on the user's virtual machine 11600, but some of these may execute on other systems that interact with the user's virtual machine 11600 using a defined interface or protocol. All of the functions on the virtual machine are provided by the virtual machine mechanism 158 shown in FIG. 5.

Figure 115:
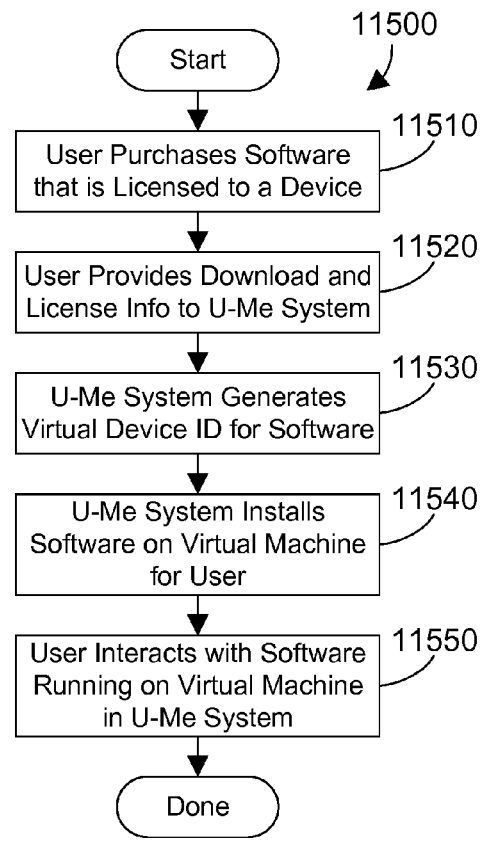
FIG. 115 is a flow diagram of a method for the U-Me system to host software that is licensed to a device.

For the methods in FIGS. 114 and 115, a user could interact with software running on a virtual machine in the U-Me system (step 11440 in FIG. 14 and step 11550 in FIG. 115) by invoking the universal user interface 2300 in FIG. 23, then clicking on the Software icon 2330. In response, the universal user interface 2300 could display a screen that shows icons corresponding to all software that is available to run in the user's U-Me account. This could be a sort of "virtual desktop" that provides icon-based display of software available to the user. When the user selects an icon corresponding to a software program the user wants to run, the software program will be run on a virtual machine in the U-Me system, and the user will then interact with the software using the universal user interface. The universal user interface thus provides an interface to any software running on a virtual machine in the U-Me system. This provides many advantages. First, the user can access and use the software using any suitable physical device. Because the software runs on a virtual machine, the physical device need not run the software. The physical device merely needs to provide a universal user interface to the software running on a virtual machine in the U-Me system. Thus, a user could be on vacation in Italy, go into an Internet café, and invoke using a standard web browser the login page to the U-Me system. The user could then authenticate to the U-Me system, preferably by biometric authentication if the computer in the Internet café has that capability, or via a username and password or other non-biometric authentication if the computer does not have biometric authentication capability. Once authenticated, the universal user interface could be displayed in the web browser, which then provides access to all of the user's data, licensed content, and settings, including the user's licensed software, on the computer system in the Internet café. Running software on a virtual machine via a universal user interface provides a very powerful platform that may be accessed using any suitable device in any suitable location. For example, if a user rents a hotel room that is U-Me certified, the user could invoke via a browser on the television the universal user interface via a web browser, which would make all of the user's data, content and settings, including software, available in the hotel room.

Figures 117, 118, 119:
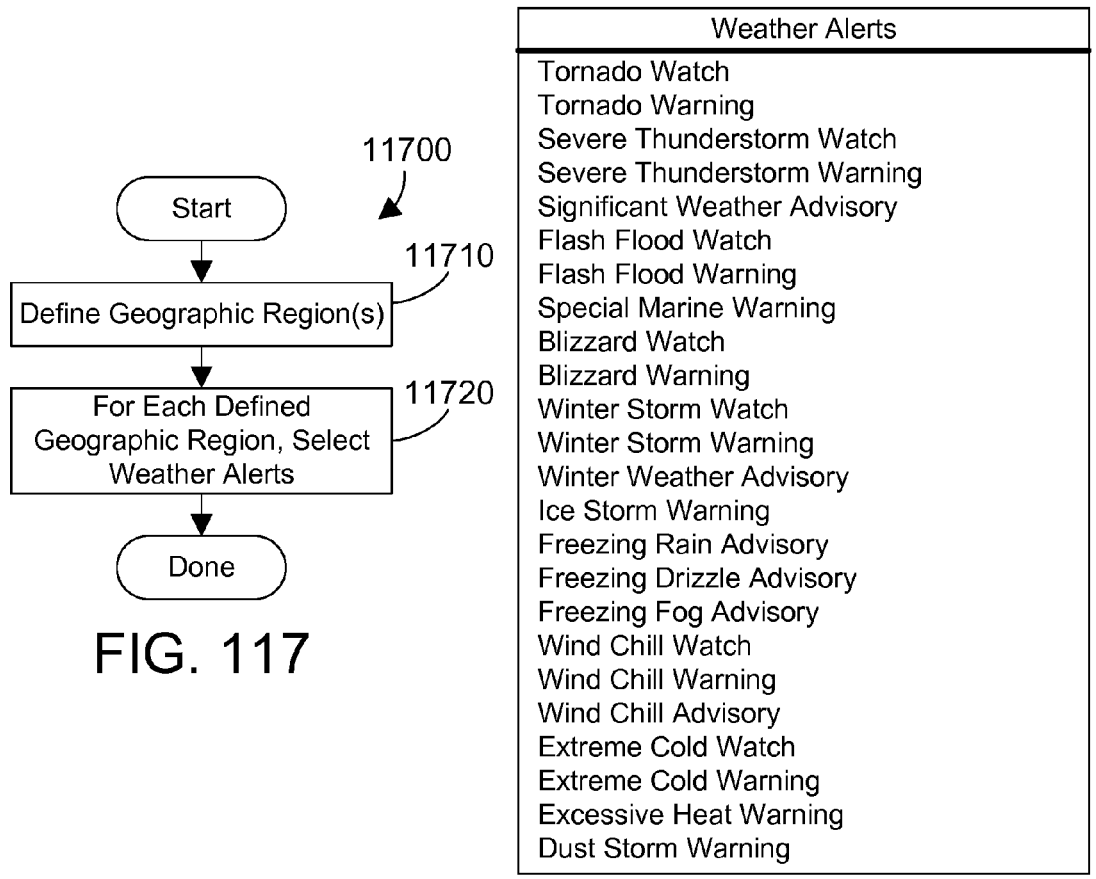
FIG. 117 is a flow diagram of a method for selecting weather alerts for defined geographic regions.
FIG. 118 is table showing examples of weather alerts defined by the United States National Oceanographic and Atmospheric Administration (NOAA)
FIG. 119 shows an example of an interface for a user to define weather alerts.

The U-Me system can also give weather notifications to its users. Weather notifications are referred to herein as weather alerts. The weather alerts may be provided, for example, by the alert mechanism 166 shown in FIG. 5. Referring to FIG. 117, method 1700 allows a user to define one or more geographic regions (step 11710), and for each defined region, the user may select one or more weather alerts (step 11720). The National Oceanic and Atmospheric Association (NOAA) operates special radio stations in the United States that broadcast weather information continuously. These radio stations work in conjunction with special weather radios that can be activated by a weather alert from the NOAA radio station. Known weather radios allow the user to select counties for which weather alerts are received. Some of the weather alerts defined by NOAA are shown by way of example in FIG. 118. However, known weather radios do not allow the user to customize weather alerts according to the user's preferences.

If a person lives in an area where tornados can occur, and wants a weather radio to sound the alarm in the event of a tornado watch or a tornado warning, the person typically sets the location on a weather radio to the county where the person lives. While this may result in tornado watches and warnings waking up the user in the middle of the night, which is desirable so the user can take cover in a shelter, this will also result in many other weather alerts waking up the user in the middle of the night. For example, if the user lives several miles from any creeks, streams or rivers, the user probably does not want to be awakened at 3:00 AM by the weather radio giving a flash flood warning. Similarly, if the user is home and warm in his bed, the user probably does not want to be awakened to be information of a wind chill warning. While this may be valuable information in the morning before the user leaves for work, it is annoying to be repeatedly awakened during the night for all the different weather alerts that may issue from the NOAA radio station.

Some people become so annoyed at being repeatedly awakened for weather alerts they don't care about that they turn the alert function of the weather radio off. This defeats the entire purpose of the weather radio, because with the alert turned off, the weather radio cannot awaken the user when a tornado watch or tornado warning is issued. There needs to be a better way for a user to customize weather alerts. The U-Me system provides this better way.

Referring to FIG. 119, a sample input screen 11900 for a weather alert interface is shown to include fields for Alert Type, Geographic Region, Time of Day, Priority, and Send Alert to. The weather alert interface provides a way for a user to define many different types of weather alerts so the user is not repeatedly awakened in the night for weather alerts in which the user has no interest. Sample weather alerts defined by a user are shown in FIGS. 120-122. The weather alert in FIG. 120 is for a Tornado Alert, which is to sound when a tornado alert is issued for this county and neighboring counties, the time of day for the warning is Any, the priority is High, and the Send Alert To specifies to send the alert for the tornado warning to all of the user's registered devices using all message types. Thus, when a tornado warning is issued by NOAA for this county and neighboring counties, the user will be notified with high-priority alerts, which can include alerts on any and all of the user's devices, so the user will be informed of the tornado warning, even if it means the user is awakened in the night.

A second example weather alert is shown in FIG. 121, which is a weather alert for a Flash Flood Watch. The geographic region may be defined as "within 10 miles of my current location; the Time of Day is Any; the priority is low; and the Send Alert To is e-mail and text. Because the priority is low, the user will not be awakened by a flash flood watch. In the U-Me system, a user can define a geographic region in any suitable way, including by specifying defined regions like counties, or defining a radius from the user's current location. By defining a radius, the U-Me system can dynamically adjust as the user moves. Thus, if the user is in Jasper County but lives within 10 miles of the Jasper/Newton County line, and if the NOAA alerts are done county-by-county as they currently are done, the U-Me system could convert the "10 mile radius of my current location" specified in FIG. 121 to include flash flood watches for both Jasper County as well as Newton County. The conversion of settings is preferably performed by the conversion mechanism 160 shown in FIG. 5. Because the low-priority Flash Flood Watch weather alert is sent to the user via e-mail and text, the user will not be awakened by this alert, but the information will be available via e-mail and text when the user awakens.

A third example weather alert is shown in FIG. 122, which is a weather alert for a Wind Chill Watch. The geographic region is set to a 50 mile radius of my current location, the time of day is Any, the priority is Low, and the alerts are sent via e-mail and text. The ability to truly customize weather alerts allows the U-Me system to benefit from the weather alerts provided by the NOAA system while giving the user flexibility so the user will not be repeatedly awakened by weather alerts for which he has no interest.

Figure 123:
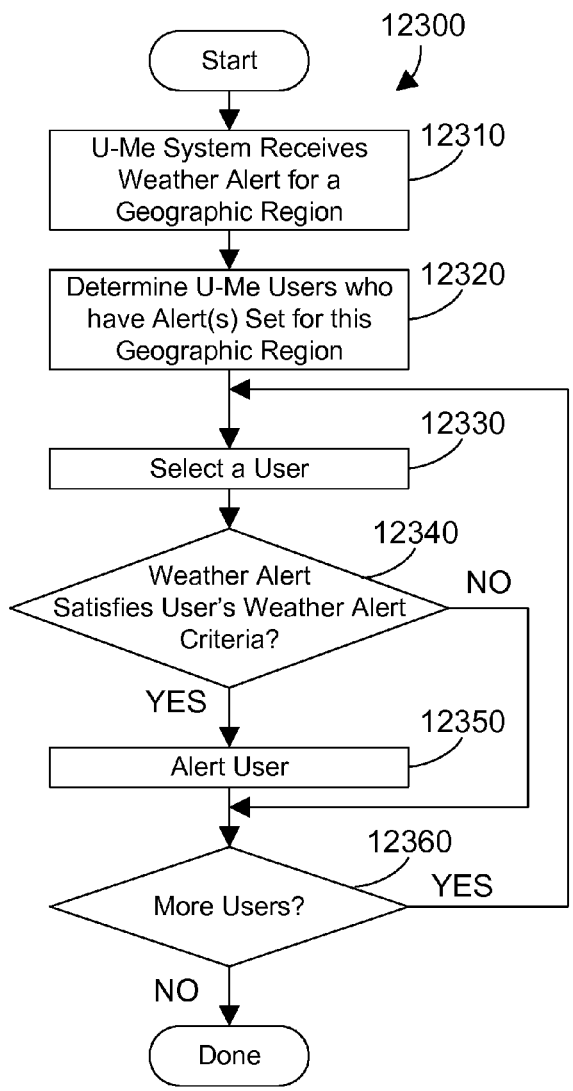
FIG. 123 is a flow diagram of a method for the U-Me system to process weather alerts.

Referring to FIG. 123, a method 12300 shows how the U-Me system processes weather alerts. The U-Me system receives a weather alert for a geographic region (step 12310). The weather alert received in step 12310 could be, for example, a weather alert from NOAA, but could also include other weather alerts from other sources as well. The U-Me system determines which users (if any) have alerts set for the geographic region specified in the alert (step 12320). One of the users that has an alert set for this geographic region is selected (step 12330). When the weather alert satisfies the user's weather alert criteria (step 12340=YES), the user is alerted (step 12350). When the weather alert does not satisfy the user's weather alert criteria (step 12340=NO), the user is not alerted. When there are more users who have alerts set for the geographic region for the weather alert (step 12360=YES), method 12300 loops back to step 12330 and continues until there are no more users who have alerts set for the geographic region for the weather alert (step 12360=NO). At this point, method 12300 is done. The U-Me system provides an additional layer of technology atop the inefficient NOAA weather radio system to allow the user to customize weather alerts to the user's liking. In this manner the user can be awakened for any weather alert he chooses, yet can remain asleep for other weather alerts for which the user does not care to be awakened.

Figure 124:
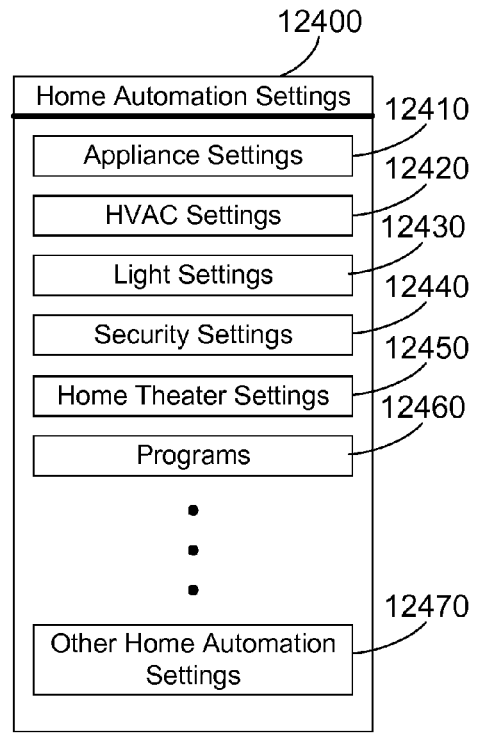
FIG. 124 is a block diagram showing examples of home automation settings.
Figure 125:
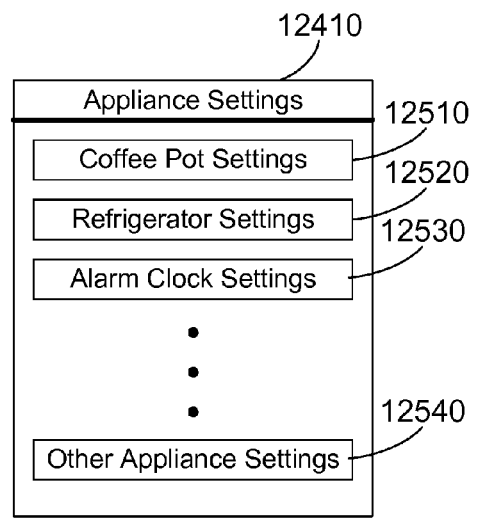
FIG. 125 is a block diagram showing examples of appliance settings.

Various functions relating to home automation are shown in FIGS. 124-130 and discussed in detail below. These functions are preferably performed by the home automation mechanism 186 shown in FIG. 5. FIG. 8 shows that user settings 140 may include home automation settings 850. An example of suitable home automation settings are shown at 12400 in FIG. 124. The example home automation settings shown in FIG. 124 include appliance settings 12410, Heating/Ventilation/Air Conditioning (HVAC) settings 12420, light settings 12430, security settings 12440, home theater settings 12450, programs 12360, and other home automation settings 12470, Examples of suitable appliance settings 12410 are shown in FIG. 125 to include coffee pot settings 12510, refrigerator settings 12520, alarm clock settings 12530, and other appliance settings 12540. Some appliances already have IP addresses, and some people think all devices that plug in will have IP addresses someday. The U-Me system contemplates the future, when a user may want to define settings in the user's U-Me account for any and all of the user's appliances.

Figure 126:
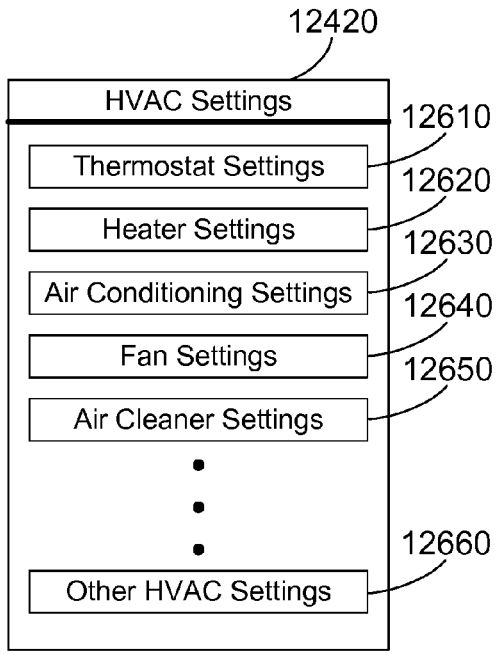
FIG. 126 is a block diagram showing examples of HVAC settings.

Examples of suitable HVAC settings 12420 are shown in FIG. 126 to include thermostat settings 12610, heater settings 12620, air conditioning settings 12630, fan settings 12640, air cleaner settings 12650, and other HVAC settings 12660. Thermostat settings 12610 may include settings for different thermostats in different zones. Heater settings 12620 may include the heat temperature setting on a thermostat. Air conditioning settings 12630 may include the cool temperature setting on a thermostat. Fan settings 12640 may include turning various fans on or off, or varying the speed of fans, including fans on heaters, air conditioners, ceiling fans, stove exhaust fans, bathroom exhaust fans, etc. For example, fan settings 12640 could specify to run a bathroom exhaust fan when the bathroom light is turned on and to keep the exhaust fan running for ten minutes after the bathroom light is turned off. Air cleaner settings 12650 could include settings to run the air cleaner for a specified continuous period at night, then intermittently during the day according to a defined schedule.

Figure 127:
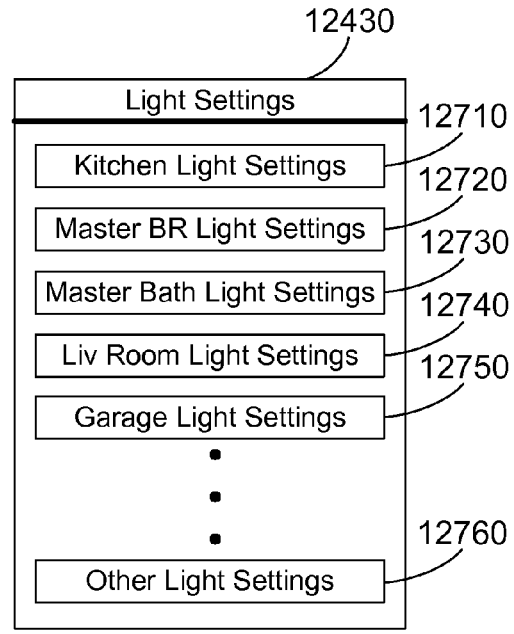
FIG. 127 is a block diagram showing examples of light settings.

Examples of suitable light settings 12430 are shown in FIG. 127 to include kitchen light settings 12710, master bedroom light settings 12720, master bathroom light settings 12730, living room light settings 12740, garage light settings 12750, and other light settings 12760. Light settings 12430 can include settings for any light or group of lights. For example, the user may have a motion sensor near the front door of the house to detect when somebody is approaching the front door. Light settings 12430 could include a setting that turns on the porch light when the motion detector detects motion near the front door. Light settings 12430 could include any suitable condition or trigger for turning lights on or off. For example, exterior security floodlights could be illuminated at dark and be kept on until dawn, or could be selectively turned on and off based on one or more motion sensors.

Figure 128:
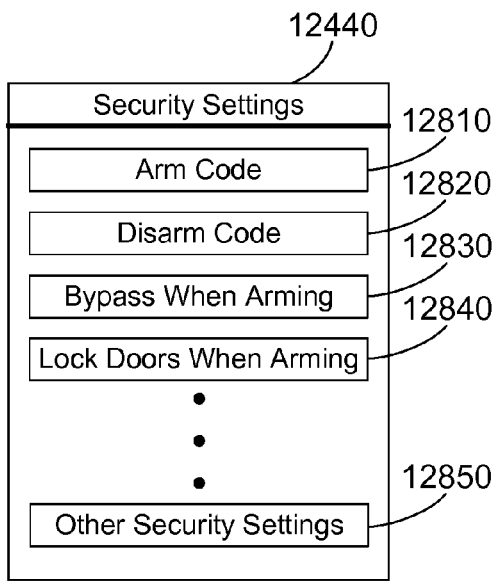
FIG. 128 is a block diagram showing examples of security settings.

Examples of suitable security settings 12440 are shown in FIG. 128 to include an arm code 12810, a disarm code 12820, a bypass when arming condition 12830, a lock doors when arming condition 12840, and other security settings 12850.

Figure 129:
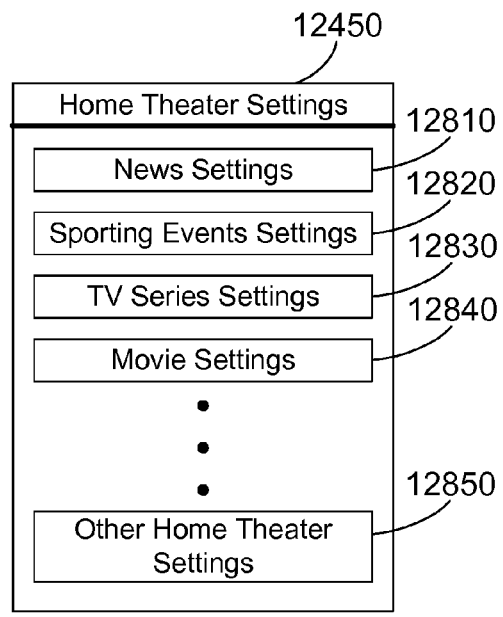
FIG. 129 is a block diagram showing examples of home theater settings.

Examples of home theater settings 12450 are shown in FIG. 129 to include news settings 12810, sporting events settings 12820, TV series settings 12830, movie settings

12840, and other home theater settings 12850. The home theater settings 12450 allow a user to define a "scene" for various types of viewing experiences. The settings shown in FIG. 129 could each include settings for the home theater audio system, for lights in the TV room and possibly adjacent rooms, for opening and closing drapes or blinds on one or more windows, etc. Thus, when a user wants to settle in to watch a movie, the user can select "Movie" mode, and the room will then be configured with the appropriate lights, sound settings, window covering positions, etc. for the user to watch a movie.

Programs 12460 shown in FIG. 124 can include any suitable program or logic to cause different things in the home automation controller to occur based on some specific condition, event, or relationship. An example of a suitable program for a home automation controller is: When arming alarm (ARM), set Thermostat) to Day High Setting. Thus, when the user presses buttons on the home automation keypad to set the alarm as the user is leaving the house, the program above will cause the settings in Thermostat) to change since nobody is home. Another example of a suitable program is: When GARAGE DOOR opens, turn on Garage Lights. The programs 12460 can include any suitable logic, setting, or combination of settings for home automation, whether currently known or developed in the future.

FIG. 130 shows a display of sample home automation settings 13000 that could reside in a user's U-Me account. Home automation settings 13000 for the simple example shown in FIG. 130 include appliance settings 12410, HVAC settings 12420, and light settings 12430. The appliance settings 12410 in FIG. 130 include "start the coffee pot brewing at 8:00 AM," "turn on the refrigerator icemaker," and "set the alarm clock for an 8:00 AM alarm." The HVAC settings 12420 in FIG. 130 include cool and heat settings from 8:00 AM to 10:00 PM; cool and heat settings from 10:00 PM to 8:00 AM; the furnace fan set to auto on the thermostats; and the heat/cool mode set to auto on the thermostats. The light settings 12430 in FIG. 130 include turning all lights off at 10:00 PM, turning bedroom lights on at 8:00 AM, and turning all lights on in the event that the security system that is part of the home automation controller sounds a security alarm.

With the user's home automation settings stored in the user's U-Me account, these settings are available for use at a different location. Thus, let's assume the user takes a vacation and rents a condo at the French Riviera. Let's further assume the condo is U-Me certified. When the user arrives at the condo, the user can authenticate to the U-Me system using either the user's smart phone or another user device, or using a device in the condo. Once the U-Me system knows the condo where the user is staying, the U-Me system will have all of the templates that pertain to all of the U-Me certified equipment in that condo. Thus, all of the user's home automation settings (such as those shown in FIG. 130) could be programmed into corresponding equipment at the rental condo. This could even extend to the arm/disarm code for a security system, so the user can use the same codes she uses at home to arm and disarm the security system at the rental condo. This can be done even if the security system at the condo is a totally different brand and type of security system. The conversion mechanism 160 in the U-Me system can convert the user's settings at home to corresponding settings in the rental condo. The U-Me system thus allows "me to be me, anywhere" by making a user's settings in the U-Me account available wherever the user happens to be, on whatever device or equipment the user is using.

With computers today, users typically install software on their computer system, then enter a license key during installation or activation code after installation that makes the software work. For the ease of discussion herein, the term "license key" means any information the user may enter to gain access to a computer program. Thus, for every program a user installs, there are two critical pieces of information: 1) the program itself; and 2) the license key that allows the user to install the program. Most users today purchase software online, which results in an installation package being downloaded to the user's computer. The license key is typically sent to the user via e-mail. Thus, when the user clicks on the installation package, the user is then prompted to enter the license key. Once the license key is installed, the software can be installed and run. In other scenarios, the software can be completely installed, but the license key (or activation code) must be entered after installation to enable all of the features of the software.

Many computer users are not tech-savvy enough to know where an installation package is stored when it is downloaded to the user's computer. And many users do not keep track of their e-mails well enough to assure the license key is saved in case the software ever needs to be reinstalled. The result is that one of the two important pieces needed to install and run a computer program can be easily misplaced or lost. This is prevented by the license management mechanism 188 in the U-Me system shown in FIG. 5. The license management mechanism 188 can perform a method such as method 13100 in FIG. 131. The user downloads software (step 13110). The user enters the license key to install or activate the software (step 13120). Once the user enters the license key, the license management mechanism 188 has both crucial pieces of information that will be needed if the software ever needs to be installed or activated in the future. A license management entry is thus created in the user's U-Me account for the software and the corresponding license key. One suitable example of such an entry is shown at 13200 in FIG. 132, which includes a license key 13210 and the software 13220. Note the software 13220 can include a fully downloaded computer program ready to install, or can include an installation package that includes a smaller piece of code that, in turn, downloads and installs the software from an online provider.

While the example in FIGS. 131 and 132 relate to software, the license management mechanism 188 can track license information for all licensed content. For example, when music is purchased, the license management mechanism will create an entry that includes the music file as well as license information for the music file. The license management mechanism thus monitors and stores licensed content and corresponding license information so this information can be accessed in the future. This can be useful, for example, when performing an audit to assure the user has licenses for all licensed content, and when transferring licensed content to another user, as discussed in more detail below.

Figures 133, 134:
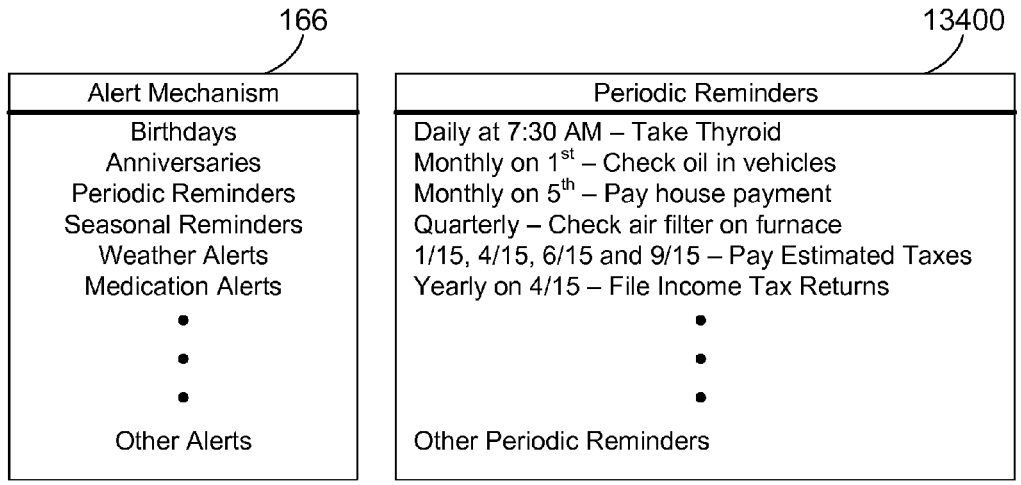
FIG. 133 is a block diagram showing examples of alerts a user can define in the user's U-Me account.
FIG. 134 is a block diagram showing examples of periodic reminders a user can define in the user's U-Me account.

Referring to FIG. 133, examples of alerts that can be provided by alert mechanism 166 in FIG. 5 include birthdays, anniversaries, periodic reminders, seasonal reminders, weather alerts, medication alerts, and other alerts. Examples of periodic reminders are shown at 13400 in FIG. 134 to include a reminder for a user to take thyroid medication every day at 7:30 AM, a reminder to check oil on all vehicles on the 1st of each month, a reminder to pay the house payment on the 5th of each month, a reminder to check the air filter on the furnace each quarter, a reminder to pay estimated taxes on specified dates, a reminder to file income tax returns annually on April 15th, and other periodic reminders. Periodic reminders can include any reminder for any type of information, event, or task.

Figure 135:
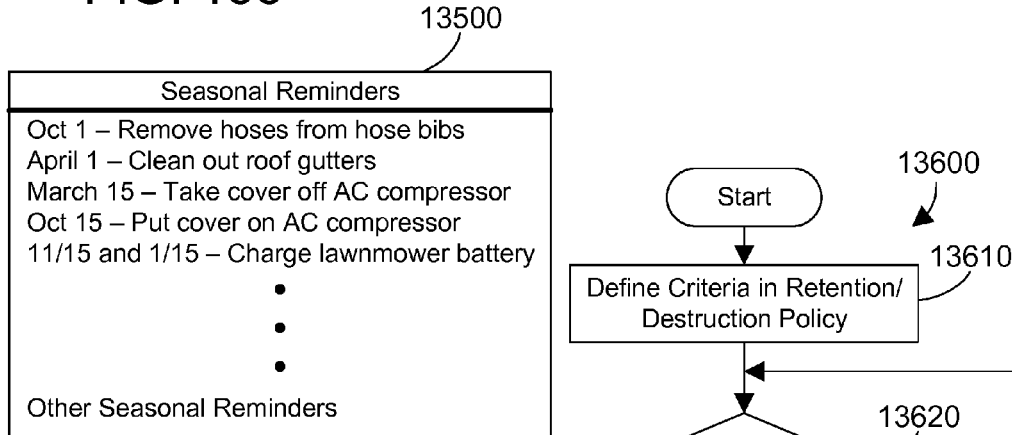
FIG. 135 is a block diagram showing examples of seasonal reminders a user can define in the user's U-Me account.

Examples of seasonal reminders are shown at 13500 in FIG. 135 to include a reminder each October 1st to remove hoses from the hose bibs (so a freeze does not cause the hose bibs to burst), a reminder each April 1st to clean out the roof gutters, a reminder each March 15th to take the cover off the AC compressor, a reminder each October 15 to put the cover on the AC compressor, a reminder on November 15 and January 15 to charge the riding lawnmower battery (so it doesn't run down over the winter), and other seasonal reminders. Note that seasonal reminders can be thought of as a specific subset of periodic reminders. While the U-Me system can provide its own alerts and reminders, the U-Me system can also interact with a user's calendar and tasks to set reminders in those systems as well.

Figure 136:
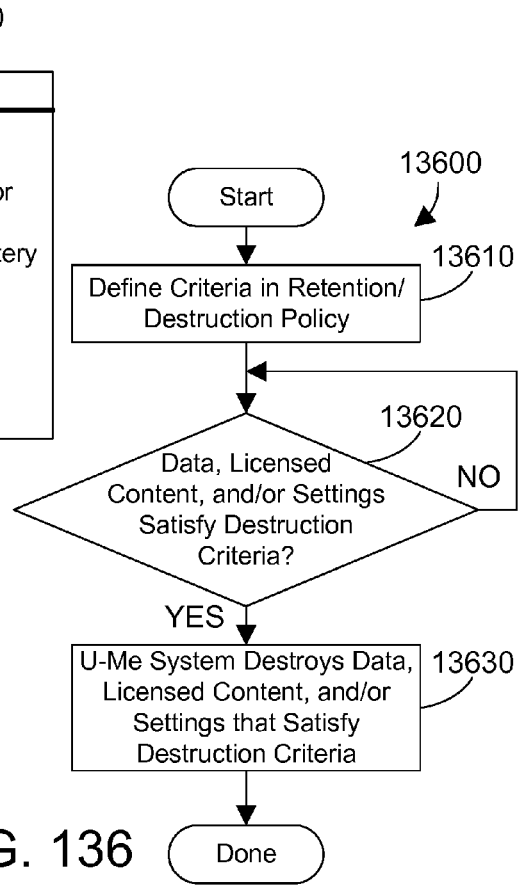
FIG. 136 is a flow diagram of a method for the U-Me system to automatically destroy data and/or licensed content and/or settings according to a defined retention/destruction policy.

Another function that can be provided by the U-Me account is the automated destruction of data, content or settings based on defined criteria in a retention/destruction policy by the retention/destruction mechanism 170 shown in FIG. 5. Referring to FIG. 136, in method 13600 a user defines criteria in the user's retention/destruction policy (step 13610). When none of the data or licensed content or settings satisfy criteria for destruction (step 13620=NO), method 13600 loops back and waits until any of the data and/or licensed content and/or settings satisfy the criteria for destruction (step 13620=YES). The U-Me system then destroys the data and/or licensed content and/or settings that satisfy the criteria for destruction specified in the user's Retention/Destruction policy (step 13630).

A sample retention/destruction policy is shown at 13700 in FIG. 137. This shows to retain tax returns for five years; to destroy specified data upon my death; to destroy a virtual device that is more than two generations back; and other retention/destruction criteria. Note that destroying data in this context means deleting the data from the user's U-Me account. Instead of specifying to retain tax returns for five years, the user could instead specify to destroy tax returns after five years. These may accomplish the same end result in the U-Me system, or may provide completely different results. For example, if the user specifies to retain tax returns for five years, and the user then attempts to delete a tax return in the user's U-Me account is less than five years old, the U-Me system could prevent the deletion and provide a message to the user that deletion of the tax return is not allowed due to the retention criteria the user specified in the Retention/Destruction policy. On the other hand, if the user specifies to delete tax returns after five years, this would not necessarily prevent the user from deleting a tax return that is less than five years old. However, the U-Me system would be sure to destroy a tax return once it is more than five years old.

The U-Me system also provides a licensed content transfer mechanism 168 in FIG. 5. A suitable example of the licensed content transfer mechanism 168 is shown as licensed transfer content mechanism 13800 in FIG. 138, which lists possible transfers of licensed content, including gift, sale, inheritance, and other transfers. Because licensed content in the U-Me system is preferably licensed to a user and not to any physical device, the licensed content becomes digital personal property that can be transferred by gift, sale, inheritance, etc. Thus, let's assume a user buys a perpetual license for a song, which is then downloaded to the user's U-Me account. Let's assume the user tires of the song and wants to sell the song to someone else. In method 13900 in FIG. 139, the U-Me system receives a request from User1 to transfer licensed content to User2 (step 13910). The U-Me system then transfers the licensed content from User1's U-Me account to User2's U-Me account (step 13920). The U-Me system can include appropriate controls to verify User1's license to the licensed content before the transfer, and to transfer the license with the licensed content to User2. Thus, a user that tires of a song could list the song for sale on eBay, and when the song sells to another U-Me user, the seller could request the transfer of the song to the buyer, which is then carried out by the U-Me system.

Note the second criteria in the Retention/Destruction policy 13700 shown in FIG. 137 specifies to delete specified data upon my death. The Retention/Destruction mechanism 170 thus allows a user to specify certain information that will be destroyed when the U-Me system receives proof of the user's death. For example, if a user is single, upon the user's death, the user's tax returns are no longer relevant, and can be automatically destroyed. An imaginative reader can imagine many other scenarios where automatic destruction of data upon a user's death would be desirable.

As described above, the U-Me system supports the concept of digital estate planning. This means for content that is licensed to the user in perpetuity, the user can define transfer-on-death rules. A method 14000 is shown in FIG. 140. The U-Me system receives proof of the death of User1 (step 14010). The U-Me system then reads the transfer-on-death rules the user may have defined (step 14020). The U-Me system then transfers User1's licensed content to one or more other U-Me users according to User1's transfer-on-death rules (step 14030). In this manner, content for which the user has a perpetual license may be automatically transferred to one or more different users automatically upon the user's death.

Figure 141:
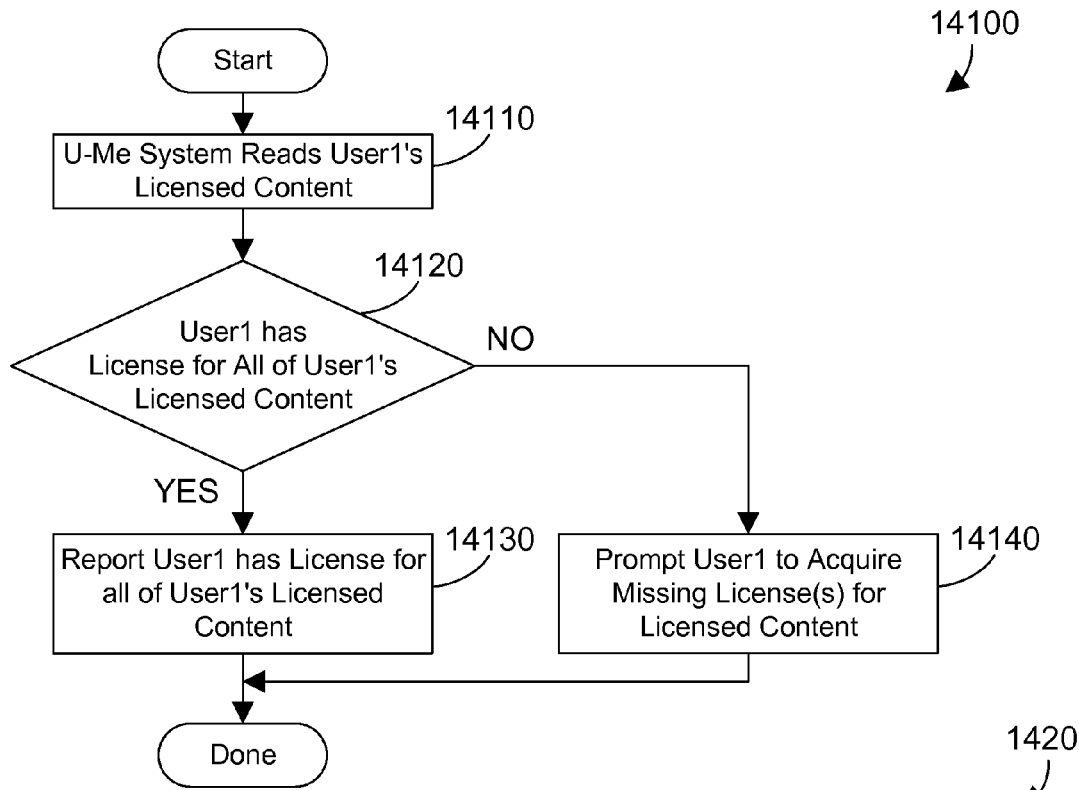
FIG. 141 is a flow diagram of a method for auditing the licensed content in a user's U-Me account.

Another feature of the U-Me system is the ability to audit the licensed content for a user. FIG. 141 shows a suitable method 14100 for performing an audit. The U-Me system reads the licensed content in the user's U-Me account (step 14110). When the user has a license for all of the user's licensed content (step 14120=YES), method 14100 reports the user has a license for all the user's licensed content (step 14130). When the user does not have a license for all of the user's licensed content (step 14120=NO), the user is prompted to acquire the missing licenses for the licensed content (step 14140). Note the display provided to the user in step 14140 may include controls to delete licensed content for which the user does not have a license, may include controls to acquire a license, and may allow the user to put off acquiring the needed license(s) for some period of time.

Figure 142:
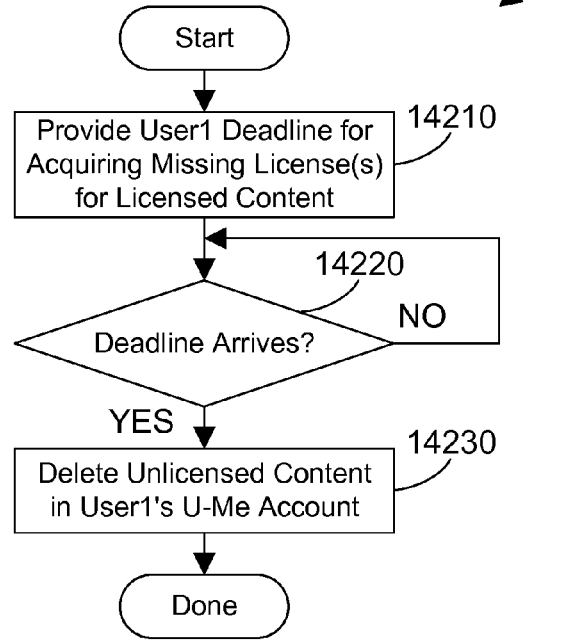
FIG. 142 is a flow diagram of a method for deleting content that is unlicensed from a user's U-Me account.

When the user selects to put off acquiring the needed license(s) for licensed content in the user's U-Me account, the U-Me system can enforce the license audit with a deadline. Referring to FIG. 142, in a method 14200 the U-Me system provides to the user a deadline for acquiring the missing license(s) for licensed content (step 14210). As long as the deadline has not arrived (step 14220=NO), method 14200 waits until the deadline arrives (step 14220=YES). Once the deadline has arrived, any unlicensed content in the user's U-Me account is deleted (step 14230).

Figure 143:
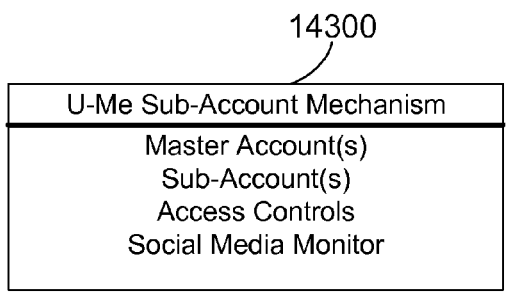
FIG. 143 shows an example of a U-Me sub-account mechanism.

The U-Me system includes a sub-account mechanism 190 that allows a user to setup sub-accounts to the user's U-Me account. FIG. 143 shows a U-Me sub-account mechanism 14300 that is one suitable example of the sub-account mechanism 190 shown in FIG. 5, which includes one or more master accounts, one or more sub-accounts, access controls, and a social media monitor. In one possible scenario, a Mom and Dad are setup as master accounts, and their kids are setup as sub-accounts. The users who have master accounts may define access controls for the sub-accounts, and may further define parameters for the social media monitor. In this manner, parents can control how the kids use their U-Me sub-accounts. This same scenario could be used in a classroom setting, where the teacher has a master account and the students all have sub-accounts. Note the sub-account mechanism can define an account as a sub-account to establish a relationship with the master account without limiting access of the user in the user's account. Thus, if an adult is taking night classes, and the student and the teacher both have U-Me accounts, the sub-account mechanism can be used to establish a relationship between the U-Me users. Thus, the teacher could post homework assignments to her U-Me account, and the homework assignment could then be made available to all sub-accounts.

Figure 144:
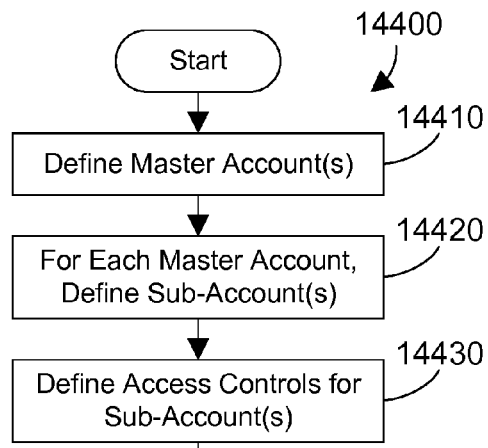
FIG. 144 is a flow diagram of a method for defining and using sub-accounts.

Method 14400 in FIG. 144 starts by defining one or more master accounts (step 14410). For each master account, one or more sub-accounts may be defined (step 14420). Access controls may be defined for the sub-accounts (step 14430). In addition, social media activity of the sub-accounts may be reported to the master account(s) (step 14440). The sub-account concept is a powerful tool for creating relationships between U-Me users and for potentially defining how users can access and use the U-Me system.

Figure 145:
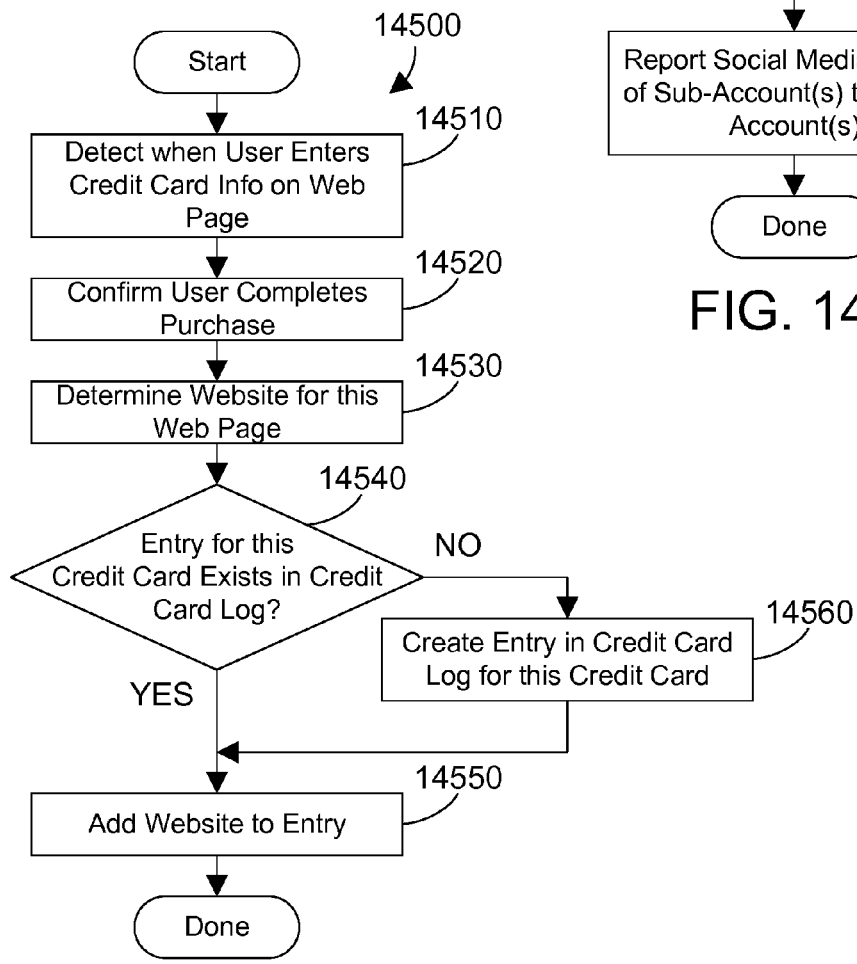
FIG. 145 is a flow diagram of a method for the U-Me system to track credit card usage by a user for online transactions.

The U-Me system also includes a credit card monitoring mechanism 192 shown in FIG. 5. The credit card monitoring mechanism 192 preferably monitors when a user makes a purchase with a credit card online, and creates a log of all websites where the user used each credit card. Referring to FIG. 145, in method 14500 the U-Me system detects when a user enters credit card info on a web page (step 14510). Method 14500 then confirms the user completes the purchase (step 14520). The website for the web page where the user made the purchase is determined (step 14530). When there is an existing entry in the credit card log for this credit card (step 14540=YES), the website is added to the entry (step 14450). When there is no existing entry for this credit card in the credit card log (step 14540=NO), an entry is created in the credit card log for this credit card (step 14560), and the website is added to the entry (step 14550).

Figure 146:
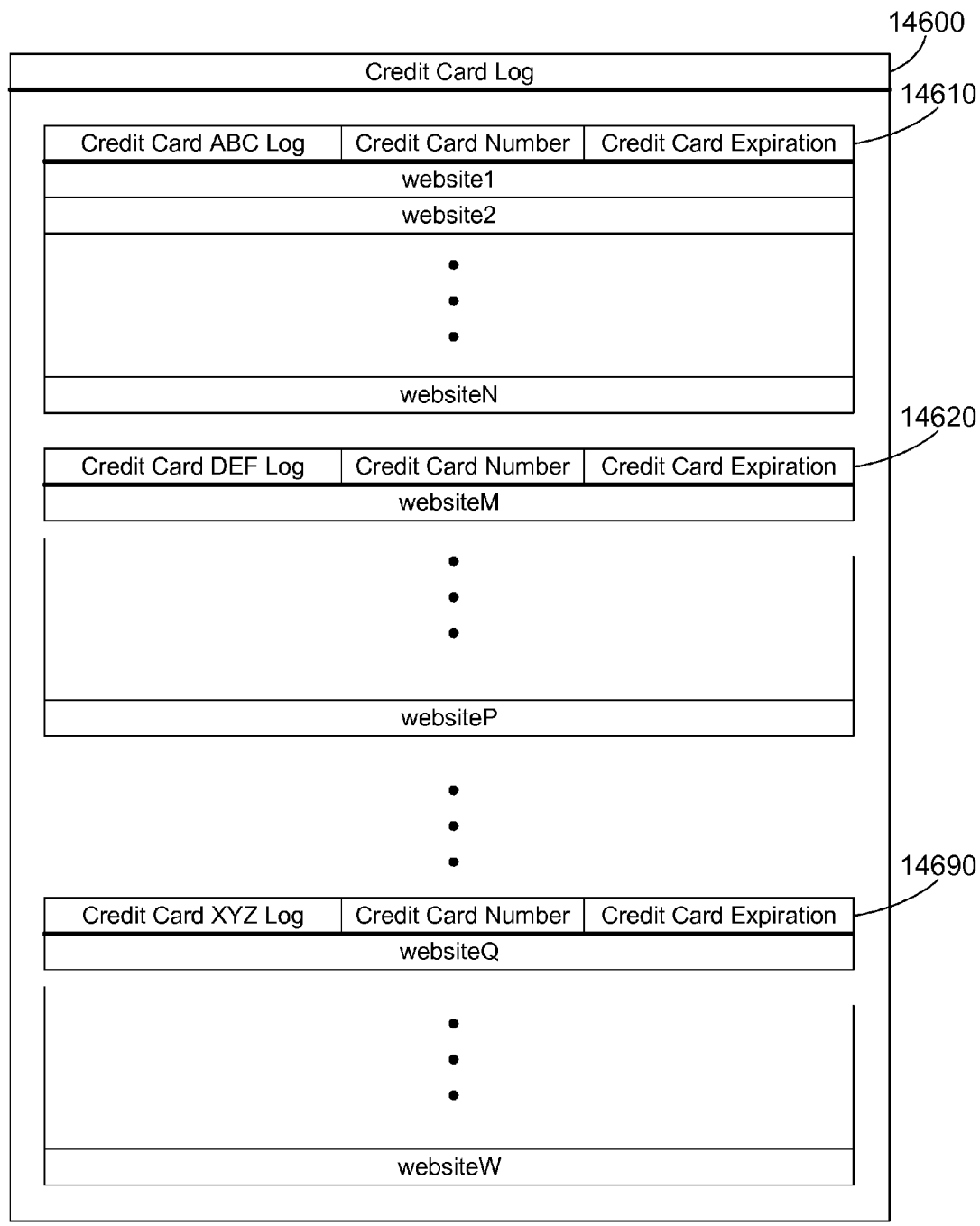
FIG. 146 is an example credit card log that shows three different credit cards and websites where the user used each credit card.

One suitable example of a credit card log is shown at 14600 in FIG. 146 to include entries for each credit card that specify the credit card name, credit card number, and expiration date, with a list of websites where the credit card was used. Log 14600 in FIG. 146 shows entries 14610, 14620 and 14630 for three credit cards, respectively, with each entry including a list of websites where the credit card was used.

Figures 147, 148:
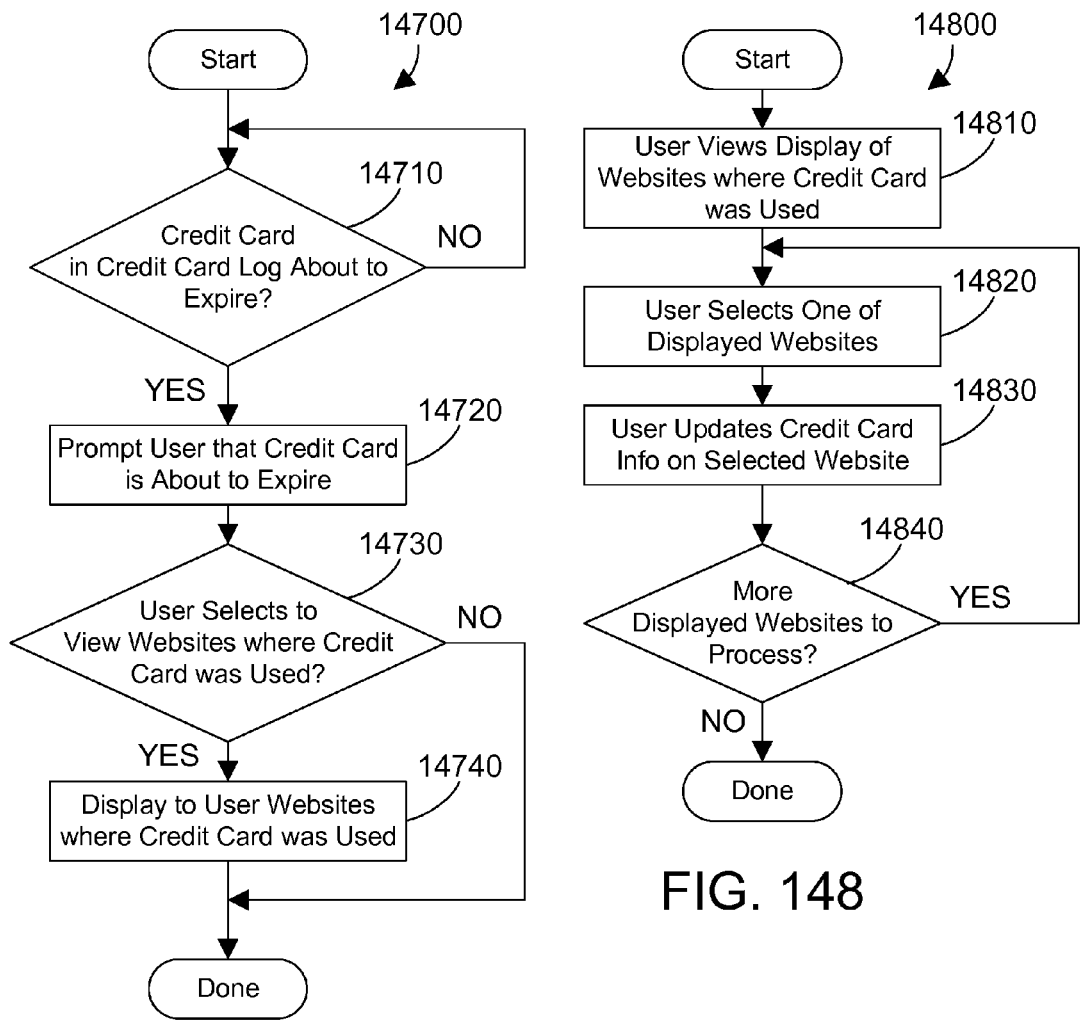
FIG. 147 is a flow diagram of a method for prompting a user regarding on which websites the user used a credit card when the credit card is about to expire.
FIG. 148 is a flow diagram of a method for a user to update credit card information on websites where the user has used the credit card.

Referring to FIG. 147, method 14700 waits until a credit card in the credit card log is about to expire (step 14710=YES). Note that "about to expire" can be defined in any suitable way, such as one month before expiration. The user is prompted that the credit card is about to expire (step 14720). When the user selects to view the websites where the credit card was used (step 14730=YES), method 14700 displays to the user the websites where the credit card was used (step 14740). Referring to FIG. 148, the user views the display of websites where the credit card was used (step 14810). The user selects one of the websites (step 14820). The user updates the credit card info on the selected website (step 14830). When there are more displayed websites to process (step 14840=YES), method 14800 loops back to step 14820 until there are no more displayed websites to process (step 14840=N0).

The credit card monitoring mechanism in the U-Me system allows the user to update the credit card information on some or all of the websites where the credit card was used before the credit card expires. If the use of the credit card was for a one-time purchase at a website, the user will probably not want to update the credit card information for that website. But when the use was for a website the user uses often (e.g., PayPal, Amazon.com), or when the use is for a recurring bill (e.g., electric bill, phone bill), being prompted that a credit card is about to expire can provide important benefits, such as making sure a bill payment is not missed due to an expired credit card.

Figure 149:
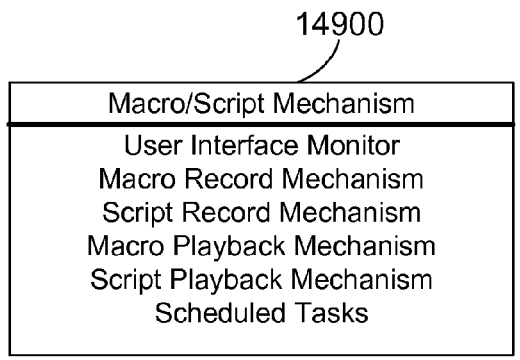
FIG. 149 is a block diagram of an example of a macro/script mechanism.
Figure 150:
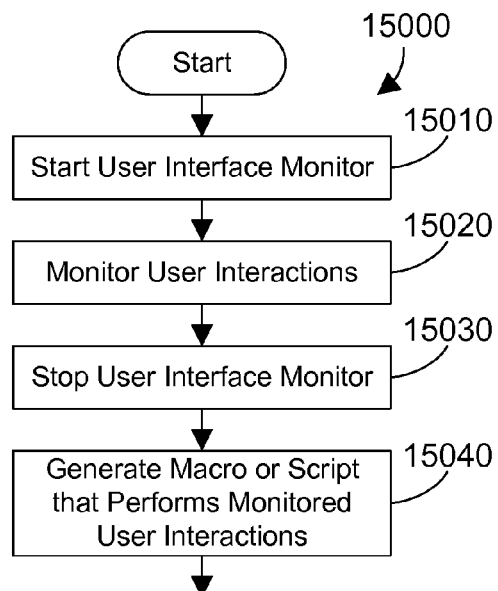
FIG. 150 is a flow diagram of a method for generating macros and/or scripts.

The U-Me system also includes a macro/script mechanism 172 shown in FIG. 5. One suitable example of the macro/script mechanism 172 is shown at 14900 in FIG. 149 to include a user interface monitor, a macro record mechanism, a script record mechanism, a macro playback mechanism, a script playback mechanism, and scheduled tasks. Referring to FIG. 150, method 15000 starts the user interface monitor (step 15010). The user interactions are monitored (step 15020). The user interface monitor is stopped (step 15030). A macro or script is then generated that performs the monitored user interactions (step 15040). For example, let's assume a U-Me user receives their bank statements from Wells Fargo via the user's online account with Wells Fargo. The user needs to retrieve the bank statement each month. The user could start the user interface monitor in step 15010, then perform all of the actions to retrieve and store the bank statement to the user's account, which might include the steps of: the user clicks on a bookmark for the Wells Fargo website, which bring up a login page; the user enters the username in the username field; the user enters the password in the password field; the user selects a "login" button; the user selects the account of interest; the user clicks on the link to retrieve this month's bank statement for the account of interest; the bank statement is displayed in a separate window as a .pdf file; the user then saves the .pdf file to the user's U-Me account. At this point the user could stop the user interface monitor. A macro or script could then be generated that could retrieve each month's bank statement automatically from the Wells Fargo website and store the bank statement in the user's U-Me account. Note the terms "macro" and "script" are used herein as general terms to denote repeating steps that the user interface monitor saw the user perform, and are not limited to any particular program, program type, or technology.

Figure 151:
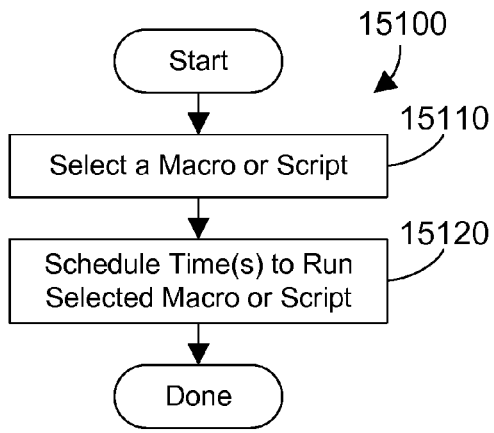
FIG. 151 is a flow diagram of a method for scheduling a macro or script to run.

Once a macro or script has been defined, a task may be scheduled using that macro or script, as shown in method 15100 in FIG. 151. A macro or script is selected (step 15110). One or more times are scheduled to run the macro or script (step 15120). Thus, for the bank statement example above, assuming the bank statement is available by the 3rd of each month, the user could use method 15100 to schedule the "Wells Fargo Bank Statement" macro or script to run on the 4th of each month.

Figure 152:
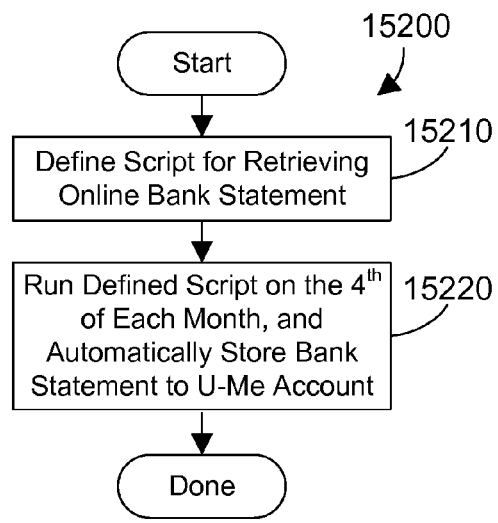
FIG. 152 is a flow diagram of an example method for running a script to automatically retrieve a bank statement on the 5th of each month, and storing the bank statement to the user's U-Me account.

A method 15200 in FIG. 152 represents a particular example for the case of automatically retrieving a bank statement as discussed above. A script is defined for retrieving an online bank statement (step 15210). The defined script is then run on the 4th of each month, which retrieves the bank statement for that month and stores the bank statement to the user's U-Me account (step 15220).

Note the macro/script mechanism 172 in the U-Me system can have more capabilities than merely repeating a user's functions. A simple example will illustrate. Let's assume the user retrieves the bank statement for July 2013 on August 10th in defining the script in step 15210 in FIG. 152, and schedules the macro or script to run on the 4th of each month. When the macro/script mechanism 172 goes to the user's online Wells Fargo account to retrieve the August bank statement on September 4th, the macro/script mechanism has to have the intelligence to retrieve the August bank statement, not to simply retrieve again the July bank statement. The script/macro mechanism may thus include intelligence that allows detecting patterns and learning from those patterns. Thus, if the bank statements for 2013 are displayed on the website in a list that includes links called "Statement Jan. 31, 2013", "Statement Feb. 28, 2013"; etc. through "Statement Jul. 31, 2013", the macro/script mechanism can recognize the pattern and know to retrieve the statement corresponding to the month previous to the month when the macro/script is run. In the alternative, the user may provide additional input after the macro/script is recorded to direct how the macro/script performs its functions. The macro/script mechanism allows automating routine tasks so the U-Me system can perform these routine tasks automatically for the user.

Figure 153:
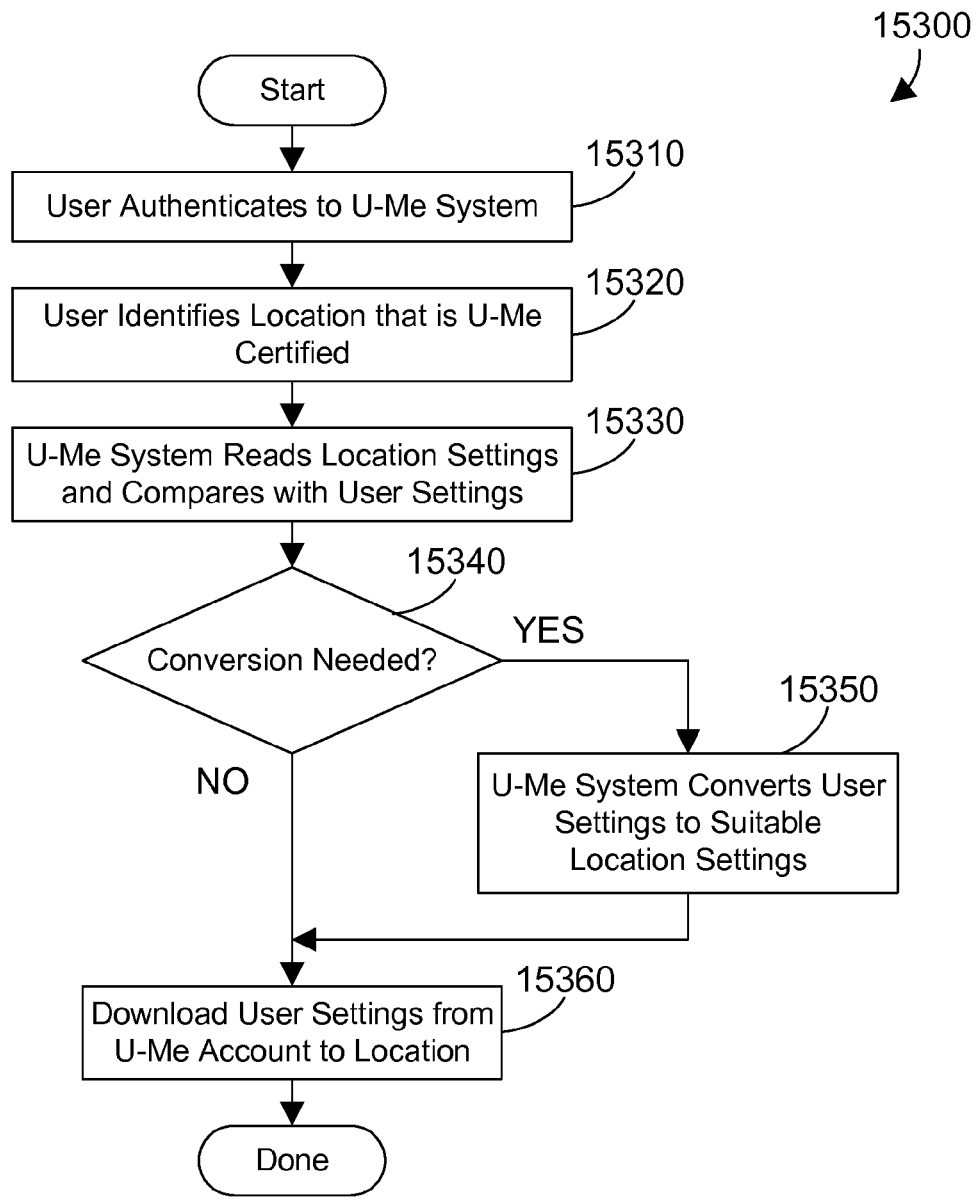
FIG. 153 is a flow diagram of a method for downloading settings from a user's U-Me account to a location.

Referring to FIG. 153, a method 15300 shows how the user may access the user's data and/or licensed content and/or settings that are stored in the user's U-Me account. The user authenticates to the U-Me system (step 15310). The user identifies a location that is U-Me certified (step 15320). The U-Me system reads the location settings and compares the location settings with the user settings (step 15330). When conversion is needed (step 15340=YES), the conversion mechanism in the U-Me system converts the user settings to suitable location settings (step 15350). The conversion of settings is preferably performed by the conversion mechanism 160 shown in FIG. 5. The user settings that correspond to the location are then downloaded to devices at the location (step 15360). When no conversion is needed (step 15340=NO), the user settings in the user's U-Me account can be downloaded to devices at the location (step 15360). Method 15300 could be representative of any suitable location, including a vehicle, a hotel room, a rental condo, etc.

As discussed in detail above, one of the advantages of the U-Me system is not requiring the user to specify a directory/subdirectory/filename for each file that is saved in the user's U-Me account, which the user would then have to remember to retrieve the file. The data tracker 162 in FIG. 5 tracks data changes and generates indexing information that is stored with a file to help retrieve the file using a search engine. The data search engine 164 in the U-Me system allows formulating very powerful queries using drop-down lists, dates or date ranges, key words, dollar amounts, devices, etc. in a very intuitive, plain-English type of interface. A U-Me user thus does not have to be a database expert who is familiar with Structured Query Language (SQL) in order to use the data search engine 164. Some sample queries that could be submitted via the data search engine 164 are shown at 15400 in FIG. 154 to include: purchases over $100 this year; phones I have owned since Jun. 12, 2012; electronic devices I currently own; total charges on credit card XYZ for the second quarter of this year; and warranties that will expire in the next six months. These examples in FIG. 154 show the data search engine 164 supports complex queries the user may formulate without being an expert at formulating database queries.

As discussed above, in the most preferred implementation, licensed content is licensed to a person and not to any particular device. In some circumstances there needs to be separation between ownership of the software and who is licensed to use the software. This is especially true in a company or corporate environment, where a company or corporation purchases licensed content for use by its employees. Referring to FIG. 155, a company purchases licensed content (step 15510). An administrator within the company then specifies a person who is the licensee for the licensed content (step 15520). The licensee is then licensed to use the licensed content (step 15530). What happens if the licensee quits or is fired? This is shown in method 15600 in FIG. 156. The person who is the licensee quits working for the company (step 15610). The administrator within the company deletes the person from the licensing info for the licensed content (step 15620). The person is no longer authorized to use the licensed content (step 15630). These methods in FIGS. 155 and 156 discuss an employee being the licensee. However, the company could be the licensee, with the person authorized to use the software in the licensing info for the licensed content. Regardless of the labels applied, the concept is the same: the company owns the licensed content, and can authorize a person to use the licensed content, and can also remove authorization for the person to use the licensed content. This is especially handy when a company purchases software with a site license or with a license that covers many users.

Figure 157:
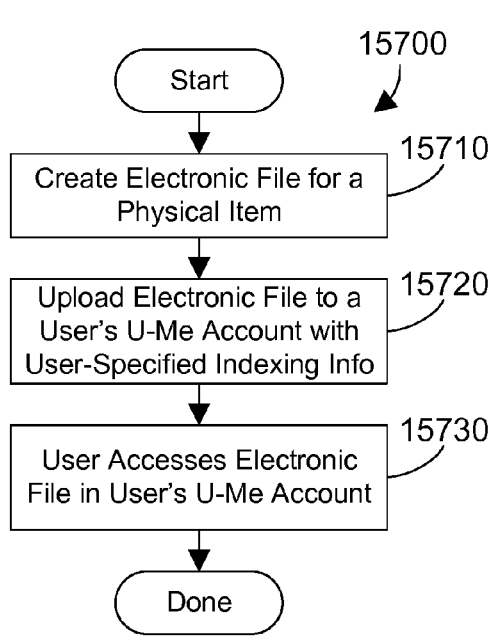
FIG. 157 is a flow diagram of a method for converting physical items to electronic form and storing those items in a user's U-Me account.

The world envisioned by a fully-functioning Universal Me system as described in detail above is much different than the world in which we currently live. Implementing the U-Me system will take many years. One aspect of evolving towards the U-Me system is the need to put existing information that does not exist in an electronic format into the user's U-Me account. A method 15700 shown in FIG. 157 shows how existing physical items can be converted to electronic format and stored in a user's U-Me account. An electronic file for a physical item is created (step 15710). This can be any suitable physical item that is converted to any suitable electronic file format. For example, a hard copy medical record could be scanned to an electronic image file. A DVD of a movie the user owns could be ripped to a .mov file. Music from a CD the user owns could be ripped to a .mp3 file. Hard copy photos could be scanned to an electronic image file. The electronic file is then uploaded to the user's U-Me account with user-specified indexing info (step 15720). The user may the access the electronic file in the user's U-Me account (step 15730).

Because there will be great demand for services to put physical items into a user's U-Me account, method 15700 could be performed by a third party provide who specializes in migrating physical items to the U-Me system. For example, a user may become a U-Me member, and may use the system initially to store photos the user takes from a smart phone. Once the user becomes convinced of the value in making all of the user's information available in the user's U-Me account, the user could hire a third party U-Me migration specialist to help migrate the user's info to the user's U-Me account. Thus, the user could take a box with photos, movies, CDs, medical records, tax returns, etc. to the U-Me migration specialist, who would have the user specify indexing info for each type of item being stored. The user can decide how much or how little indexing info to provide initially, because the user will always have the option to pull up the information later and add additional indexing info.

An example of a virtual machine is shown at 11600 in FIG. 116. Those skilled in the art of cloud computing will recognize that cloud resources are deployed on virtual machines. Virtual machines can be run on logically-partitioned computer systems. Thus, a single server computer can provide many different virtual machines to different users.

When a virtual machine runs the U-Me system for a particular user, as shown by way of example in FIG. 116, the virtual machine provides all the needed memory, hard disk space and processor power the user requires. Note, however, that dedicating a virtual machine for a particular user to be always running would be a significant dedication of resources that is not needed if the virtual machine can be created when the user needs to access the U-Me system, and automatically destroyed once the user no longer needs to access the U-Me system.

Figure 158:
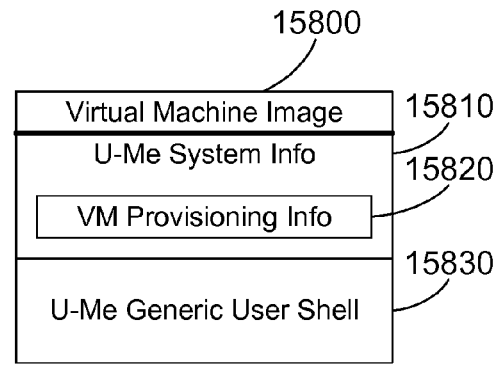
FIG. 158 is a block diagram of a virtual machine image.
Figure 159:
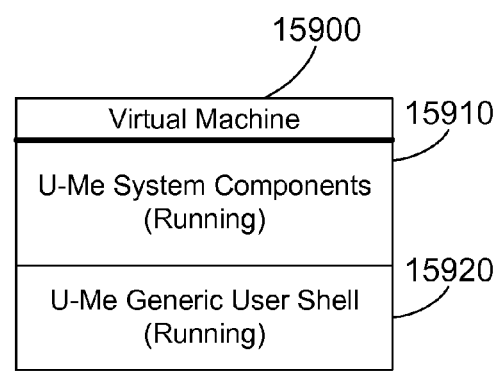
FIG. 159 is a block diagram of a running virtual machine generated from the virtual machine image in FIG. 158, where the running virtual machine is not specific to any user.
Figure 160:
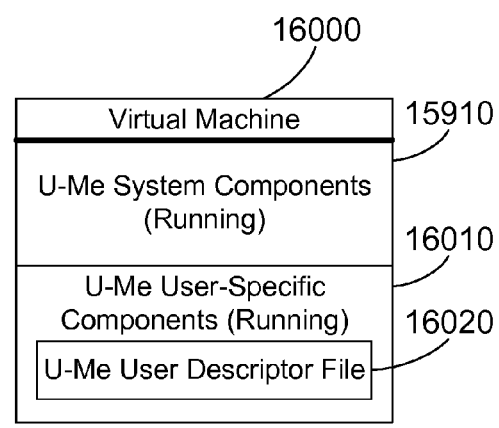
FIG. 160 is a block diagram of the running virtual machine in FIG. 159 after a U-Me user descriptor file has been written to the U-Me generic user shell to create U-Me user-specific components that are running.
Figure 161:
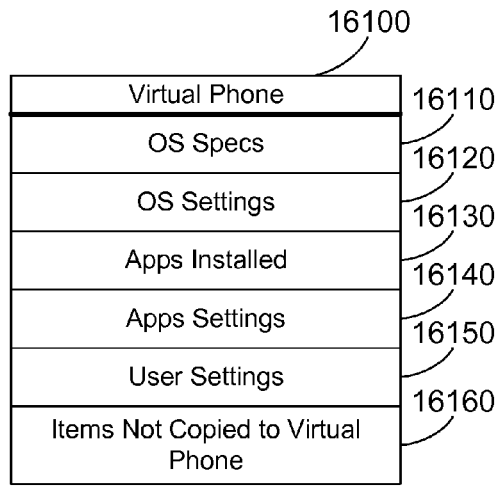
FIG. 161 is a block diagram representing aspects of a virtual phone.

Referring to FIG. 158, a virtual machine image 15800 is shown to include U-Me system info 15810, which includes virtual machine provisioning info 15820, and a U-Me generic user shell 15830. A virtual machine image can be a disk image that, once installed on a physical machine, can be executed. We now assume the virtual machine image 15800 in FIG. 158 is provisioned, or instantiated, on a physical computer system, which results in a running virtual machine 15900 as shown in FIG. 159 that is running in the U-Me system. Note the U-Me system components 15910 are running and a U-Me generic user shell 15920 is running. However, the U-Me generic user shell is not specific to any particular user, because the U-Me user shell only becomes user-specific once a U-Me user descriptor file is written to the U-Me generic user shell 15920. Such an example is shown in FIG. 160, where the U-Me user descriptor file 16020 has been installed in the U-Me generic user shell to create the U-Me user-specific components 16010 for a particular user. This makes the virtual machine 16000 user-specific. The virtual machine 16000 can then provide all the functions the user requires from the U-Me system. Of course, the virtual machine will not necessarily perform all U-Me system functions. In the most preferred implementation, many of the U-Me system functions will be available on other virtual machines that are always running to service requests from many users simultaneously.

There is a significant advantage in separating the U-Me system components from the information that makes the virtual machine user-specific. The virtual machine 15900 in FIG. 159 is running, and can be easily deployed to serve a user by writing the user's U-Me descriptor file to the U-Me user shell. The time to customize a running virtual machine to a specific user will be a small fraction of the time to provision or instantiate a virtual machine from a virtual machine image. The U-Me system can thus monitor user demand, and in anticipation of a spike in usage, the U-Me system can provision many user-generic virtual machines that are ready and waiting for the U-Me descriptor file to make these virtual machines user-specific. Once the spike in demand hits, the U-Me system can satisfy the demand by configuring each running virtual machines to a particular user. Because the user-generic virtual machines are already up and running, the time to configure a running virtual machine with the user's info will be much less than the time it would take to instantiate a virtual machine from a virtual machine image.

Method 11300 in FIG. 113 was discussed above. An example is now presented to illustrate specifics of how method 11300 may perform some of its steps. We assume a virtual phone 16100 includes many items copied from a physical phone, such as operating system specifications 16110, operating system settings 16120, apps installed 16130, apps settings 16140, and user settings 16150. Virtual phone 16100 also includes a list of items not copied to the virtual phone 16160. A U-Me app running on the physical phone can preferably detect which items in the physical phone cannot be copied to the virtual phone, and provides those items to the virtual phone so the virtual phone knows what items on a physical phone do not exist in the corresponding virtual phone.

Figure 162:
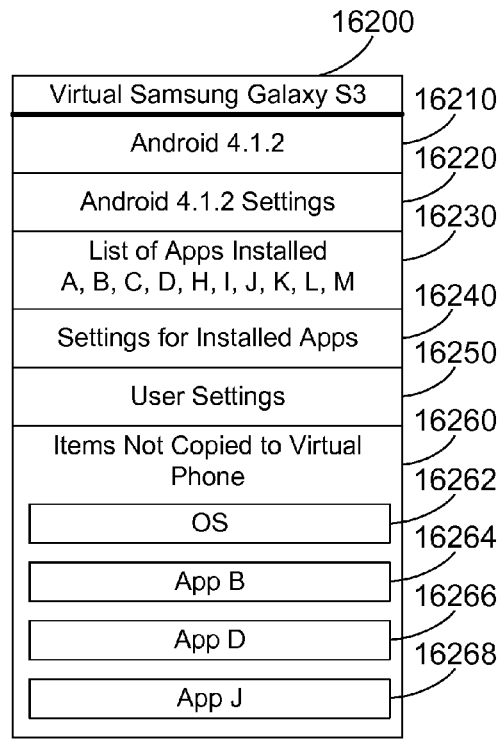
FIG. 162 is a block diagram representing one suitable example of a virtual phone representing the items shown in FIG. 161.
Figure 163:
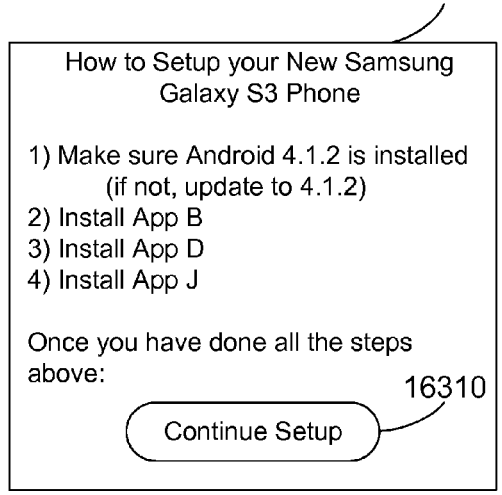
FIG. 163 is a screen display showing steps to configure a new phone using the virtual phone settings in FIG. 162.

Referring to FIG. 162, a virtual phone 16200 is shown as an example of a virtual phone that could exist for a user's Samsung Galaxy S3 phone. Virtual phone 16200 includes operating system specs 16210 that specify the phone is running the Android operating system, version 4.1.2. The operating system settings 16220 include all settings for the Android 4.1.2 operating system that can be copied to the virtual phone 16200. The list of apps installed 16230 shows apps labeled A, B, C, D, H, I, J, K, L and M. The settings for installed apps 16240 include all settings for all apps that can be copied to the virtual phone 16200. The user settings 16250 include all of the user settings on the physical phone. The items not copied to virtual phone 16260 lists the operating system 16262, App B 16264, App D 16266, and App J 16268. It is assumed these apps have features that prevent copying all of their information to the virtual phone in the user's U-Me account (i.e., are not U-Me certified). Based on the items that could not be copied to the virtual phone 16260, the user may be prompted with steps to take before the U-Me system can configure the phone. For example, let's assume the user flushes his phone down a toilet, purchases a new phone, and installs the U-Me app. The user will log in to his U-Me account, then register the new phone as one of the user's devices. The user will select to configure the new device as a clone from the stored virtual device. But there still may be some missing configuration info for the new device (step 11450 in FIG. 13). At this point, the user is prompted for the missing configuration info (step 11360). The prompt to the user in step 11460 could be as shown at 16300 in FIG. 163. The instructions to the user on how to setup the new Samsung Galaxy S3 phone include a list of steps the user must perform before the U-Me system can install all of the information from the user's virtual phone. First, the user makes sure Android 4.1.2 is installed. If an earlier release is installed, the user updates the operating system to Android 4.1.2. Once the correct operating system is on the phone, the user installs Apps B, D and J manually. Once the operating system is up to date and apps B, D and J have been installed, the user can select the Continue Setup button 16310, which will cause the U-Me system to copy all of the information in the virtual phone 16200 to the physical phone. While apps B, D and J had to be manually installed, the settings for the apps could still be in the settings for installed apps 16240 in the virtual phone 16200. Installing these settings by the U-Me system after the apps are manually installed by the user can result in the apps being configured exactly as they were on the user's previous phone, even though the apps themselves could not be copied to the virtual phone 16200.

As is clear from the detailed discussion above, the U-Me system provides a computer-implemented method executing on at least one processor comprising the steps of storing user data corresponding to a first user, wherein the user data corresponding to the first user comprises files, contacts, e-mail, calendar, tasks, reminders and digital photos; storing licensed content that is licensed to the first user, wherein the licensed content comprises music, movies, electronic books, software and games; storing first user settings corresponding to the first user for a plurality of software applications, wherein the first user settings comprise first user preferences for each of the plurality of software applications; storing second user settings corresponding to the first user for a plurality of physical devices, wherein the second user settings comprise second user preferences for each of the plurality of physical devices, wherein the plurality of physical devices comprises a mobile phone and a computer system; authenticating the first user on a first device used by first the user by scanning a fingerprint of the first user and comparing the scanned fingerprint against a previously-stored reference fingerprint for the first user; making the user data, the licensed content, the first user settings, and the second user settings available to the first user on a first device used by the first user; and converting user settings for a first physical device to user settings for a second physical device.

One of the long-term goals of the U-Me system is to create a place for all of a user's data, licensed content and settings. This includes settings for devices we have not yet dreamed of The philosophy is very simple. If the user is going to spend time configuring any device to the user's liking by specifying settings for the device, let's store those settings in the user's U-Me account so those settings can be used to reconfigure an identical or similar device, or so those settings can be used to generate suitable settings for a different kind of device. Thus, if a person spends hours configuring a computerized sewing machine to perform certain functions by specifying many different settings for the sewing machine, let's store those settings to the user's U-Me account. This philosophy can extend to any and all devices known today and developed in the future.

It will take time for the U-Me system to be deployed and to gain acceptance in the marketplace. It will take even longer to get device manufacturers and licensed content providers on-board to the point they are providing devices and content that are U-Me certified. It may take even longer to realize the vision of having a user's data, licensed content, and settings available in cars, hotel rooms and resorts. The certification process is another possible revenue stream for the company providing the U-Me system. There will come a point when the U-Me system achieves critical mass, where the public demands compatibility with the U-Me system. At that point, even the most reluctant vendors will have to become U-Me certified to meet the demands of their customers.

The specification herein uses different terms for phones, including cell phones, smart phones, and just "phones." These are all examples of different mobile phones. The disclosure and claims herein expressly extend to any and all mobile phones, whether currently known or developed in the future.

The specification herein discusses different types of computing devices, including smart phones, tablets, laptop computers, and desktop computers. The term "computer system" as used herein can extend to any or all of these devices, as well as other devices, whether currently known or developed in the future. In one specific context, a computer system is a laptop or desktop computer system, which is a different type than a phone or a tablet.

The disclosure herein uses some shortened terms for the sake of simplicity. For example, the word "information" is shortened in many instances to "info", the word "photograph" is shortened in many instances to "photo", the word "specifications" is shortened in some instances to "specs", and the word "medications" is shortened in some instances to "meds." Other shortened or colloquial terms may appear in the specification and drawings, which will be understood by those of ordinary skill in the art.

Many trademarks and service marks have been referenced in this patent application. Applicant has filed US federal service mark applications for "Universal Me" and for "U-Me". All other trademarks and service marks herein are the property of their respective owners, and applicant claims no rights in these other marks.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executing on at least one processor comprising:
   storing user data corresponding to a first user in a cloud-based account corresponding to the first user;
   storing user settings corresponding to the first user for a plurality of physical devices used by the first user in the cloud-based account corresponding to the first user;
   providing in the cloud-based account corresponding to the first user a plurality of virtual devices that correspond to the plurality of physical devices, wherein each of the plurality of virtual devices automatically synchronizes changes made by the first user to data in a corresponding physical device to the corresponding virtual device and to the user data in the cloud-based account, automatically synchronizes changes made by the first user to user settings in the physical device to the corresponding virtual device and to the user settings in the cloud-based account, automatically synchronizes changes made by the first user to the user data in the cloud-based account to the virtual device and to the corresponding physical device, and automatically synchronizes changes made by the first user to the user settings in the cloud-based account to the virtual device and to the corresponding physical device;
   allowing the first user to access and change the user data and the user settings for the plurality of physical devices on a first of the plurality of physical devices used by the first user; and
   converting user settings for the first physical device to user settings for a second physical device.

2. The method of claim 1 wherein each of the plurality of virtual devices performs the automatic synchronization when a change is detected without further input from the user.

3. The method of claim 1 further comprising authenticating the first user on the first physical device before allowing the first user to access and change the user data and the user settings for the plurality of physical devices on the first physical device.

4. The method of claim 1 further comprising storing licensed content that is licensed to the first user in the cloud-based account corresponding to the first user and allowing the first user to access the licensed content on the first physical device.

5. The method of claim 1 wherein the user settings comprise user preferences for each of the plurality of physical devices.

6. The method of claim 1 wherein the plurality of physical devices comprises a mobile phone and a computer system and the user settings for the plurality of physical devices comprise user settings for the mobile phone and user settings for the computer system.

7. The method of claim 1 wherein the plurality of physical devices includes physical devices that run a same operating system.

8. The method of claim 1 wherein the plurality of physical devices includes physical devices that run different operating systems.

9. A networked computer system comprising:
a plurality of physical devices;
a cloud-based computer system that comprises a cloud-based account corresponding to a first user, wherein the cloud-based account comprises:
user data corresponding to the first user;
user settings corresponding to the first user for the plurality of physical devices used by the first user; and
a plurality of virtual devices that correspond to the plurality of physical devices, wherein each of the plurality of virtual devices automatically synchronizes changes made by the first user to data in a corresponding physical device to the corresponding virtual device and to the user data in the cloud-based account, automatically synchronizes changes made by the first user to user settings in the physical device to the corresponding virtual device and to the user settings in the cloud-based account, automatically synchronizes changes made by the first user to the user data in the cloud-based account to the virtual device and to the corresponding physical device, and automatically synchronizes changes made by the first user to the user settings in the cloud-based account to the virtual device; and to the corresponding physical device;
the plurality of physical devices coupled via network connection to the cloud-based account corresponding to the first user, wherein the cloud-based computer system is configured to:
allow the first user to access and change the user data and the user settings for the plurality of physical devices using any one of the plurality of physical devices; and
convert user settings for a first physical device to user settings for a second physical device.

10. The networked computer system of claim 9 wherein each of the plurality of virtual devices performs the automatic synchronization when a change is detected without further input from the user.

11. The networked computer system of claim 9 further comprising an authentication mechanism that authenticates the first user on a first physical device before making the user data and the user settings for the plurality of physical devices accessible to the first user on the first physical device.

12. The networked computer system of claim 9 further comprising licensed content in the cloud-based account corresponding to the first user that is licensed to the first user, wherein the licensed content is made accessible to the first user on the first physical device.

13. The networked computer system of claim 10 wherein the user settings comprise user preferences for each of the plurality of physical devices.

14. The networked computer system of claim 10 wherein the plurality of physical devices comprises a mobile phone and a computer system and the user settings for the plurality of physical devices comprise user settings for the mobile phone and user settings for the computer system.

15. The networked computer system of claim 10 wherein the plurality of physical devices includes physical devices that run a same operating system.

16. The networked computer system of claim 10 wherein the plurality of physical devices includes physical devices that run different operating systems.

17. A computer-implemented method executing on at least one processor comprising:
storing user data corresponding to a first user in a cloud-based account corresponding to the first user;
storing licensed content that is licensed to the first user in the cloud-based account corresponding to the first user;
storing first user settings corresponding to the first user for a plurality of software applications in the cloud-based account corresponding to the first user, wherein the first user settings comprise first user preferences for each of the plurality of software applications;
storing second user settings corresponding to the first user for a plurality of physical devices used by the first user in the cloud-based account corresponding to the first user, wherein the second user settings comprise second user preferences for each of the plurality of physical devices;
providing in the cloud-based account corresponding to the first user a plurality of virtual devices that correspond to the plurality of physical devices, wherein each of the plurality of virtual devices automatically synchronizes changes made by the first user to data in a corresponding physical device to the corresponding virtual device and to the user data in the cloud-based account, automatically synchronizes changes made by the first user to user settings in the corresponding physical device to the corresponding virtual device and to the first user settings in the cloud-based account, automatically synchronizes changes made by the first user to user settings in the physical device to the corresponding virtual device and to the second user settings in the cloud-based account, automatically synchronizes changes made by the first user to the user data in the cloud-based account to the virtual device and to the corresponding physical device, automatically synchronizes changes made by the first user to the first user settings in the cloud-based account to the virtual device and to the corresponding physical device, and automatically synchronizes changes made by the first user to the second user settings in the cloud-based account to the virtual device and to the corresponding physical device;
authenticating the first user on a first of the plurality of physical devices used by first the user;
in response to authenticating the first user on the first physical device, allowing the first user to access the user data, the licensed content, the first user settings for the plurality of software applications, and the second user settings for the plurality of physical devices on the first physical device; and
converting user settings for the first physical device to user settings for a second physical device.

* * * * *